(12) United States Patent
Yamaguchi et al.

(10) Patent No.: US 6,320,988 B1
(45) Date of Patent: Nov. 20, 2001

(54) SKELETON MODEL SHAPE TRANSFORMATION METHOD, IMAGE SYNTHESIZING APPARATUS, AND INFORMATION STORAGE MEDIUM

(75) Inventors: Kentaro Yamaguchi; Tetsuji Baba, both of Yokohama; Hiroshi Yoshida, Itabashi-ku, all of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 08/972,049

(22) Filed: Nov. 17, 1997

(30) Foreign Application Priority Data

Nov. 19, 1996 (JP) .................................................. 8-323457

(51) Int. Cl.[7] ........................................................ G06K 9/36
(52) U.S. Cl. ............................ 382/276; 345/418; 345/473; 345/474
(58) Field of Search ...................................... 345/418, 419, 345/420, 433, 436, 437, 438, 473, 474; 382/276

(56) References Cited

U.S. PATENT DOCUMENTS 5,847,716 * 12/1998 Hashimoto ............................ 345/473
5,889,528 *  3/1999 Zhao ..................................... 345/436

OTHER PUBLICATIONS

"Modeling and Animation Techniques for a Computer Generated Actor", Fukui Kazuo, NHK Science and Technical Research Laboratories, Sep. 1991.

* cited by examiner

Primary Examiner—Thomas D. Lee
(74) Attorney, Agent, or Firm—Oliff & Berridge, PLC.

(57) ABSTRACT

The objective of this invention is to provide a method of transforming the shape of a skeleton model, wherein this method can easily handle a skeleton model of a multiple-branching structure and enables the easy setting of complicated restrictive conditions. Node coordinates and arc-normal vectors are used as basic variables. Basic equations, which comprise an equation defining the length of an arc and which use basic variables as unknowns, and an evaluation expression for uniquely specifying a solution that satisfies these basic equations are modified, based on data such as mouse input. A solution for the basic variables that satisfies the basic equations and minimizes the value of the evaluation expression is obtained, and the shape of the skeleton model is transformed accordingly. The evaluation expression is used to set minimization of the sum-of-squares of arc-to-arc angles, rubber-banding, dampers, and inertia. The basic equations and the evaluation expression are updated in synchronization with the end of a loop. A spring restriction can be set, and the use of a restrictive condition in the next loop of the calculations can be determined from whether or not the restrictive condition was used in the previous loop, and whether or not an object has passed a boundary.

54 Claims, 26 Drawing Sheets

FIG. 1A

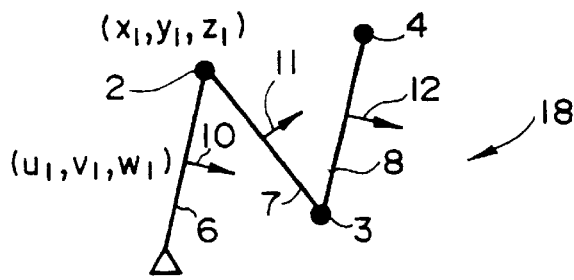

FIG. 1B

BASIC VARIABLES
$x, y, z, \cdots, u, v, w, \cdots$

BASIC EQUATIONS $f(x, y, z, \cdots) = 0$ (DEFINING LENGTHS OF ARCS)

$g(u, v, w) = 0$ (DEFINING LENGTHS OF ARC-NORMAL VECTORS)

$h(x, y, z, \cdots u, v, w) = 0$ (THE ARC-NORMAL VECTORS ARE PERPENDICULAR TO ARCS)

TIMES THE NUMBER OF ARCS

FIG. 1C

EQUATIONS TO BE SOLVED $$\left( \begin{array}{c} A \\ m \times n \end{array} \right) \left( \begin{array}{c} \Delta x_1 \\ \Delta y_1 \\ \Delta z_1 \\ \vdots \end{array} \right) = \left( b \right), (n > m)$$

EVALUATION EXPRESSION $U(\Delta x_1, \Delta y_1, \Delta z_1, \cdots)$

FIG. 1D  LAGRANGIAN MULTIPLIER METHOD $$\left( \begin{array}{c} A_1 \\ (m+n) \times (m+n) \end{array} \right) \left( \begin{array}{c} \Delta x_1 \\ \Delta y_1 \\ \Delta z_1 \\ \vdots \\ \alpha_1 \\ \alpha_2 \\ \vdots \\ \alpha_m \end{array} \right) = \left( b_1 \right)$$

EVALUATION EXPRESSION $U = U_1 + U_2 + U_3 \cdots$ $U_1$: SUM-OF-SQUARES OF VARIATIONS IN ARC-TO-ARC ANGLES
$U_2$: RUBBER-BANDING
$U_3$: DAMPERS AND INERTIAS

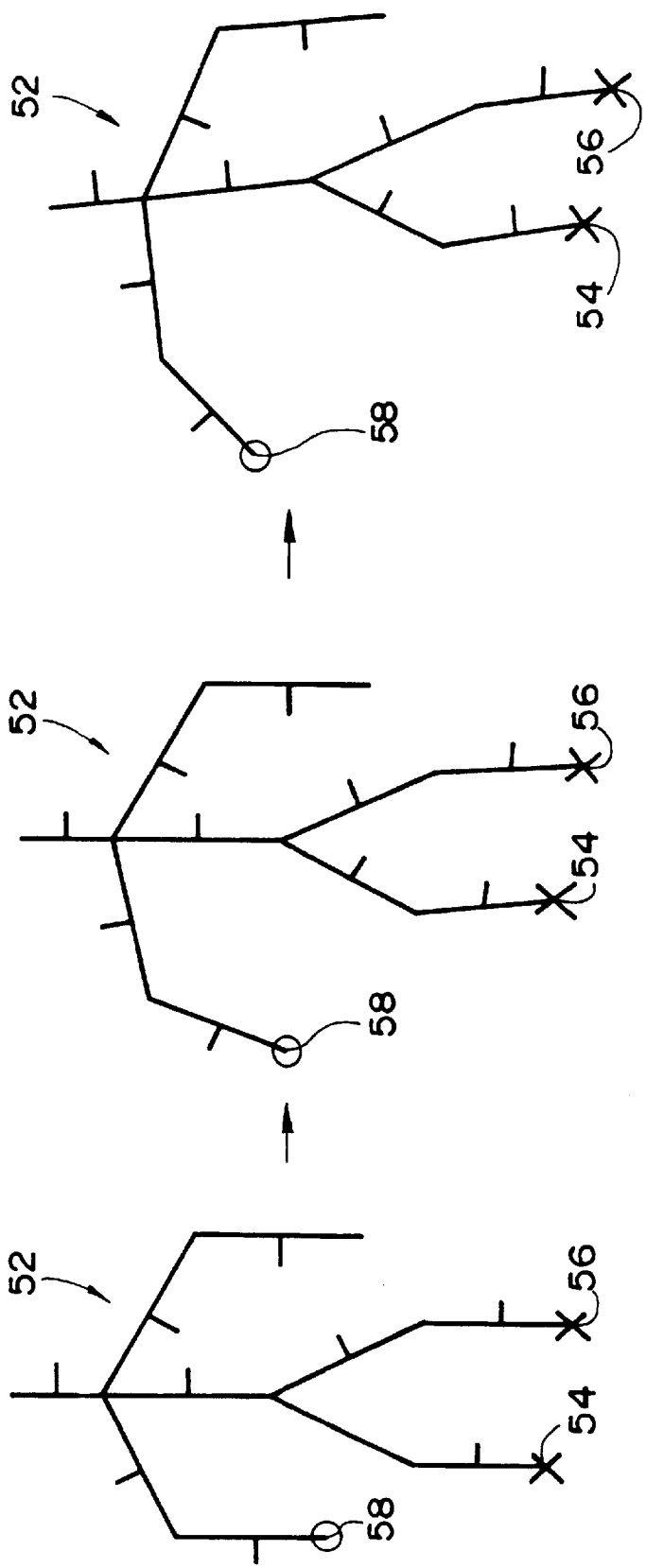

FIG. 12
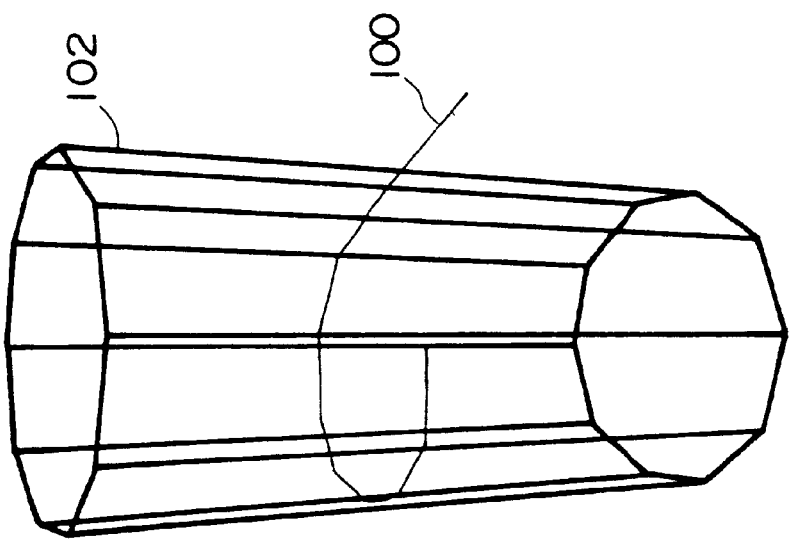
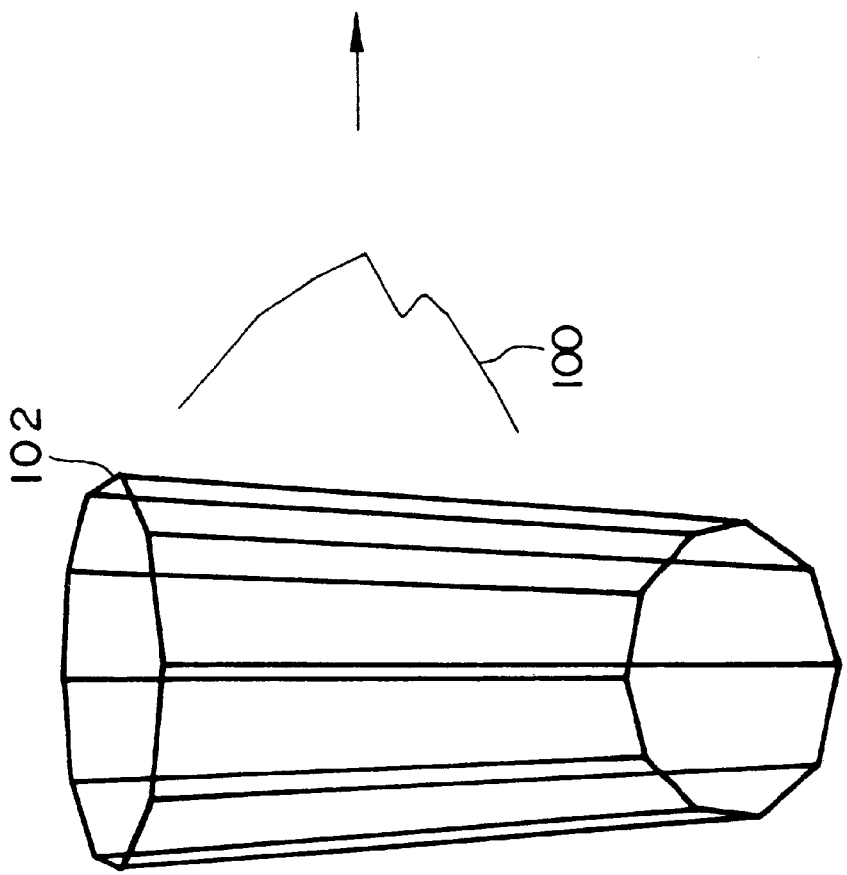

FIG.22A
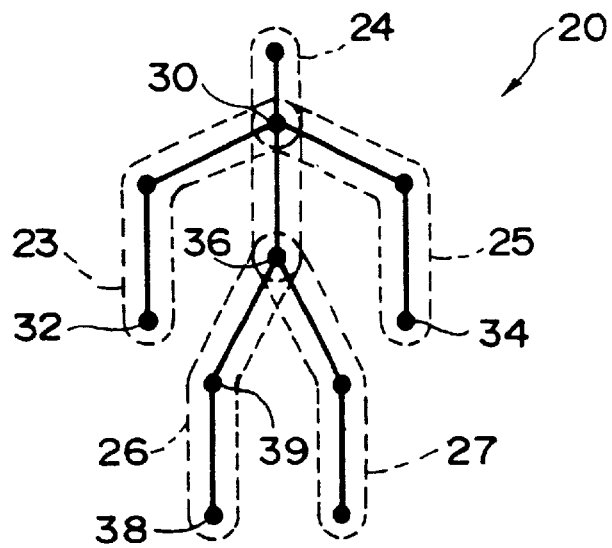
FIG.22B
$(x, y, z) = f(\theta_{1x}, \theta_{1y}, \theta_{1z}, \theta_{2x}, \cdots)$
$(\theta_{1x}, \theta_{1y}, \theta_{1z}, \theta_{2x}, \cdots) = f^{-1}(x, y, z)$
FIG.22C
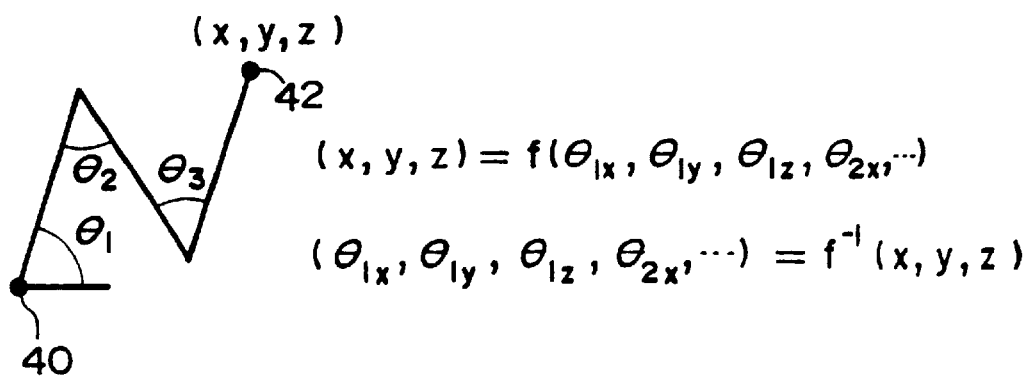

US 6,320,988 B1

SKELETON MODEL SHAPE TRANSFORMATION METHOD, IMAGE SYNTHESIZING APPARATUS, AND INFORMATION STORAGE MEDIUM

BACKGROUND OF THE INVENTION

1. Field of the Invention

This invention relates to a method of transforming the shape of a skeleton model, an image synthesizing apparatus, and an information storage medium.

2. Description of Related Art

A technique called inverse kinematics is known in the art. With this technique, a skeleton model 20 such as that shown in FIG. 22A is created beforehand within a computer. The user then uses an input device such as a mouse to transform that skeleton model 20 while viewing the skeleton model 20 on a display device, such as a CRT, to create any motion or pose that the user desires. It should be noted that each of the joint or end points of the skeleton model 20 is called a "node" in the description that follows, and a linking "bone" that connects two nodes is called an arc.

Several methods of using this inverse kinematics technique are known in the art, such as is described in "Modeling and Animation Techniques for a Computer Generated Actor" (by Fukui Kazuo, reference material for a seminar on Human Modelling and Display Techniques, held in September 1991 by the Information Processing Society). With this prior-art technique, arc-to-arc angles $\theta_1$, $\theta_2$, and $\theta_3$ are used as basic variables representing the shape of a skeleton model, as shown in FIG. 22B. One of the problems to be solved with this prior-art inverse kinematics method occurs when there is a straight-linked skeleton having a fixed node 40 and the location (x, y, z) of a node 42 at the other end thereof has been specified. The difficulty involves deriving the arc-to-arc angles $\theta_1$, $\theta_2$, and $\theta_3$ that implement this method. This problem is equivalent to obtaining an inverse function $f^{-1}(x, y, z)$ of a function $f(\theta_{1x}, \theta_{1y}, \theta_{1z}, \theta_{2x} \ldots)$. However, since the function f is non-linear, it is not easy to obtain this inverse function. In this case, infinitesimal differentials $\Delta x$, $\Delta y$, and $\Delta z$ in x, y, and z are approximated by linear expression involving infinitesimal differentials $\Delta\theta_{1x}$, $\Delta\theta_{1y}$, $\Delta\theta_{1z}$, $\Delta\theta_{2x}$ ... of the arc-to-arc angles. The problem to be solved thereby can be reduced to the solving of the set of simultaneous equations shown in FIG. 22C. However, the matrix M in FIG. 22C is not square and the number of variables thereof is less than the number of equations, so there is an infinite number of solutions. In this case, by adding a condition that the sum of squares of variations in the arc-to-arc angles is a minimum, the set of simultaneous equations of FIG. 22C can be solved.

However, the above described prior-art technique applies to a straight-linked skeleton that has one end fixed wherein arc-to-arc angles are used as basic variables expressing the shape, so it involves the following problems:

1. It is Difficult to Handle a Multiple-branching Structure

With this prior-art technique, in order to handle a skeleton model of a multiple-branching structure (a structure in which three or more arcs are connected to one node), such as that shown for example in FIG. 22C, it is necessary to divide it into a plurality of directly linked structures 23 to 27 and then set parent-child relationships as shown in FIGS. 23A and 23B. To move one of the hands of the skeleton model 20, for example, a node 30 is set as a root and a node 32 is moved as an effector, and to move the other hand, the node 30 is set as the root and a node 34 is moved as an effector. Similarly, to move one of the legs, a node 36 is set as a root in this case and a node 38 is moved as an effector. The user must therefore work while constantly being aware of which node acts as the root and which node acts as effector, which makes the work troublesome.

2. It is Difficult to Handle Complicated Restrictive Conditions

If restrictive conditions are set for a plurality of nodes, for example, it is necessary to divide the skeleton into suitable directly linked structures before handling it, so that the processing becomes complicated. These restrictive conditions are generally expressed as equations defining the node coordinates. If, for example, the node 38 in FIG. 22A is restricted to a polygon, an equation is used that always limits the node 38 to locations on that polygon. However, the basic variables used in the prior-art technique are the arc-to-arc angles, so it is difficult to use the above equations and thus restrictive conditions are difficult to handle.

3. It is Difficult to Move a Plurality of Nodes in Different Directions Simultaneously In other words, if an attempt is made to move nodes 38 and 39 in different directions simultaneously, for example, with the prior-art technique, the processing is extremely complicated.

SUMMARY OF THE INVENTION

This invention was devised in order to solve the above-described technical problems and has as an objective thereof the provision of a method of transforming the shape of a skeleton model, an image synthesizing apparatus, and an information storage medium which can easily handle a skeleton model of a multiple-branching structure and which enable the simple setting of complicated restrictive conditions.

In order to solve the above technical problems, a first aspect of this invention relates to a method of transforming the shape of a skeleton model, comprising the steps of:

expressing the skeleton model by basic variables that comprise coordinates of at least one node of the skeleton model;

causing a change in at least one of a set of basic equations and an evaluation expression based on given information, the set of basic equations taking the basic variables as unknowns and comprising an equation that defines the length of a plurality of arcs of the skeleton model as given values, and the evaluation expression uniquely determining a solution for the basic variables of the set of basic equations;

obtaining the solution that substantially satisfies the set of basic equations and makes the value of the evaluation expression one of substantially a minimum, substantially a maximum, or substantially stationary; and transforming the shape of the skeleton model, based on the thus obtained solution.

With this aspect of the invention, a skeleton model is expressed by basic variables comprising node coordinates. Furthermore, a solution that substantially satisfies the basic equations is uniquely specified by adding a condition such as one that makes the value of an evaluation expression substantially at minimum, to determine the shape of the skeleton model. Therefore, this aspect of the invention makes it possible to handle all nodes equally, making it easy to manipulate a skeleton model of a multiple-branching structure. Since it is often necessary to define a restrictive condition on the basis of node coordinates, this aspect of the invention enables the simple setting of complicated restrictive conditions.

The basic variables may comprise components of arc-normal vectors that are perpendicular to the arcs; and the set of basic equations may comprise an equation defining the length of the arc-normal vectors as given values and an equation specifying that the arc-normal vectors are perpendicular to the arcs.

The arc-normal vector is used as a basic variable, so that all arcs can be handled equally, making it easy to manipulate a skeleton model of a multiple-branching structure.

The basic variables may comprise components of arc-normal vectors that are perpendicular to the arcs; and a variation in the components of the arc-normal vectors may be expressed as a single given variable to obtain the solution for these basic variables.

Since a variation in the components of the arc-normal vectors can be expressed by a single given variable as mentioned above, the number of unknowns to be solved can be reduced, increasing the speed of processing. Note that it is particularly preferable to express the variation in the components of the arc-normal vectors as a linear expression involving a single given variable.

The basic variables may comprise components of arc-normal vectors that are perpendicular to the arcs; and the solution for the basic variables may be obtained such that the value of the evaluation expression is one of substantially a minimum, substantially a maximum, or substantially stationary, when the evaluation expression comprises at least one of a variation in an angle between two of the arcs, a distance between the node and a given point, a variation in the direction of one of the arcs which has a fixed node at one end, a variation in the coordinates of the node, and a variation in the velocity of the coordinates of the node.

This makes it possible to transform the skeleton model in a well-balanced manner by including variations in arc-to-arc angles within the evaluation expression. It also makes it possible to set conditions such as rubber-banding by including the distance between a node and a given point therein. Similarly, indefinite solutions and uncoordinated motion of the skeleton model can be prevented by including variations in the coordinates of nodes or variation in the velocity of the coordinates of nodes within the evaluation expression.

The solution for the basic variables may be obtained by iterative calculations; and at least one of the set of basic equations and the evaluation expression may be successively modified based on given information in synchronization with the start or end of an iterative loop.

If an iterative method such as a Newtonian method is used, the known values and form of the equations do not normally change until the calculations converge. In this case, the basic equations and evaluation expression change successively before the calculations converge, such as in each iterative loop or in every two or three iterative loops. This makes it possible to achieve a shape transformation that follows the user's input sufficiently well, if the given information is the coordinates of the position of a mouse cursor manipulated by the user, for example, which increases the usefulness of this invention to the user. Note that it is preferable to enable compensation by scaling, if errors become too large.

Coordinates of a fixed node or components of fixed arc-normal vectors may be used as known values.

This makes it possible to fix the coordinates of a node or the direction of an arc in a simple manner, further increasing the usefulness to the user. The number of unknowns can also be reduced, enabling an increase in processing speed.

The evaluation expression may comprise at least one of an expression that restricts an angle between two of the arcs to within a given range, an expression that restricts the node to within a given surface or a given line, and an expression that restricts the skeleton model or a first object that moves together with the skeleton model to a second object, when an interaction occurs between the skeleton model or the first object and the second object.

This makes it easy to set a restrictive condition, such as a limit on the movability range of arc-to-arc angles, an attachment of a node to a given surface or the like, or an interaction between the skeleton model and another object, by simply including one of the above different expressions in the evaluation expression.

A second aspect of this invention relates to a method of transforming the shape of a skeleton model, comprising the steps of:

expressing the skeleton model by basic variables that comprise coordinates of at least one node of the skeleton model and components of arc-normal vectors that are perpendicular to a plurality of arcs of the skeleton model; and transforming the shape of the skeleton model in such a manner that the value of an expression is one of substantially a minimum, substantially a maximum, or substantially stationary, when the expression comprises at least one of a variation in an angle between two of the arcs, a distance between the node and a given point, a variation in the direction of one of the arcs which has a fixed node at one end, a variation in the coordinates of the node, and a variation in the velocity of the coordinates of the node.

Since node coordinates or the components of arc-normal vectors are used as basic variables in this aspect of the invention, all nodes and arcs can be handled equally, making it easy to manipulate a multiple-branching structure. It is also possible to transform the shape in a well-balanced manner, by minimizing an expression that comprises a variation in arc-to-arc angle.

A third aspect of this invention relates to a method of transforming the shape of a skeleton model, comprising the steps of:

expressing the skeleton model by basic variables that comprise coordinates of at least one node of the skeleton model; and transforming the shape of the skeleton model in such a manner that, when the coordinates of at least one given point that controls a transformation in the shape of the skeleton model have changed, the distance between the node and the given point is minimized.

This aspect of the invention makes it possible to set a feature called "rubber-banding," enabling a well-balanced shape transformation because the shape transformation can be executed with a suitable form as an initial state.

The shape of the skeleton model may be transformed in such a manner that distances between two or more of the nodes and two or more of the given points linked thereto are minimized.

This makes it possible to transform the shape of a skeleton model by using at least two given points as control points, enabling a further increase in usefulness to the user.

A fourth aspect of this invention relates to a method of transforming the shape of a skeleton model, comprising the steps of:

expressing the skeleton model by basic variables that comprise coordinates of at least one node of the skeleton model;

obtaining a solution for an equation including the basic variables by iterative calculations; and successively modifying the equation based on given information in synchronization with the start or end of an iterative loop.

With this aspect of the invention, the equation changes successively before the calculations converge, such as in each iterative loop or in every two or three iterative loops, so that a rapid response is enabled without the appearance of excessive unnaturalness in the shape, even when rapid shape transformation of the skeleton model is required.

A fifth aspect of this invention concerns a method of transforming the shape of a skeleton model, comprising the steps of:

transforming the shape of the skeleton model under a restrictive condition such that, when the skeleton model or an object that moves together with the skeleton model has passed beyond a given boundary, the skeleton model or object is returned to the boundary;

executing calculations in such a manner that, when one iterative loop of iterative calculations for obtaining the shape of the skeleton model is executed in a state in which the restrictive condition is disabled and the skeleton model or object does not pass beyond the boundary, the restrictive condition remains disabled in the next iterative loop;

executing calculations in such a manner that, when the one iterative loop is executed in a state in which the restrictive condition is disabled and the skeleton model or object passes beyond the boundary, the restrictive condition is enabled in the next iterative loop;

executing calculations in such a manner that, when the one iterative loop is executed in a state in which the restrictive condition is enabled and the skeleton model or object passes beyond the boundary, the restrictive condition remains enabled in the next iterative loop; and executing calculations in such a manner that, when the one iterative loop is executed in a state in which the restrictive condition is enabled and the skeleton model or object does not pass beyond the boundary, the restrictive condition is disabled in the next iterative loop.

With this aspect of the invention, the skeleton model or object can be restricted in a spring-like manner to a boundary, making it possible to determine easily whether the user is moving the skeleton model towards that boundary or in a direction away from that boundary. Since this aspect also makes it unnecessary to perform repeated calculations to determine such a restrictive condition, the processing speed can be increased dramatically.

The shape of the skeleton model may be transformed under a restrictive condition that ensures that the value of an expression comprising the distance between the skeleton model or object and the boundary is one of substantially a minimum, substantially a maximum, or substantially stationary.

This simplifies the implementation of an interaction function between a skeleton model and an object.

A virtual boundary may be provided at a location separated from the boundary by a given spacing; and, when the skeleton model or object passes beyond that boundary, the skeleton model or object may be returned to the virtual boundary and also a decision may be made as to whether to enable or disable a restrictive condition by using the virtual boundary instead of the boundary.

This makes it possible to remove the problems that occur when there are multiple collisions between nodes or other structural components and objects.

A sixth aspect of this invention relates to a method of transforming the shape of a skeleton model, wherein:

when a domain of at least one first variable for expressing the shape of the skeleton model is defined by an inequality comprising the first variable, the shape of the skeleton model is transformed under a discontinuous restrictive condition by substituting an equality for the inequality and defining the domain of the first variable by the equality, the equality being made by moving all terms of the inequality to either the left of right side of the inequality and inserting a function of a second variable into the other side of the inequality, the value of the function being constantly positive or constantly negative or constantly non-negative or constantly non-positive.

In general way, the domain of the first variable such as an arc-to-arc angle, node coordinates, or the components of an arc-normal vector can be defined by using an inequality. With this aspect of the invention, this inequality can be substituted into an equality having the same effect as this inequality with respect to domain defining. The domain of the first variable is defined in terms of this equality, so that a discontinuous restrictive condition can be given for the shape transformation of the skeleton model. This substitution of an inequality into an equality in this manner means that classifying the cases that is necessary when using an inequality can be omitted, enabling faster processing. Since an equality can be easily added to an expression which provides a restrictive condition for a skeleton model, the processing can be simplified.

The shape of the skeleton model may be transformed in such a manner that the value of an expression comprising a variation in the second variable is one of substantially a minimum, substantially a maximum, or substantially stationary.

This makes it possible to prevent large changes in the value of the second variable. It also makes it possible to prevent a situation in which uncoordinated variations are generated in the second variable, so that the first variable cannot be restricted to within its domain.

When the second variable has achieved a value close to a given convergent value, another given value may be added to the second variable.

If a long time is requires for the second variable to converge on the given convergent value, or escape from that convergent state, the speed of response of the skeleton model with respect to the user's input will deteriorate. In this case, a value of a given infinitesimal quantity may be added to the second variable before the second variable converges. This makes it possible to prevent the second variable from converging, and thus remove the above problem of a deterioration in response speed. Note that it is preferable to use a random number as the given value to be added to the second variable.

A seventh aspect of this invention relates to a method of transforming the shape of a skeleton model, wherein:

in one iterative loop of iterative calculations for obtaining the shape of the skeleton model, a first calculation step is executed in a state in which a restrictive condition that restricts the skeleton model or an object that moves together with the skeleton model to a given boundary is disabled; and when the skeleton model or object is in a given positional relationship with respect to the boundary after the first calculation step in the one iterative loop, a second calculation step is executed to attract the skeleton model or object towards the boundary.

With this aspect of the invention, a first calculation step is executed first with a restrictive condition in a disabled state, then a second calculation step is executed to attract the skeleton model or object to a boundary. This makes it possible to restrict the skeleton model to a boundary, with only two calculation steps being executed within one iterative loop. This enables a dramatic improvement in processing speed during iterative calculations, in comparison with the prior-art method in which one iterative loop comprises another iterative loop. Note that the second calculation step of attracting the skeleton model to the boundary could be omitted if the positional relationship between the skeleton model and the boundary is in a certain state.

Calculations may be executed in the first calculation step in such a manner that the value of an expression comprising an amount of movement of the skeleton model or object in the direction of the boundary is one of substantially a minimum, substantially a maximum, or substantially stationary; and calculations may be executed in the second calculation step in such a manner that the value of an expression comprising the distance between the skeleton model or object and the boundary is one of substantially a minimum, substantially a maximum, or substantially stationary.

This makes it possible to prevent a situation in which a skeleton model that ought to be restricted to a boundary moves so far away from the boundary that it cannot be returned thereto, by ensuring that an expression comprising an amount of movement in a boundary direction is at substantially a minimum, substantially a maximum, or substantially stationary. This enables a simple implementation of a function that returns the skeleton model to the boundary, by setting the expression comprising a distance to the boundary to be substantially a minimum, substantially a maximum, or substantially stationary.

The boundary may be a limited surface or limited line.

This makes it possible to increase the usefulness to the user, by enabling a restriction of the skeleton model to a limited surface or limited line (such as a polygon of a limited size or a polygon edge of a limited length). Note that this method can also be applied if a restriction is to a limitless surface or limitless line, by making the size of a polygon or the length of an edge sufficiently large.

An eighth aspect of this invention relates to a method of transforming the shape of a skeleton model, comprising the steps of:

expressing the skeleton model by basic variables that comprise coordinates of at least one node of the skeleton model;

determining whether or not a first set of simultaneous equations that takes a variation of the basic variables as an unknown is degenerate or in a state approximating thereto; and transforming the shape of the skeleton model by reducing the number of equations of the first set of simultaneous equations to reconfigure the first set of simultaneous equations as an independent second set of simultaneous equations, and obtaining a solution to the thus reconfigured second set of simultaneous equations, when it is determined that the first set of simultaneous equations is degenerate or in a state approximating thereto.

If, for example, a first set of simultaneous equations comprises dependent equations and are thus in a degenerate state, a situation can occur in which the solution to this first set of simultaneous equations is indefinite. In such a case, this aspect of the invention reduces the number of equations and reconfigures the equations into an independent second set of simultaneous equations. It is therefore possible to determine a unique solution, even if the above situation occurs in which the solution is indefinite, and thus it is possible to suitably transform the shape of a skeleton model that comprises node coordinates as basic variables.

The first set of simultaneous equations may comprise an equation that defines the length of arcs of the skeleton model as given values.

Consider an example in which there is a first equation that defines the length of a first arc which connected at one end to a fixed node and a second equation that defines the length of a second arc which is connected at one end to a fixed node and at the other end to the other end of the first arc. In this case, the first and second equations both define the coordinates of a first node that is the connection point of the first and second arcs. However, it could happen that the definition by the first equation has the same meaning as the definition by the second equation, so that the first and second equations end up in a mutually dependent relationship. If the first and second equations are in a dependent relationship, a first set of simultaneous equations for obtaining a solution to these first and second equations will be degenerate. This aspect of the invention makes it possible to obtain an appropriate solution in such as case, by reconfiguring the equations as an independent second set of simultaneous equations.

An image synthesizing apparatus according to a ninth aspect of this invention comprises means for outputting the shape of a skeleton model that has been transformed by any of the above-described shape transformation methods, and manipulation means for enabling an operator to specify a transformation of the skeleton model.

This makes it possible to implement a shape data creation tool that uses the shape transformation method of this invention.

An image synthesizing apparatus according to a tenth aspect of this invention comprises means for outputting an image of an object that moves together with a skeleton model that has been transformed by any of the above-described shape transformation methods.

This makes it possible to implement a games machine or the like that uses shape data obtained by the shape transformation method of this invention.

BRIEF DESCRIPTION OF THE DRAWINGS

FIGS. 1A to 1D illustrate the principles of this invention;

FIG. 4 shows an example of the picking of a node and the resultant shape transformations of a skeleton model;

FIG. 12 illustrates a description of a function that causes a skeleton model and an object to interact;

FIGS. 22A, 22B, and 22C illustrate a description of a prior-art method of transforming the shape of a skeleton model.

DETAILED DESCRIPTION OF PREFERRED EMBODIMENT

Figure 2A:
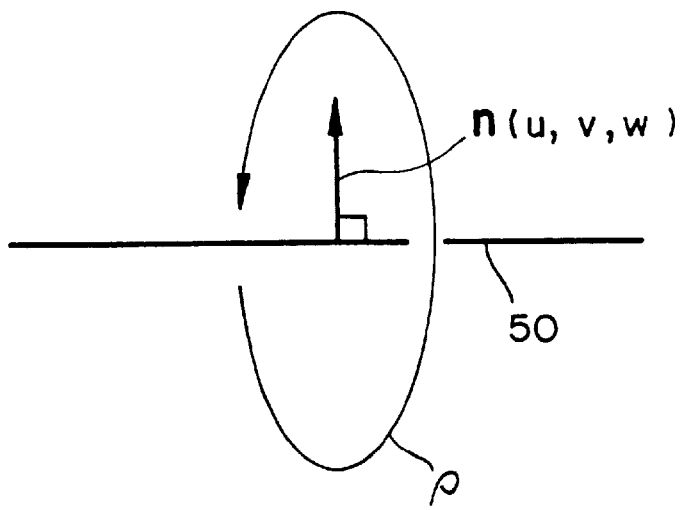
FIG. 2A illustrates a description of a method of expressing a variation in an arc-normal vector as one variable.

An embodiment of this invention will be described below, with reference to the accompanying drawings.

1 Concept of Embodiment

<1> Basic Principles

In this embodiment, the (x, y, z) coordinates of nodes 2, 3, and 4 and the (u, v, w) components of arc-normal vectors 10, 11, and 12 (which are perpendicular to arcs 6, 7, and 8, respectively) are used as basic variables representing a skeleton model 18, as shown in FIG. 1A. Taking as an example the prior-art model of FIGS. 22A, 22B, and 22C, which uses arc-to-arc angle as basic variables, it is necessary to set parent-child relationships. With that prior-art technique, nodes and arcs cannot be handled uniformly, but this embodiment, which uses node coordinates and arc-normal vectors as basic variables, makes it possible to handle all nodes and arcs in a uniform manner. Note that other variables could equally well be used instead of arc-normal vectors, for example.

These basic variables are then used as unknowns in basic equations, as shown in FIG. 1B, which provide an equation defining the length of an arc as a given value, an equation defining the length of an arc-normal vector as a given value, and an equation defining that an arc-normal vector is perpendicular to an arc. Note that g=0 and h=0 in these equations could be replaced by other equations.

In this case, the basic equations shown in FIG. 1B are non-linear. A solution is obtained by iterative calculations in this embodiment, such as those of a Newtonian method. The use of this Newtonian method, or the like, makes it possible to express the basic equations as linear expressions comprising to variations in the basic variables. The resultant set of simultaneous equations to be solved are as shown in FIG. 1C.

However, the number of variables in the equations of FIG. 1C is greater than the number of equations. That is why this embodiment provides an evaluation expression for uniquely specifying a solution to the basic equations. A condition is added to the effect that the value of this evaluation expression is at any one of substantially a minimum, substantially a maximum, or substantially stationary, and a Lagrangian multiplier method can be applied to obtain a solution for the basic variables. The use of this Lagrangian multiplier method makes it possible to determine an unique solution, because the number of variables in the equations to be solved is the same as the number of equations, as shown in FIG. 1D.

Note that in this embodiment the skeleton model is transformed in accordance with data such as the coordinates of a cursor that moves on the screen as the user moves a mouse. During this time, the basic equations and the evaluation expression vary based on given information such as these coordinates of the cursor position. More specifically, the known values comprised within the basic equations and the evaluation expression, as well as the form of the equations and the expression themselves, vary based on the coordinates of the cursor position and the like, and these variations transform the shape of the skeleton model. Note that the above described given information is not limited to the coordinates of the cursor position, various other factors such as previously prepared data can equally well be used.

<2> First-degree Approximations of Variations in Arc-Normal Vectors

With this embodiment, variations in each arc-normal vector n(u, v, w) shown in FIG. 2A are expressed by $\rho$, which is a single given variable, to obtain a solution for the basic variables (this will be described later in more detail, with reference to Algorithm 2). More specifically, variations in the arc-normal vector n are approximated by a linear expression involving the variable $\rho$. The arc-normal vector n is expressed by the three variables u, v, and w, but since n is perpendicular to an arc 50 and the magnitude thereof is constant, as shown in FIG. 2A, n has one degree of freedom in practice. Therefore, variations in n can also be expressed in terms of that one variable $\rho$, which makes it possible to reduce the number of basic variables to be solved and thus aim for an increase in processing speed.

<3> Evaluation Expression

Figure 2B:
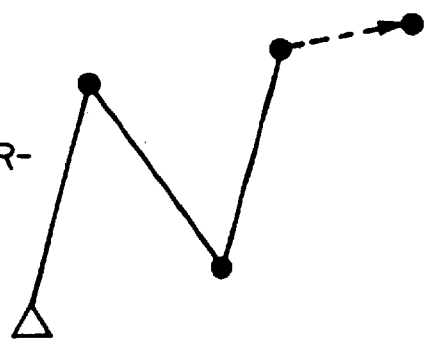
FIG. 2B illustrates various different examples of evaluation expressions.

In order to achieve a desired transformation of the skeleton model, the evaluation expression of this embodiment comprises factors such as variations in arc-to-arc angles, the distances between nodes and a given point, a variation in the direction of an arc having one end fixed, and a variation in the node coordinates or variation in the velocity of the node coordinates. More specifically, various conditions can be added to the evaluation expression, as shown in FIG. 2B. For example, it is possible to have all arc-to-arc angles vary uniformly by including variations in arc-to-arc angles into the evaluation expression and minimizing the sum-of-squares of these variations in arc-to-arc angles. It is also possible to set an appropriate shape as an initial state for the start of a transformation, and thus implement a well-balanced transformation of the shape of the skeleton model, by including distances between nodes and a given point into the evaluation expression and setting rubber-banding (which will be described later). Similarly, it is possible to prevent indefinite solutions by including a variation in the direction of an arc having one end fixed and variations in node coordinates into the evaluation expression, and setting rotational dampers for arcs rotating about fixed nodes and node dampers. It is furthermore possible to prevent uncoordinated motion of arcs, caused by instability in the calculations, by including variations in node coordinates and variation in the velocity of node coordinates into the evaluation expression, and setting node dampers and node inertias.

<4> Updating of Basic Equations and Evaluation Expression in Each Iterative Loop Two usage methods are considered for this embodiment: real-time and non-real-time. For non-real-time usage, the calculations are sufficiently converged so that the shape of the skeleton model can be updated. For real-time usage, however, it is necessary to have sufficient followability with respect to the user's input.

Figure 3A:
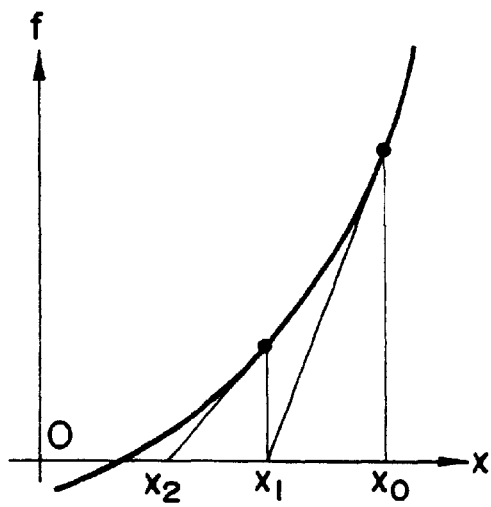
FIG. 3A illustrates a description of a Newtonian method.

With this embodiment, a solution for the basic variables is obtained by iterative calculations using a Newtonian method or the like, as shown in FIG. 3A, and also at least one of the set of basic equations and the evaluation expression is varied successively in accordance with the given information, in synchronization with the end or start of each iterative loop.

Figure 3B:
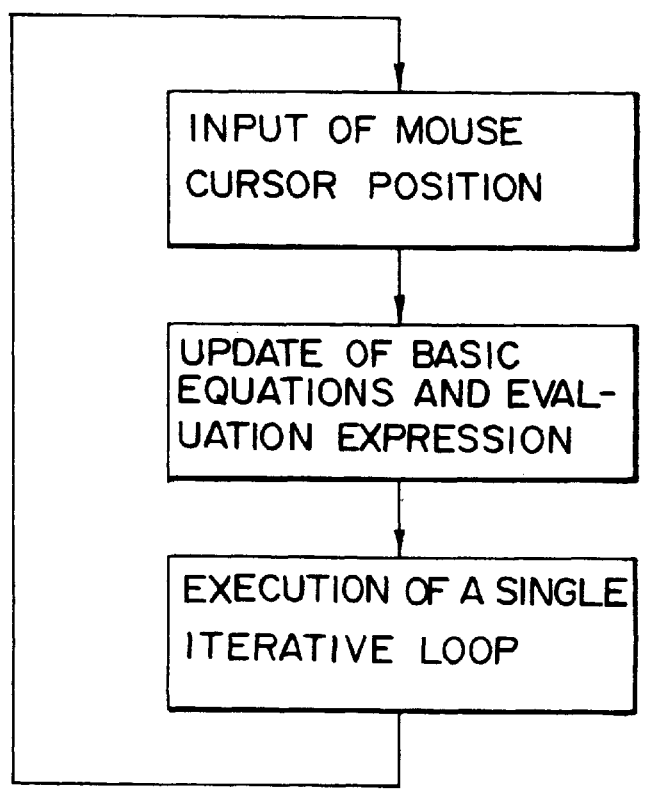
FIG. 3B illustrates a description of a method of varying basic equations or the like in each iteration of an iterative loop.

During the calculation processing, the process from obtaining the coordinates of the mouse cursor, transforming the skeleton model accordingly, and up until that result is displayed, for example, is called one event cycle. Since the user is causing the position of a picked node to move by dragging the mouse in real-time, the volume of calculations during one event cycle required for the consequent transformation of the skeleton model must be as small as possible. In this embodiment, only a single iterative loop in iterative calculations is executed within one event cycle while the user is dragging the mouse. More specifically, when the coordinates of the mouse cursor position are obtained, known values in the basic equations and evaluation expression, as well as the form of the equations and the expression themselves, can be varied in accordance with those position coordinates, and only a single iterative loop is executed, as shown in FIG. 3B.

In this method, a problem that the length of an arc is extended beyond its original length and the like occurs, since the calculations cannot converge while the mouse is being dragged and the basic equations cannot be satisfied. However, the magnitude of this length extension is not high enough to cause problems in practice. When the shape of the skeleton model is being subtly adjusted, the movement of the mouse could be slowed so that the skeleton model is transformed into a shape which is close to a correct shape that is obtained when the calculations converge. If the movement of the mouse stops, the calculations converge and a correct shape can be obtained for the skeleton model.

Note that this embodiment performs scaling compensation if the variation of a variable is too great within one loop of the iterative calculations. This makes it possible to prevent the skeleton model achieving an unnatural shape, even if the above described method is used to vary the basic equations and evaluation expression in each iterative loop. Although the above description stated that the basic equations and the like are modified in each iterative loop, it should be noted that this invention is not limited thereto and thus the basic equations and the like could be modified every two iterative loops or every three iterative loops, for example. In other words, the basic equations and the like could be modified successively at least at the start or end of each iterative loop.

<5> Fixed Node and Fixed Arc-Normal Vector

In this embodiment, coordinates of a fixed node or components of a fixed arc-normal vector are handled as known values. An example of the transformation of the shape of a skeleton model 52 in accordance with this embodiment is shown in FIG. 4. In this model, nodes 54 and 56 are fixed nodes. A node 58 is a node that the user has picked, and the user transforms the shape of the skeleton model by dragging the mouse to cause the node 58 to move. The coordinates of the nodes 54 and 56 are known values in the basic equations, and the coordinates of the other nodes or the components of the arc-normal vector are unknowns to be obtained. Therefore, if the node 58 is moved, not only the node 58 of the skeleton model 52 but also the entire skeleton model 52 will be transformed smoothly.

Note that FIG. 4 shows an example in which nodes are fixed, but the directions in which arcs are orientated could also be fixed, in other words, the directions of their arc-normal vectors could also be fixed. In such a case, the components of fixed arc-normal vectors act as known values.

In the prior-art example shown in FIGS. 22A, 22B, and 22C, a fixed node is limited to being a root and a movable node is limited to being an effector. In this embodiment, however, the user can fix or move any desired node or arc freely, without having to be aware of parent-child relationships. This is because node coordinates or arc-normal vectors are used as basic variables in this embodiment, and all of the nodes and arcs can be handled uniformly.

<6> Rubber-Banding

Figure 5A:
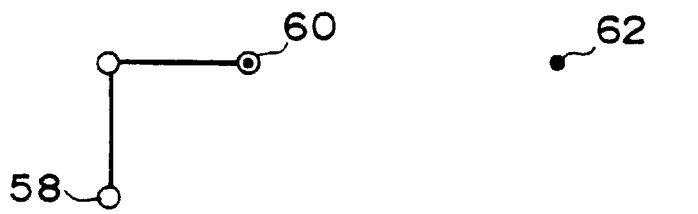
FIGS. 5A to 5E illustrate a description of rubber-banding.
Figure 5B:
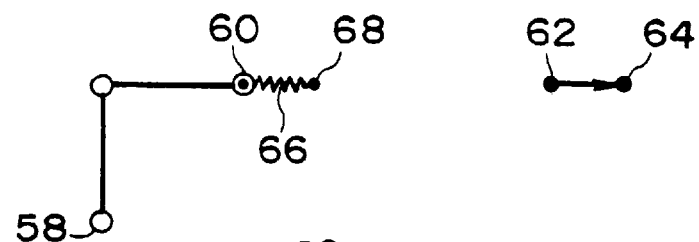
Figure 5C:
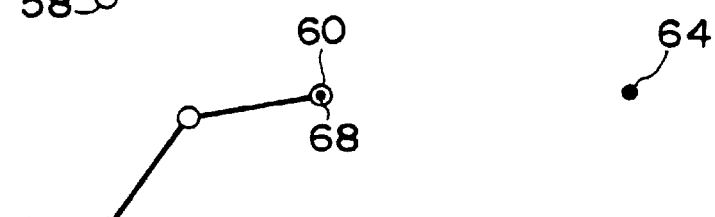

A concept called rubber-banding is introduced into this embodiment for transforming the shape of a skeleton model. In other words, if the coordinates of a given point that controls the shape transformation of a skeleton model have changed, the shape of the skeleton model is transformed in such a manner that a rubber-band minimizes the distance between each node and that given point. Consider what happens when the node 58 in FIG. 5A is fixed and a node 60 is moved. In this case, think of a rubber-band having a root and a tip; the root moves with the movement of the mouse, and the tip is fixed at the picked node. In a state in which the user has clicked the mouse button but the mouse cursor still hasn't moved away from a point 62, the root and tip of the rubber-band are positioned at the node 60. When the user then drags the mouse to move the mouse cursor from the point 62 to another point 64, the root of a rubber-band 66 moves from the location of the node 60 to a point 68, as shown in FIG. 5B. During this time, the tip of the rubber-band 66 remains fixed at the location of the node 60. This rubber-band 66 has a tendency to contract. In other words, it tends to minimize the distance between the node 60 and the given point 68. This moves the node 60 towards the point 68, to transform the shape of the skeleton model.

Note that if rubber-banding is used for the movement of the node 58 in FIG. 4, the coordinates of the node 58 will become unknowns. On the other hand, the coordinates of the node 58 become known values if the user moves the node 58 directly without rubber-banding or if the coordinates of the node 58 are changed in accordance with previously prepared data.

Figure 5D:
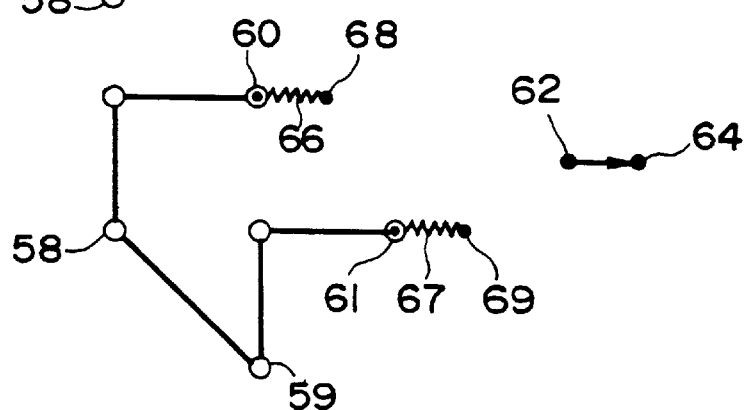
Figure 5E:
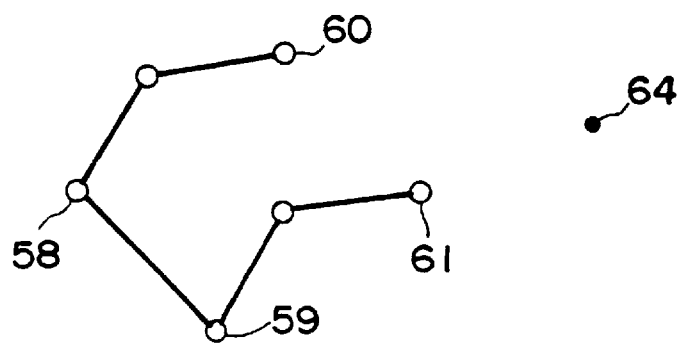
Figure 6:
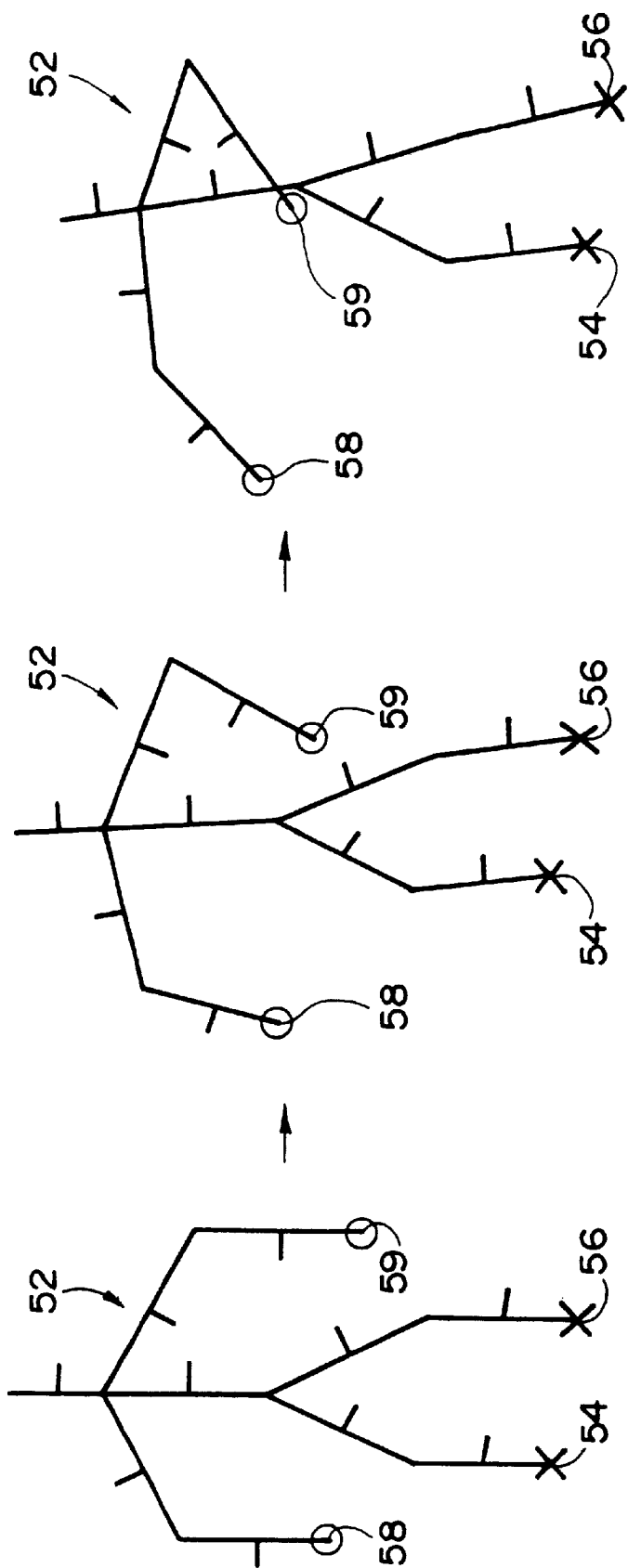
FIG. 6 shows an example of the picking of two nodes and the resultant shape transformations of a skeleton model.

In this embodiment, two or more nodes such as nodes 58 and 59 can be made to move simultaneously, as shown in FIG. 6. In such a case, two rubber-bands 66 and 67 are created, as shown in FIGS. 5D and 5E, and the rubber-bands 66 and 67 are transformed in such a manner that the distances between nodes 60 and 61 and given points 68 and 69 are minimized.

Figure 7:
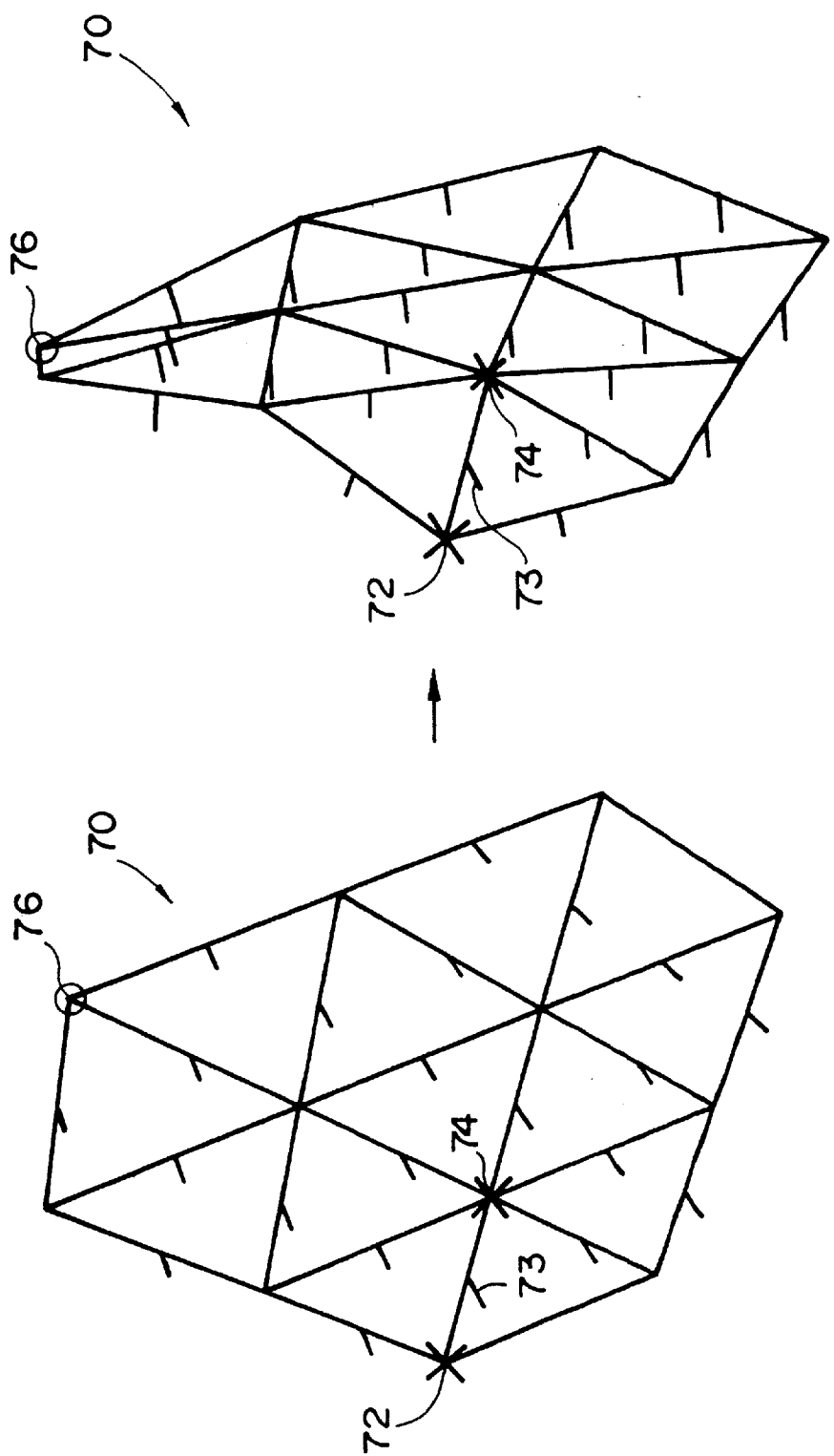
FIG. 7 shows an example of the shape transformation of a skeleton model having a complicated multiple-branching structure.

An example of the shape transformation of a skeleton model 70 having a more complicated multiple-branching structure is shown in FIG. 7. In this case, nodes 72 and 74 and an arc 73 are fixed, and a node 76 is moved with rubber-banding. The above implementation of this embodiment differs from the prior-art example in that the shape of a skeleton model can be transformed smoothly, without any complications due to the multiple-branching structure.

<7> Restrictive Conditions

<7>-1 Types of Restrictive Conditions

Various different restrictive conditions can be set by this embodiment to affect transformations of the shape of a skeleton model.

First of all, a restrictive condition that fixes the position of a node or the direction of an arc could be set by this embodiment, making is possible to handle the coordinates of the fixed node or the arc-normal vector of the fixed arc as known values, as described above.

Secondly, a restrictive condition that specifies the movability range of an angle between two arcs of the skeleton model could be set by this embodiment. For example, a discontinuous restrictive condition can be set in such a manner that the angle θ between two arcs 78 and 80 of a skeleton model 77 shown in FIGS. 8A and 8B does not exceed 180 degrees. In other words, it would seem unnatural for an elbow joint of a skeleton model to bend backwards during a shape transformation, and thus the usefulness to the user can be increased by setting such a restrictive condition. Note that this restrictive condition could be implemented by including into the evaluation expression an expression that restricts an angle between two arcs to within a given range.

Figure 9A:
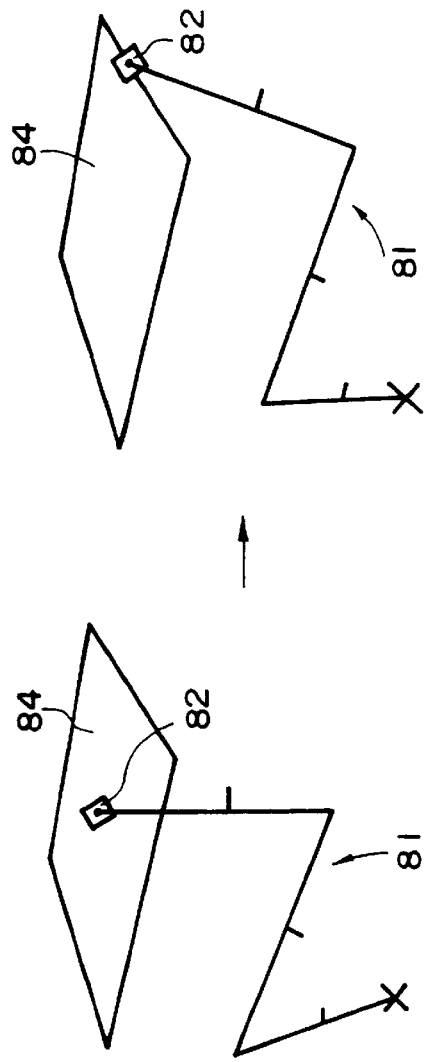
FIGS. 9A and 9B illustrate a description of a function for attaching a node to a polygon or edge.
Figure 9B:
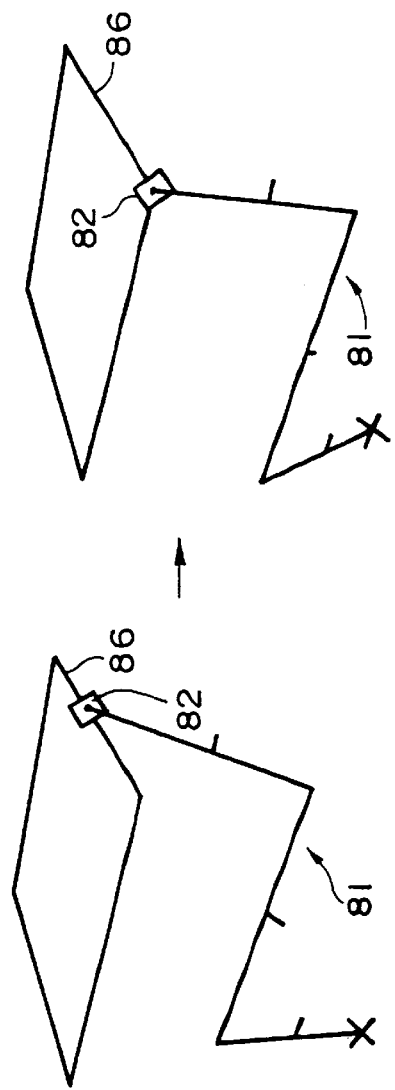

Thirdly, a condition could be set by this embodiment to restrict a node of the skeleton model to within a given surface or line, such as to within a polygon or the edges thereof. In the description below, an operation that restricts a specific node to a specified polygon or edge is called an attachment. Assume for example that the user has specified that a node 82 of a skeleton model 81 is attached to a polygon 84, as shown in FIG. 9A, or to an edge 86, as shown in FIG. 9B. A characteristic of this embodiment is the way in which the node 82 can be restricted to the polygon 84 or edge 86 in a discontinuous manner. In other words, the node 82 can move only within the surface of the polygon 84 in FIG. 9A; it cannot move beyond the edge of the polygon 84. Similarly, the node 82 can move only within the edge 86 in FIG. 9B; it cannot move beyond the vertexes thereof. This enables an increase in usefulness to the user, by making it possible to restrict a node discontinuously onto a polygon or edge.

Figure 10:
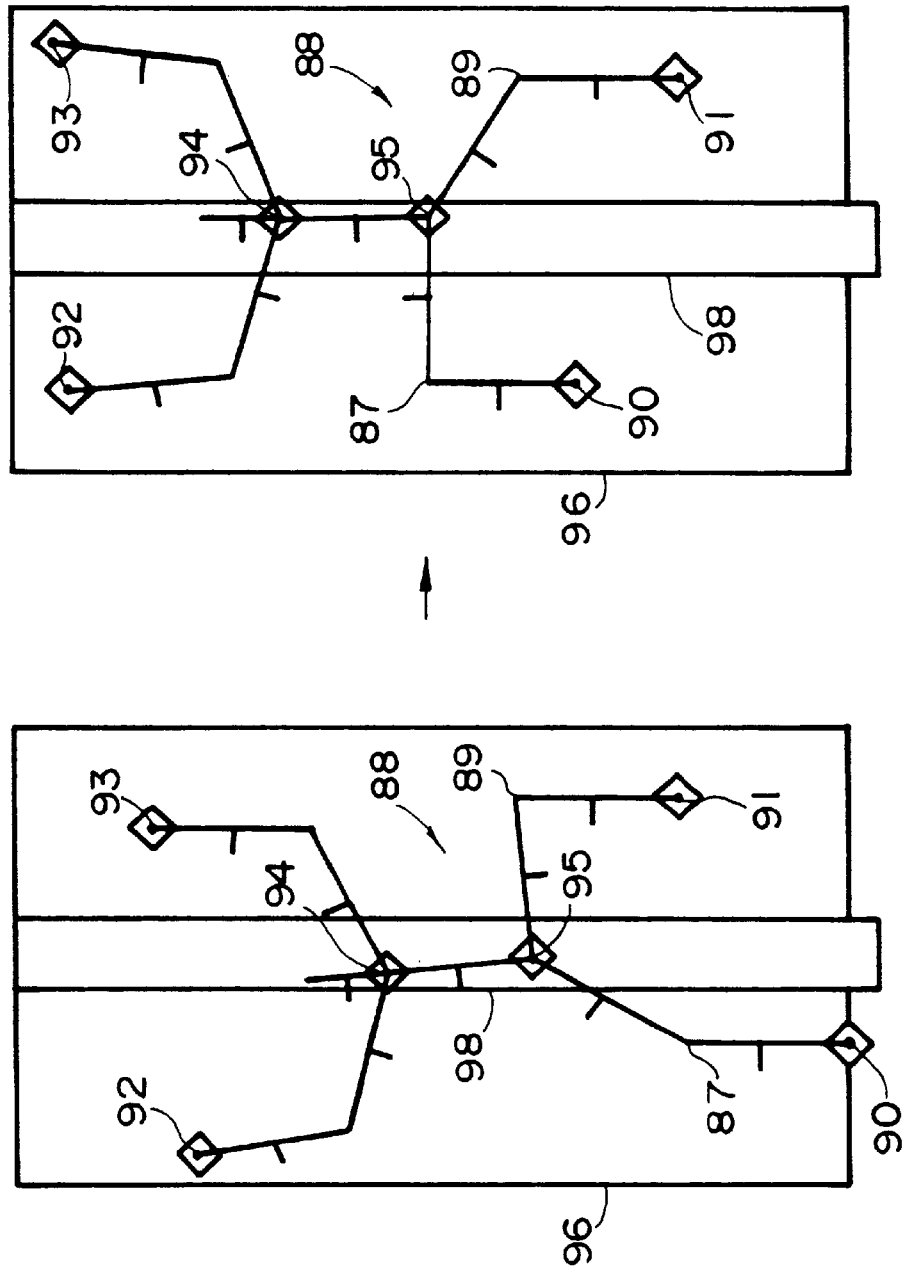
FIG. 10 illustrates a description of an example of the use of the attachment function to make a skeleton model climb a wall.
Figure 11:
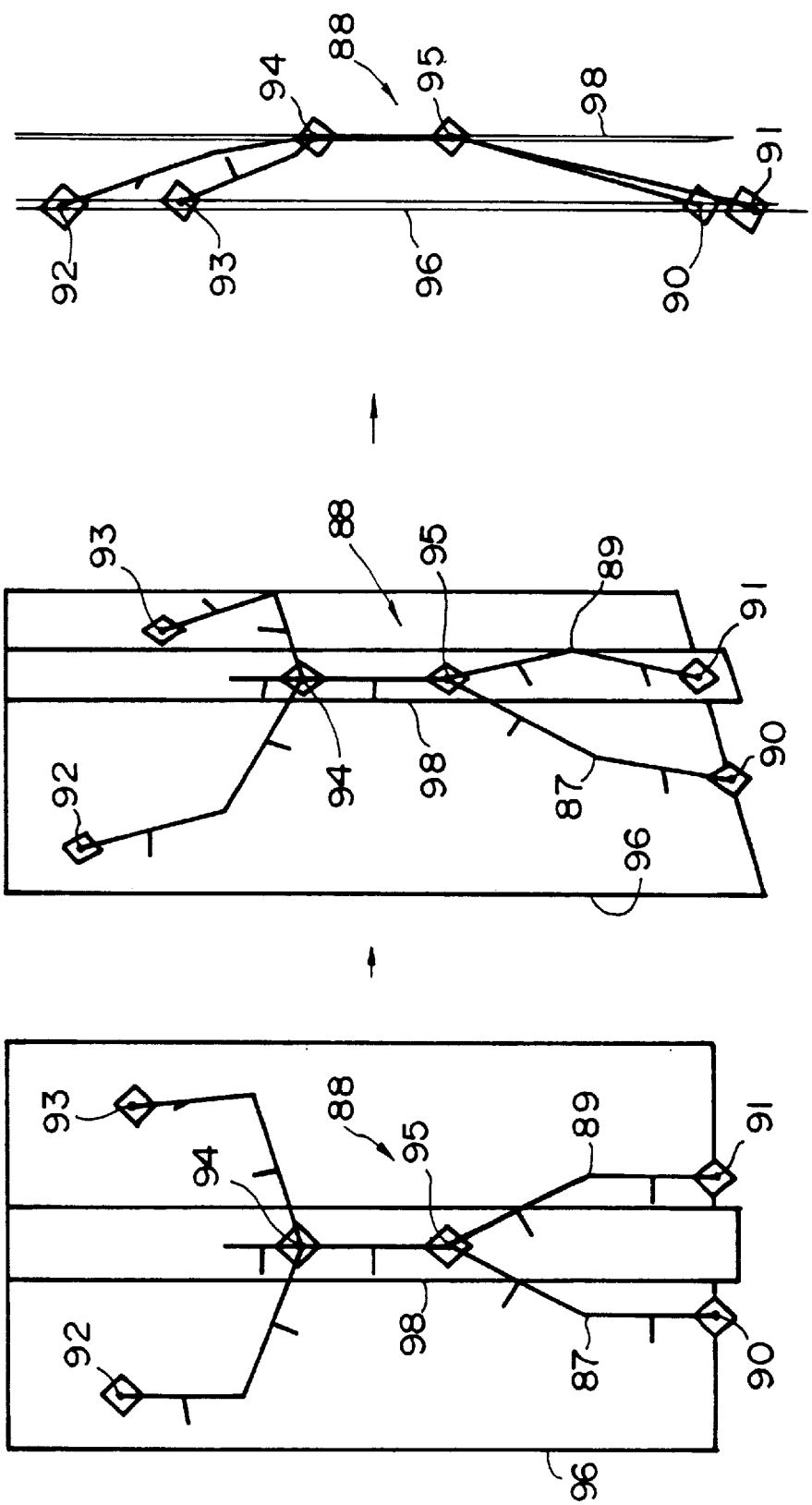
FIG. 11 further illustrates the description of this example of the use of the attachment function to make a skeleton model climb a wall.

An example of how the above described attachment function is used when making a skeleton model climb a wall is shown in FIG. 10. A skeleton model 88 has nodes 90, 91, 92, and 93 (corresponding to the ends of the arms and legs thereof) that are attached to a first wall object 96. Other nodes 94 and 95 (corresponding to the back of the skeleton model 88) are attached to a second wall object 98 that is positioned at a given spacing from the first wall object 96. The provision of the second wall object 98 in this manner makes it possible to transform the skeleton model 88 in a state in which the trunk thereof is held at a suitable distance from the first wall object 96. Note that FIG. 11 is also provided, to clarify the positional relationships between the skeleton model 88 and the first and second wall objects 96 and 98. In FIG. 10, the node 91 is attached to the first wall object 96 and also the coordinates thereof are fixed. The coordinates of a node 89 are also fixed. If the user then picks nodes 87 and 90 and moves them, the skeleton model 88 climbs the wall while undergoing a shape transformation that follows that movement. During this time, the nodes 92, 93, 94, and 95 are still attached to the corresponding first or second wall object 96 or 98, so the skeleton model moves while being restricted to within the surfaces of these wall objects.

Fourthly, a restrictive condition could be set by this embodiment to ensure that a skeleton model does not penetrate into or pass through an object when interaction occurs between the skeleton model and the object. If, for example, a skeleton model 100 representing a whip interacts with a circular cylindrical object 102, as shown in FIG. 12, the shape of the skeleton model 100 is transformed in such a manner that it wraps around the circular cylindrical object 102 without penetrating it. Such a restrictive condition can be implemented by comprising within the evaluation expression an expression that restricts the skeleton model to an object, when the skeleton model and the object interact with each other.

<7>-2 Improvements to Discontinuous Restrictive Condition

Figure 13A:
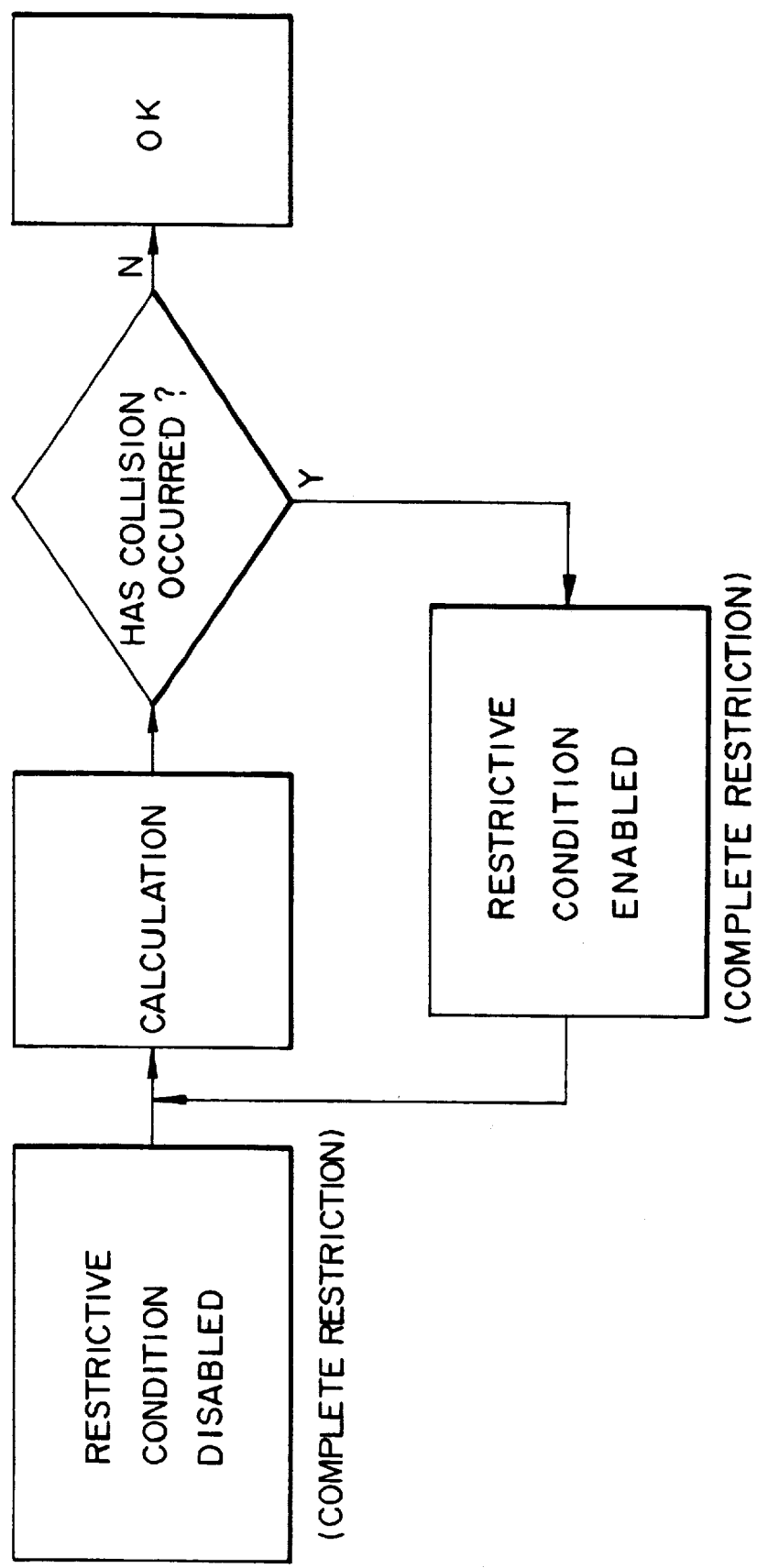
FIGS. 13A and 13B illustrate a description of a method of handling a restrictive condition.

There are some problems involved with the handling of a discontinuous restrictive condition, as described below. In the methods generally used up until now, a calculation is first done when the restrictive condition is in a disabled state (free) and if, for example, it is determined thereby that a node of the skeleton model and an object have hit each other, the calculation is re-done with the restrictive condition in a enabled state (the node is absolutely restricted to the object), as shown in FIG. 13A. If as a result of this calculation it is detected that another node has hit the object, the recalculation is done again. With this method, the node is absolutely restricted to the object when the restrictive condition is enabled. Therefore, the calculations must be performed initially with the restrictive condition disabled, to identify whether the user has moved the skeleton model in the direction of the object or in a direction away from the object. Conversely, if the calculations are done with the restrictive condition initially in an enabled state, the node is absolutely restricted to the object and thus it is impossible to identify in which direction the user is moving the object.

Use of the above described method makes it necessary to execute calculations with the restrictive condition disabled and iterative calculations for determining the restrictive condition, within one iterative loop. In other words, this iterative loop contains another iterative loop, making it a two-step iterative loop, which greatly reduces the processing speed.

Figure 13B:
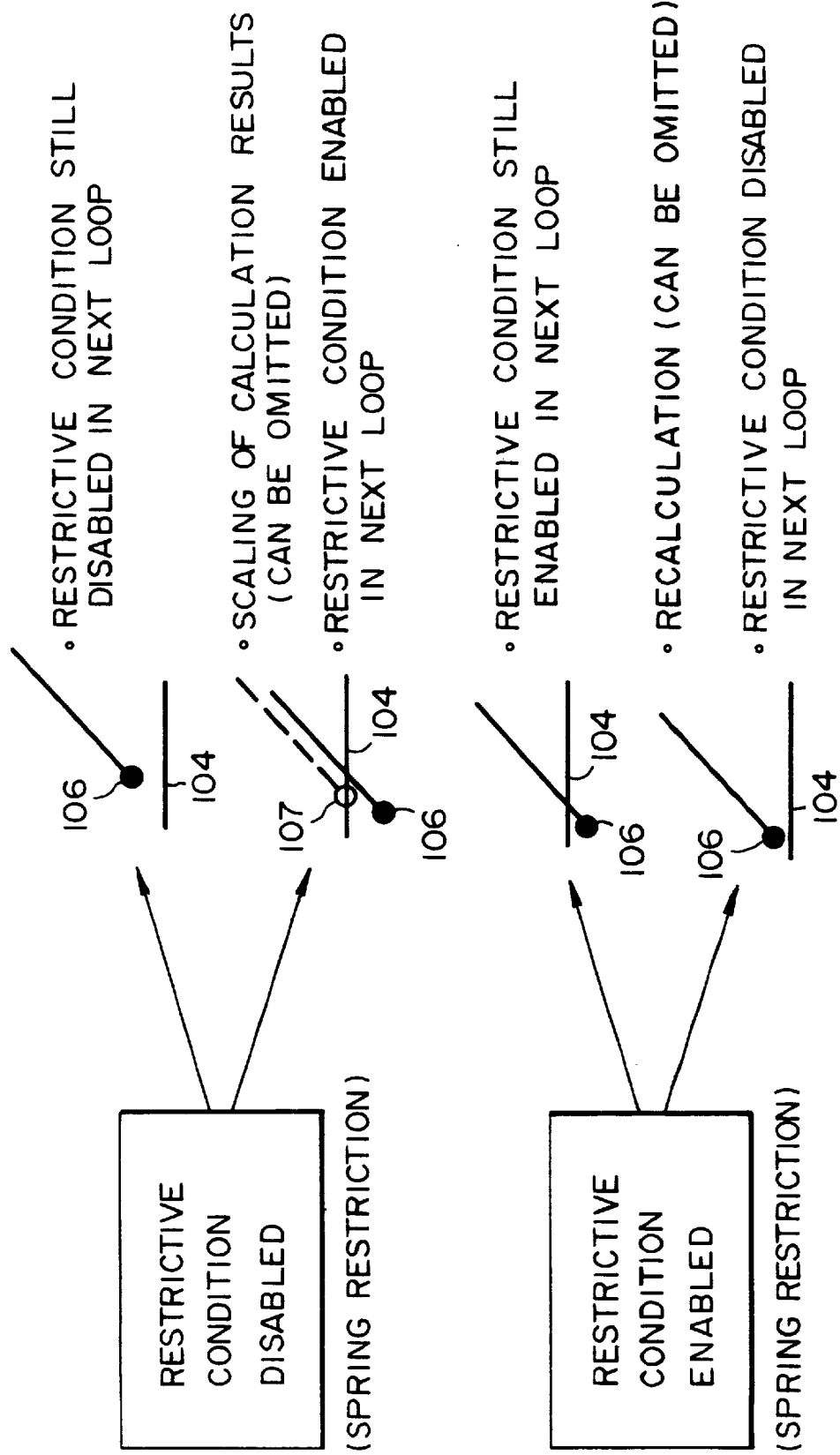

That is why this embodiment handles a discontinuous restrictive condition by a method that is shown in FIG. 13B. First of all, the transformation of a skeleton model (or an object that moves together therewith) is done under a restrictive condition that, if the skeleton model has passed a given boundary, the skeleton model is returned to within the boundary. In other words, this is a condition called a spring restriction in which the nodes and other components of the skeleton model are not absolutely restricted to the boundary when the restrictive condition is in an enabled state. This spring restriction makes it possible to determine whether the user is causing the skeleton model to move in a direction towards the boundary of an object or the like, or in a direction away from that boundary.

If the iterative loop that obtains the shape of the skeleton model is executed with the restrictive condition disabled, and a node 106 or an arc of the skeleton model does not pass a boundary 104, the calculation in the next iterative loop will be done with the restrictive condition still disabled.

On the other hand, if the iterative loop is executed with the restrictive condition disabled, and the node 106 or arc of the skeleton model does pass the boundary 104, it is possible to determine that the user is moving the skeleton model in the direction of the boundary 104 and thus the calculation in the next iterative loop is executed with the restrictive condition enabled. In this case, the calculation results are scaled to return the node 106 to a position 107.

If the iterative loop is executed with the restrictive condition enabled and the node 106 or arc passes the boundary 104, the restrictive condition remains enabled for the next iterative loop. Note that, since a powerful spring restriction is applied when the restrictive condition is enabled, the passing through the boundary 104 is so small, the user would be unaware of it.

If the iterative loop is executed with the restrictive condition enabled and the node 106 or arc does not pass the boundary 104, it can be determined that the user is moving the skeleton model in a direction away from the boundary 104, and thus the same calculation is done again with the restrictive condition disabled. Then, the calculation in the next iterative loop is executed with the restrictive condition disabled. Note, however, that since suitable calculation results can be obtained in this next iterative loop when the skeleton model is moving in a direction away from the boundary 104, recalculation thereof can be omitted.

Use of the above method to handle a discontinuous restrictive condition makes it possible to dramatically reduce the amount of processing required for calculations in the iterative loop, in comparison with the case shown in FIG. 13A, increasing the speed of processing.

Figure 18A:
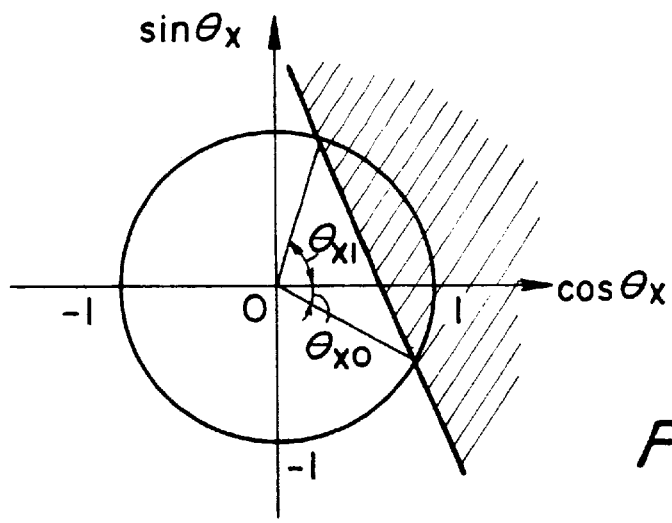
FIGS. 18A, 18B, and 18C illustrate a description of the setting of a movability range for arc-to-arc angles.

<7>-3 Substitution of Inequality Defining a Discontinuous Restrictive Condition into Equalities In this embodiment, an inequality (50) that defines a discontinuous restrictive condition is substituted by a first equality of (48) that have the same effect, as will be described later in details in Section <5> of the description of Algorithm 1 (setting of arc-to-arc angle range), with reference to FIGS. 18A to 18C. The domain of a first variable, such as an arc-to-arc angle, can be defined by the inequality (50), but the necessity of classifying the cases for solution makes the processing complicated when the inequality is used as the basic equations or evaluation expression. In such a case, this embodiment substitutes the first equality of (48) for the inequality (50). More specifically, this embodiment moves the terms of the inequality (50) to the left side (or right side) thereof and also inserts into the right side (or left side) thereof a function (such as $t_x^2$) which is a function of a new second variable (such as $t_x$) and which is constantly positive or constantly negative or constantly non-negative or constantly non-positive. The domain of the first variable is then defined by thus obtained first equality of (48), and the shape of the skeleton model is transformed accordingly. An equality can be more easily combined with the basic equations and evaluation expression than an inequality, making the processing of this embodiment easier.

Note that an expression comprising a variation in the second variable is preferably inserted, as will be described with reference to Expression (58) in Section <5>-2 of the description of Algorithm 1, to prevent the second variable from varying so large that the restrictive condition no longer functions. It is also preferable that a given value is added to the second variable before it converges to reduce the speed of response of the transformation of the skeleton model. This method of substituting an inequality with equalities can be applied to other discontinuous restrictive conditions, not just to a discontinuous restrictive condition that sets a movability range for arc-to-arc angle, such as one that sets an attachment of a node to a polygon or an edge, or one that sets an interaction between a skeleton model and another object.

<7>-4 Drag-Back Method

With this embodiment, as will be described later in section <7> of the description of Algorithm 1, a method called a "drag-back method" is used in the handling of discontinuous restrictive conditions. With this method, a first calculation step is executed within one iterative loop, in which a restrictive condition that restricts a node or arc of the skeleton model to a boundary at a polygon or edge is disabled. Next, a second calculation step is executed after this first calculation step, and within the same one iterative loop, to attract the node or arc to the boundary. This arrangement makes it possible to divide the calculations necessary within one iterative loop into only two parts, enabling a dramatic increase in processing speed over the prior-art method (shown in FIG. 13A) in which one iterative loop comprises another, separate, iterative loop.

Note that this first calculation step preferably operates a surface-perpendicular damper or line-perpendicular damper, as will be described later with reference to Expressions (62) and (65) in Sections <7>-1 and <7>-2 on Algorithm 1. In other words, an expression comprising an amount of movement in a boundary direction of a node or arc of a skeleton model is subjected to a process such as minimization. This makes it possible to prevent a situation in which a node or arc moves so far away from the boundary, it cannot be returned thereto. Note also that this second calculation step preferably operates a face magnet, line magnet, or point magnet, as will be described later in Sections <7>-3, <7>-4, and <7>-5 of the description of Algorithm 1. In other words, an expression comprising a distance between a node or arc and the boundary is subjected to a process such as minimization. This arrangement makes it possible to implement a return of the node or arc to the boundary in a simple manner. The drag-back method can also be applied to discontinuous restrictive conditions, not only to the discontinuous restrictive condition for attaching a node to a polygon or edge, but also to one for setting the movability range of arc-to-arc angles or one for setting an interaction between a skeleton model and another object.

<8> Singular Value Decomposition (Reconfiguration of Set of Simultaneous Equations)

With this embodiment, if a set of simultaneous equations is degenerate or in a state approximating thereto, a method can be used to reconfigure them into an independent new set of simultaneous equations, to obtain a solution, as will be described later in Section <4> of Algorithm 1, with reference to FIGS. 17B and 17C. If a set of simultaneous equations is in a degenerate state in which it comprises dependent equations, the solution thereof is indefinite and it is not possible to obtain a suitable shape transformation. As described with reference to $F_{ij}$ of Equations (4) in the section on Algorithm 1, it is particularly likely that such an indefinite solution will occur for an equation that defines the length of an arc, and this embodiment makes it possible to prevent such a situation from happening.

Two specific examples of the algorithm of this embodiment will now be described. Note that the meanings of the Σ-notations used in the description are given below. In these descriptions, "arc-to-arc angle" is referred to simply as "angle" and the two arcs that form that angle and the three nodes that are the end points of the two arcs are referred to as the "structural elements" of the angle.

$\sum_{node\ i} X_i$: Sum Total of $X$ for all nodes $\sum_{node\ i}^{N_i|C} X_i$: Sum Total of $X$ for nodes that satisfy condition $C$ $\sum_{arc\ ij} X_{ij}$: Sum Total of $X$ for all arcs $\sum_{arc\ ij}^{A_{ij}|C} X_{ij}$: Sum Total of $X$ for arcs that satisfy condition $C$ $\sum_{ang} X$: Sum Total of $X$ for all weighted angles $\sum_{arc\ ij}^{node\ i} X_{ij}$: Sum Total of $X$ for arcs around node $N_1$ $\sum_{ang}^{N_i \in ang} X$: Sum Total of $X$ for all angles that have node $N_1$ as a structural element $\sum_{ang}^{A_{ij} \in ang} X$: Sum Total of $X$ for all angles that have arc $A_{ij}$ as a structural element $\sum_{node\ i}^{N_i \in ang} X_i$: Sum Total of $X$ for nodes (three of them) that are structural elements of angle $\sum_{arc\ ij}^{A_{ij} \in ang} X_{ij}$: Sum Total of $X$ for arcs (two of them) that are structural elements of an angle The relationships between the sequence of indexes and the symbols are as follows:

$L_{ij} = L_{ji}, l_{ij} = l_{ji}$ $n_{ij} = n_{ji}, u_{ij} = u_{ji}, v_{ij} = v_{ji}, w_{ij} = w_{ji}$ $a_{ij} = -a_{ji}, x_{ij} = -x_{ji}, y_{ij} = -y_{ji}, z_{ij} = -z_{ji}, b_{ij} = -b_{ji}$ $s_{ij} = -s_{ji}, s_{xij} = -s_{xji}, s_{yij} = -s_{yji}, s_{zij} = -s_{zji}$ $\rho_{ij} = -\rho_{ji}$ $p_{ij} = p_{ji}, q_{ij} = q_{ji}, r_{ij} = r_{ji}$ $f_{ij} = f_{ji}, g_{ij} = g_{ji}, h_{ij} = -h_{ji}$ $F_{ij} = F_{ji}, G_{ij} = G_{ji}, H_{ij} = -H_{ji}$ $\alpha_{ij} = \alpha_{ji}, \beta_{ij} = \beta_{ji}, \gamma_{ij} = -\gamma_{ji}$ 2 Algorithm 1

<1> Basic Equations

Figure 14:
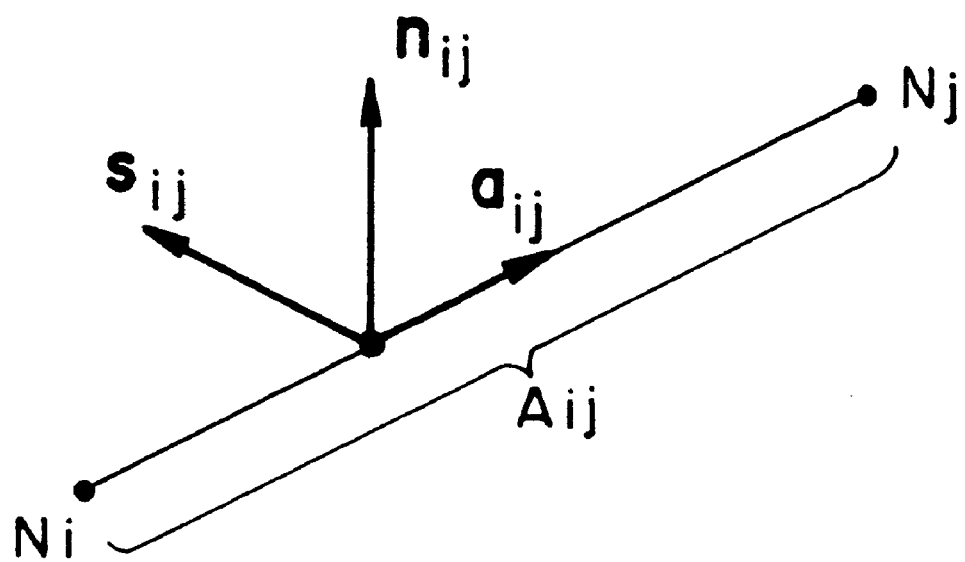
FIG. 14 illustrates the relationships between an arc, nodes, and arc-normal vectors.

Assume that the coordinates of a node $N_i$ in FIG. 14 are $(x_i, y_i, z_i)$. In order to express the rotation of an arc therefrom within a three-dimensional space, an arc-normal vector is provided. Assume that the normal vector of an arc $A_{ij}$ (the arc that links node $N_i$ to node $N_j$) is $n_{ij}(u_{ij}, v_{ij}, w_{ij})$. In this embodiment, these basic variables are used to represent the shape of a skeleton model. The following basic equations hold for each arc:

$$f_{ij} \equiv [(x_j - x_i)^2 + (y_j - y_i)^2 + (z_j - z_i)^2 - L_{ij}^2]/\lambda^2 = 0 \quad (1)$$

$$g_{ij} \equiv u_{ij}^2 + v_{ij}^2 + w_{ij}^2 - 1 = 0$$

$$h_{ij} \equiv [(x_j - x_i)u_{ij} + (y_j - y_i)v_{ij} + (z_j - z_i)w_{ij}]/\lambda = 0$$

The first equation means that the length of the arc $A_{ij}$ is $L_{ij}$. The second equation means that the magnitude of the normal vector is 1. The third equation means that the arc-normal vector and the arc are mutually perpendicular. A scaling factor $\lambda$ is used to ensure that equations for a first skeleton model can be the same with equations for a second skeleton model that has a similar figure of the first skeleton model. In other words, if the shape of a first skeleton model has been transformed, a similar form is obtained for a second skeleton model of twice the size, when the shape thereof is transformed by twice the above amount. The average of the lengths of the arcs in each skeleton model is used as $\lambda$.

<2> Method of Solving Basic Equations

When a user has picked a node for movement, it is necessary to derive the coordinates of the other nodes and the values of the normal vectors of arcs that are associated therewith, during the process of causing a skeleton to move by inverse kinematics. These values are obtained as solutions of Equations (1). However, Equations (1) consist of non-linear expressions, and the number of equations therein is less than the number of variables. This is where a combination of the Newtonian method and the Lagrangian multiplier method is used for a solution.

Note that the indexes of variables are omitted from the discussion below, unless it is particularly necessary to specify them.

<2>-1 Application of Newtonian Method

The variation of each variable in each loop is defined as follows:

$$\xi_i \equiv \Delta x_i, \eta_i \equiv \Delta y_i, \zeta_i \equiv \Delta z_i$$

$$p_{ij} \equiv \Delta u_{ij}, q_{ij} \equiv \Delta v_{ij}, r_{ij} \equiv \Delta w_{ij} \quad (2)$$

If the Newtonian method is applied to the above basic Equations (1), the following equations are obtained:

$$\sum_{node\ k} \left( \frac{\partial f_{ij}}{\partial x_k} \xi_k + \frac{\partial f_{ij}}{\partial y_k} \eta_k + \frac{\partial f_{ij}}{\partial z_k} \zeta_k \right) + \quad (3)$$

$$\sum_{arc\ kl} \left( \frac{\partial f_{ij}}{\partial u_{kl}} p_{kl} + \frac{\partial f_{ij}}{\partial v_{kl}} q_{kl} + \frac{\partial f_{ij}}{\partial w_{kl}} r_{kl} \right) = -f_{ij}$$

$$\sum_{node\ k} \left( \frac{\partial g_{ij}}{\partial x_k} \xi_k + \frac{\partial g_{ij}}{\partial y_k} \eta_k + \frac{\partial g_{ij}}{\partial z_k} \zeta_k \right) +$$

$$\sum_{arc\ kl} \left( \frac{\partial g_{ij}}{\partial u_{kl}} p_{kl} + \frac{\partial g_{ij}}{\partial v_{kl}} q_{kl} + \frac{\partial g_{ij}}{\partial w_{kl}} r_{kl} \right) = -g_{ij}$$

$$\sum_{node\ k} \left( \frac{\partial h_{ij}}{\partial x_k} \xi_k + \frac{\partial h_{ij}}{\partial y_k} \eta_k + \frac{\partial h_{ij}}{\partial z_k} \zeta_k \right) +$$

$$\sum_{arc\ kl} \left( \frac{\partial h_{ij}}{\partial u_{kl}} p_{kl} + \frac{\partial h_{ij}}{\partial v_{kl}} q_{kl} + \frac{\partial h_{ij}}{\partial w_{kl}} r_{kl} \right) = -h_{ij}$$

These equations can be re-arranged as follows:

$$F_{ij} \equiv [(x_j - x_i)\xi_i - (x_j - x_i)\xi_j + (y_j - y_i)\eta_i - (y_j - y_i)\eta_j + \quad (4)$$
$$(z_j - z_i)\zeta_i - (z_j - z_i)\zeta_j]/\lambda^2 - f_{ij}/2 = 0$$

$$G_{ij} \equiv u_{ij}p_{ij} + v_{ij}q_{ij} + w_{ij}r_{ij} + g_{ij}/2 = 0$$

$$H_{ij} \equiv [-u_{ij}\xi_i + u_{ij}\xi_j - v_{ij}\eta_i + v_{ij}\eta_j - w_{ij}\zeta_i + w_{ij}\zeta_j +$$
$$(x_j - x_i)p_{ij} + (y_j - y_i)q_{ij} + (z_j - z_i)r_{ij}]/\lambda + h_{ij} = 0$$

Since the number of equations in (4) is less than the number of variables, it is not possible to determine a unique solution from them alone. A solution is obtained by adding a minimization condition and applying the Lagrangian multiplier method, as described below.

Note that in this embodiment the basic equations are varied in each iterative loop by the cursor position set by a mouse, as previously described with reference to FIG. 3B.

<2>-2 Application of Lagrangian Multiplier Method

An evaluation expression involving $U_1$, $U_2$, $U_3$, . . . is prepared, a condition that minimizes this sum total is added to Equations (4), and the Lagrangian multiplier method is used to obtain $\xi$, $\eta$, $\zeta$, p, q, and r. The terms $U_k$ will be defined later. Indeterminate multipliers $\alpha_{ij}$, $\beta_{ij}$, and $\gamma_{ij}$ are inserted so that U is defined as follows:

$$U \equiv \sum_{\text{arc } ij}(\alpha_{ij}F_{ij} + \beta_{ij}G_{ij} + \gamma_{ij}H_{ij}) + \sum U_k \quad (5)$$

Equations (4) and Equations (6) below are linked to obtain solutions for $\xi$, $\eta$, $\zeta$, p, q, and r.

$$\frac{\partial U}{\partial \xi_i} = 0, \quad \frac{\partial U}{\partial \eta_i} = 0, \quad \frac{\partial U}{\partial \zeta_i} = 0 \quad (6)$$

$$\frac{\partial U}{\partial p_{ij}} = 0, \quad \frac{\partial U}{\partial q_{ij}} = 0, \quad \frac{\partial U}{\partial r_{ij}} = 0$$

Based on the thus obtained solutions, new values of x, y, z, u, v, and w are obtained from Expression (7) below, ending the calculations for one iterative loop of the Newtonian method.

x+ξ→x, y+η→y, z+ζ→z u+p→u, v+q→v, w+r→w       (7)

<3> Creation of Evaluation Expression

As described previously, when applying the Lagrangian multiplier method it is necessary to prepare an evaluation expression that is to be minimized. In this case, an evaluation expression is created to ensure that the skeleton model undergoes a pleasing transformation.

<3>-1 Sum-of-Squares of Arc-to-Arc Angle Variations

Assume that the sum-of-squares of variations in the arc-to-arc angles (joint angles) is $U_1$. Minimizing $U_1$ assures that all of the joints curve in a well-balanced manner. Differences in the ease of curvature of each joint can be applied by assigning different weightings to each component of the arc-to-arc angles.

<3>-1-1 Arc-to-Arc Angles and Rotational Matrix

Figure 15:
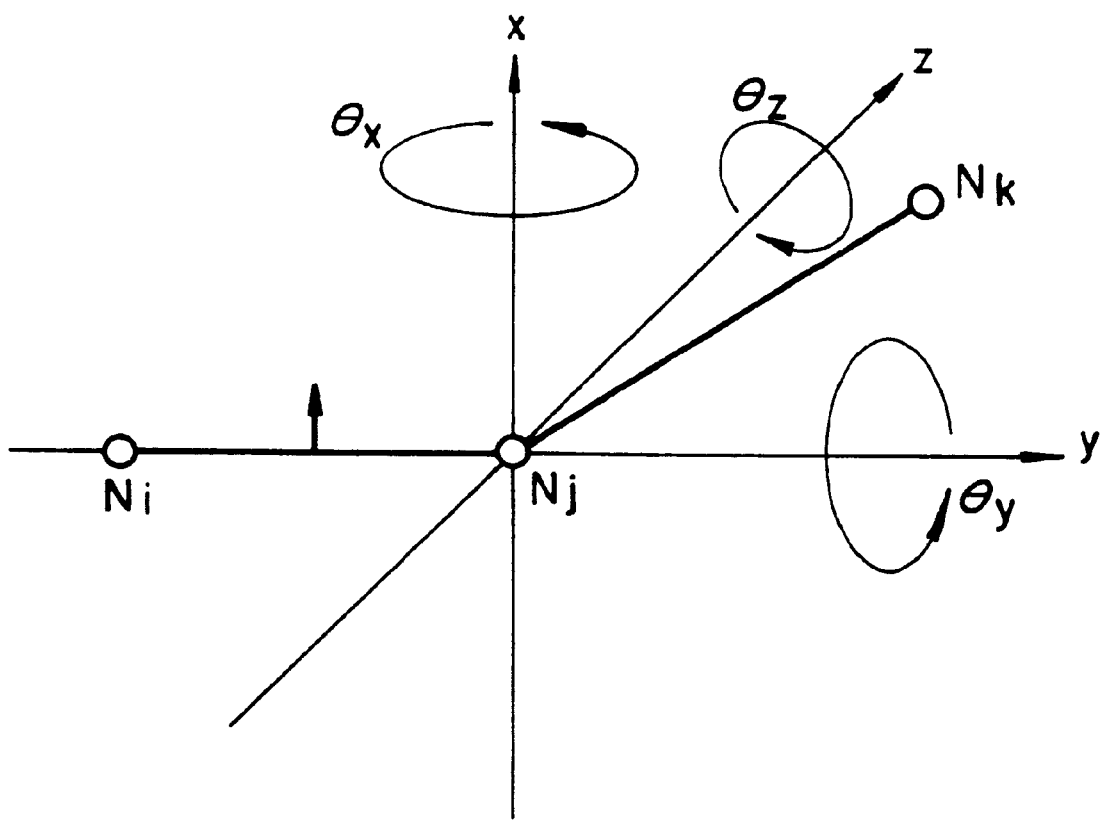
FIG. 15 illustrates a description of an arc coordinate system.

A rotational matrix $M_{ij}$ for converting from a world coordinate system to a coordinate system for the arc $A_{ij}$ is expressed as shown below. Note that the coordinate system for the arc $A_{ij}$ is a right-handed system in which the direction of the arc-normal vector is taken as the x-axis and the direction from node $N_i$ to node $N_j$ is taken as the y-axis, as shown in FIG. 15. Note also that the arrangement of matrix elements is in accordance with a method in which the matrix is multiplied from the left with respect to column vectors.

$$M_{ij} = \begin{pmatrix} u_{ij} & x_{ij} & s_{xij} \\ v_{ij} & y_{ij} & s_{yij} \\ w_{ij} & z_{ij} & s_{zij} \end{pmatrix} \quad (8)$$

$$x_{ij} \equiv (x_j - x_i)/l_{ij}, \quad y_{ij} \equiv (y_j - y_i)/l_{ij}, \quad z_{ij} \equiv (z_j - z_i)/l_{ij} \quad (9)$$

$$l_{ij} \equiv \sqrt{(x_j - x_i)^2 + (y_j - y_i)^2 + (z_j - z_i)^2}$$

$$s_{xij} \equiv v_{ij}z_{ij} - w_{ij}y_{ij} \quad (10)$$
$$s_{yij} \equiv w_{ij}x_{ij} - u_{ij}z_{ij}$$
$$s_{zij} \equiv u_{ij}y_{ij} - v_{ij}x_{ij}$$

A rotational matrix for converting from the coordinate system for the arc $A_{ij}$ to the coordinate system for the arc $A_{jk}$ is $M_{ijk}$, as follows:

$$M_{ijk} \equiv \begin{pmatrix} a_{ijk00} & a_{ijk01} & a_{ijk02} \\ a_{ijk10} & a_{ijk11} & a_{ijk12} \\ a_{ijk20} & a_{ijk21} & a_{ijk22} \end{pmatrix} \equiv \begin{pmatrix} a_{00} & a_{01} & a_{02} \\ a_{10} & a_{11} & a_{12} \\ a_{20} & a_{21} & a_{22} \end{pmatrix} \quad (11)$$

Note that the indexes "$_{ijk}$" are omitted unless it is particularly necessary to specify them.

$M_{ijk}$ is expressed as follows:

$$M_{ijk} = M_{ij}^{-1}M_{jk} = \begin{pmatrix} u_{ij} & v_{ij} & w_{ij} \\ x_{ij} & y_{ij} & z_{ij} \\ s_{xij} & s_{yij} & s_{zij} \end{pmatrix} \begin{pmatrix} u_{jk} & x_{jk} & s_{xjk} \\ v_{jk} & y_{jk} & s_{yjk} \\ w_{jk} & z_{jk} & s_{zjk} \end{pmatrix} \quad (12)$$

If the angles of rotation from the coordinate system for the arc $A_{ij}$ to the coordinate system for the arc $A_{jk}$ are taken to be $\theta_x$, $\theta_y$, and $\theta_z$ and the rotational sequence thereof is the y-axis, the x-axis, then the z-axis, the matrix $M_{ijk}$ can be expressed as follows:

$$M_x = \begin{pmatrix} 1 & 0 & 0 \\ 0 & \cos\theta_x & -\sin\theta_x \\ 0 & \sin\theta_x & \cos\theta_x \end{pmatrix} \quad (13)$$

$$M_y = \begin{pmatrix} \cos\theta_y & 0 & \sin\theta_y \\ 0 & 1 & 0 \\ -\sin\theta_y & 0 & \cos\theta_y \end{pmatrix}$$

$$M_z = \begin{pmatrix} \cos\theta_z & -\sin\theta_z & 0 \\ \sin\theta_z & \cos\theta_z & 0 \\ 0 & 0 & 1 \end{pmatrix}$$

$$M_{ijk} = M_y M_x M_z = \begin{pmatrix} \cdots & \cdots & \cos\theta_x\sin\theta_y \\ \cos\theta_x\sin\theta_z & \cos\theta_x\cos\theta_z & -\sin\theta_x \\ \cdots & \cdots & \cos\theta_x\cos\theta_y \end{pmatrix} \quad (14)$$

Therefore, Expressions (11), (12), and (14) lead to the following:

$$a_{01} = u_{ij}x_{jk} + v_{ij}y_{jk} + w_{ij}z_{jk} \quad (15)$$

$$a_{02} = u_{ij}s_{xjk} + v_{ij}s_{yjk} + w_{ij}s_{zjk} = \cos\theta_x\sin\theta_y$$

-continued $$a_{10} = x_{ij}u_{jk} + y_{ij}v_{jk} + z_{ij}w_{jk} = \cos\theta_x \sin\theta_z$$

$$a_{11} = x_{ij}x_{jk} + y_{ij}y_{jk} + z_{ij}z_{jk} = \cos\theta_x \cos\theta_z$$

$$a_{12} = x_{ij}s_{xjk} + y_{ij}s_{yjk} + z_{ij}s_{zjk} = -\sin\theta_x$$

$$a_{21} = s_{xij}x_{jk} + s_{yij}y_{jk} + s_{zij}z_{jk}$$

$$a_{22} = s_{xij}s_{xjk} + s_{yij}s_{yjk} + s_{zij}s_{zjk} = \cos\theta_x \cos\theta_y$$

<3>-1-2 Linear Expressions Relating to Angle Variations

Variations in $\theta_x$, $\theta_y$, and $\theta_z$ define each of $\phi_x$, $\phi_y$, and $\phi_z$ as follows:

$$\phi_x \equiv \Delta\theta_x,\ \phi_y \equiv \Delta\theta_y,\ \phi_z \equiv \Delta\theta_z \tag{16}$$

In this case, an attempt is made to express the relationships between $\phi_x$, $\phi_y$, and $\phi_z$ and $\xi_i$, $\eta_i$, $\zeta_i$, $p_{ij}$, $q_{ij}$, and $r_{ij}$ by first-degree approximations. Note that variations in $a_{mn}$ define $b_{mn}$ as follows:

$$b_{mn} \equiv \Delta a_{mn} (m=0,1,2\ n=0,1,2) \tag{17}$$

The value of $\phi_x$ is obtained by rearranging and differentiating Expressions (15):

$$\sin\theta_x = -a_{12} \tag{18}$$

$$\therefore \cos\theta_x \phi_x = -b_{12}$$

$$\therefore \phi_x = \frac{-1}{\sqrt{1-a_{12}^2}} b_{12}$$

Similarly, $\phi_y$ and $\phi_z$ are obtained as follows:

$$\tan\theta_y = \frac{a_{02}}{a_{22}} \tag{19}$$

$$\therefore \sec^2\theta_y \phi_y = \frac{1}{a_{22}^2}(a_{22}b_{02} - a_{02}b_{22})$$

$$\therefore \phi_y = \frac{1}{1 - a_{12}^2}(a_{22}b_{02} - a_{02}b_{22})$$

$$\tan\theta_z = \frac{a_{10}}{a_{11}} \tag{20}$$

$$\therefore \sec^2\theta_z \phi_z = \frac{1}{a_{11}^2}(a_{11}b_{10} - a_{10}b_{11})$$

$$\therefore \phi_z = \frac{-1}{\sqrt{1-a_{12}^2}}(a_{11}b_{10} - a_{10}b_{11})$$

The terms $b_{02}$, $b_{10}$, $b_{11}$, $b_{12}$, and $b_{22}$ are obtained from differentiation of Expressions (15), as follows:

$$b_{02} = -a_{01}s_{xjk}(\xi_k - \xi_j)/l_{jk} - a_{01}s_{yjk}(\eta_k - \eta_j)/l_{jk} - \tag{21}$$
$$a_{01}s_{zjk}(\xi_k - \zeta_j)/l_{jk} + s_{xjk}p_{ij} + s_{yjk}q_{ij} + s_{zjk}r_{ij} -$$
$$(v_{ij}z_{jk} - w_{ij}y_{jk})p_{jk} - (w_{ij}x_{jk} - u_{ij}z_{jk})q_{jk} -$$
$$(u_{ij}y_{jk} - v_{ij}x_{jk})r_{jk}$$

$$b_{10} = (u_{jk} - a_{10}x_{ij})(\xi_j - \xi_i)/l_{ij} + (v_{jk} - a_{10}y_{ij})(\eta_j - \eta_i)/l_{ij} + \tag{22}$$
$$(w_{jk} - a_{10}z_{ij})(\zeta_j - \zeta_i)/l_{ij} + x_{ij}p_{jk} + y_{ij}q_{jk} + z_{ij}r_{jk}$$

$$b_{11} = (x_{jk} - a_{11}x_{ij})(\xi_j - \xi_i)/l_{ij} + (x_{ij} - a_{11}x_{jk})(\xi_k - \xi_j)/l_{jk} + \tag{23}$$
$$(y_{jk} - a_{11}y_{ij})(\eta_j - \eta_i)/l_{ij} + (y_{ij} - a_{11}y_{jk})(\eta_k - \eta_j)/l_{jk} +$$
$$(z_{jk} - a_{11}z_{ij})(\zeta_j - \zeta_i)/l_{ij} + (z_{ij} - a_{11}z_{jk})(\zeta_k - \zeta_j)/l_{jk}$$

$$b_{12} = (s_{xjk} - a_{12}x_{ij})(\xi_j - \xi_i)/l_{ij} - a_{11}s_{xjk}(\xi_k - \xi_j)l_{jk} + \tag{24}$$
$$(s_{yjk} - a_{12}y_{ij})(\eta_j - \eta_i)/l_{ij} - a_{11}s_{yjk}(\eta_k - \eta_j)/l_{jk} +$$
$$(s_{zjk} - a_{12}z_{ij})(\zeta_j - \zeta_i)/l_{ij} - a_{11}s_{zjk}(\zeta_k - \zeta_j)/l_{jk} -$$
$$(y_{ij}z_{jk} - z_{ij}y_{jk})p_{jk} - (z_{ij}x_{jk} - x_{ij}z_{jk})q_{jk} -$$
$$(x_{ij}y_{jk} - y_{ij}x_{jk})r_{jk}$$

$$b_{22} = -a_{12}s_{xij}(\xi_j - \xi_i)/l_{ij} - a_{21}s_{xjk}(\xi_k - \xi_j)/l_{jk} - \tag{25}$$
$$a_{12}s_{yij}(\eta_j - \eta_i)/l_{ij} - a_{21}s_{yjk}(\eta_k - \eta_j)/l_{jk} -$$
$$a_{12}s_{zij}(\zeta_j - \zeta_i)/l_{ij} - a_{21}s_{zjk}(\zeta_k - \zeta_j)/l_{jk} +$$
$$(y_{ij}s_{zjk} - z_{ij}s_{yjk})p_{ij} - (s_{yij}z_{jk} - s_{zij}y_{jk})p_{jk} +$$
$$(z_{ij}s_{xjk} - x_{ij}s_{zjk})q_{ij} - (s_{zij}x_{jk} - s_{xij}z_{jk})q_{jk} +$$
$$(x_{ij}s_{yjk} - y_{ij}s_{xjk})r_{ij} - (s_{xij}y_{jk} - s_{yij}x_{jk})r_{jk}$$

Thus, the angle variations $\phi_x$, $\phi_y$, and $\phi_z$ can be expressed as linear expressions involving $\xi$, $\eta$, $\zeta$, $p$, $q$, and $r$.

<3>-1-3 Partial Differentiation of Sum-of-Squares of Angle Variations

The term $U_1$ is expressed as the sum-of-squares of arc-to-arc angle variations, as shown below. Note that $W_x$, $W_y$, and $W_z$ are weighting coefficients for adjusting the ease of curvature of the joint, where each term corresponds to rotations about the x-axis, y-axis, and z-axis, respectively.

$$U_1 = \sum_{ang} (W_x\phi_x^2 + W_y\phi_y^2 + W_z\phi_z^2) \tag{26}$$

Partial differentials of $\phi_x^2$, $\phi_y^2$, and $\phi_z^2$ are obtained as shown below, because they are necessary during the calculations of Equations (6). These are linear expressions involving $\xi$, $\eta$, $\zeta$, $p$, $q$, and $r$. Note, however, that $\omega$ is expressed in terms of the variables $\xi$, $\eta$, $\zeta$, $p$, $q$, and $r$.

$$\frac{\partial}{\partial \omega}\phi_x^2 = \frac{2}{1-a_{12}^2} \frac{\partial b_{12}}{\partial \omega} b_{12} \tag{27}$$

$$\frac{\partial}{\partial \omega}\phi_y^2 = \frac{2}{(1-a_{12}^2)^2}\left(a_{22}\frac{\partial b_{02}}{\partial \omega} - a_{02}\frac{\partial b_{22}}{\partial \omega}\right)(a_{22}b_{02} - a_{02}b_{22})$$

$$\frac{\partial}{\partial \omega}\phi_z^2 = \frac{2}{(1-a_{12}^2)^2}\left(a_{11}\frac{\partial b_{10}}{\partial \omega} - a_{10}\frac{\partial b_{11}}{\partial \omega}\right)(a_{11}b_{10} - a_{10}b_{11})$$

<3>-2-1 Necessity of Rubber-Banding

Figure 16A:
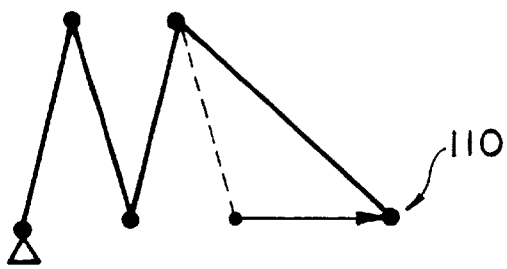
FIG. 16A to FIG. 16D illustrate a description of the effectiveness of rubber-banding.
Figure 16B:
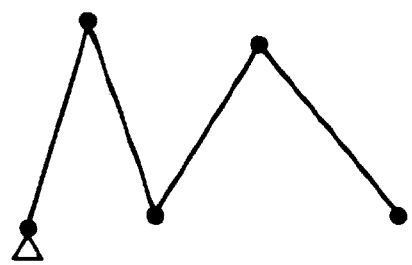
Figure 16C:
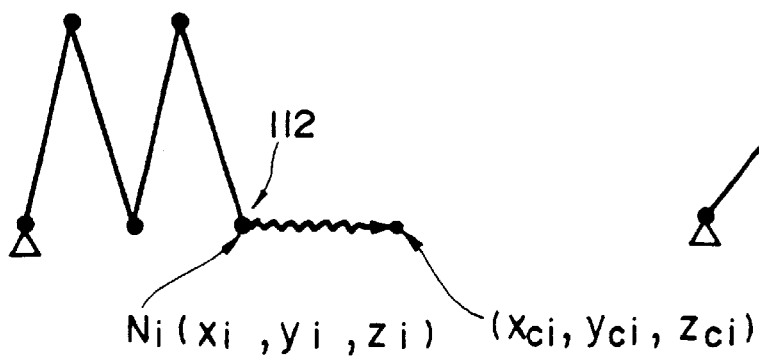
Figure 16D:
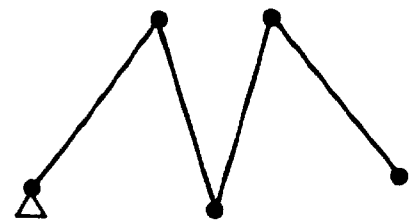

If a picked node $N_i$ is moved directly, the shape of the skeleton model will be transformed from the initial state shown in FIG. 16A to the ungainly shapes shown in FIG. 16B. In such a case, the node $N_i$ is made to move with rubber-banding, as described with reference to FIGS. 5A to 5E. A rubber-band is a virtual arc which tends to contract. One end of the rubber-band is connected to the node $N_i$ ($x_i$, $y_i$, $z_i$) and the other end ($x_{ci}$, $y_{ci}$, $z_{ci}$) is moved together with the movement of the mouse cursor. This makes it possible to transform the shape of the skeleton model from the initial state shown in FIG. 16C to obtain the preferable shape shown in FIG. 16D. With the motion shown in FIGS. 16A and 16B, iterative calculations are started with the picked node having an initial state at a point 110. In contrast, the iterative calculations for the motion shown in FIGS. 16C and 16D are started with the initial state at a point 112.

<3>-2-2 Setting of Rubber-Banding

The contractibility of a rubber-band can be expressed by adding the term $U_2$, defined below, to the evaluation expression U. $W_r$ is a weighting coefficient for expressing the strength of this contractibility and $N_{pick}$ is the number of picked nodes.

$$U_2 = \frac{1}{N_{pick}} \sum_{node\ i}^{N_i|pick} U_{2i} \quad (28)$$

By adding $U_2$ to the evaluation expression, the skeleton model can be transformed in such a way that the sum-of-squares of the distances between the picked nodes and other end ($x_{ci}$, $y_{ci}$, $z_{ci}$) of the rubber-band is minimized. Furthermore, as previously described with reference to FIGS. 5D, 5E, and 6, or with reference to Expression (28), a plurality of nodes can be made to move with rubber-banding by this embodiment.

The partial differentials of $U_{2i}$ are as follows:

$$\frac{\partial U_{2i}}{\partial \xi_i} = \frac{2W_r}{\lambda^2}(\xi_i + x_i - x_{ci}) \quad (30)$$

$$\frac{\partial U_{2i}}{\partial \eta_i} = \frac{2W_r}{\lambda^2}(\eta_i + y_i - y_{ci})$$

$$\frac{\partial U_{2i}}{\partial \zeta_i} = \frac{2W_r}{\lambda^2}(\zeta_i + z_i - z_{ci})$$

<3>-2-3 Setting of Rubber-Banding Limits

If the mouse is dragged so far that a rubber-band is stretched too much, the Newtonian method calculations could fail to converge and the motion of the skeleton model could become uncoordinated. If the length $l_{rub}$ of the rubber-band exceeds a given value $l^*_{rub}$ in such a case, $W_r$ is multiplied by $l^*_{rub}/l_{rub}$ to compensate for the tension of the rubber-band. Furthermore, if a plurality of nodes are picked, the total rubber-band tension could become too large and so there is a division by $N_{pick}$ in Expression (28) to compensate therefor.

<3>-3 Rotation of Arc about Fixed Node

Figure 17A:
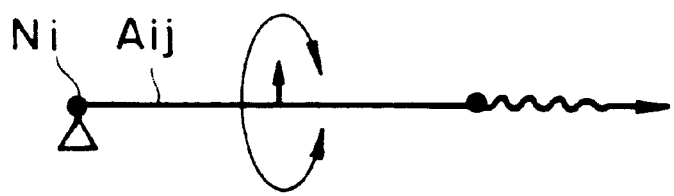
FIG. 17A illustrates the rotation of an arc about a fixed node.
Figure 17B:
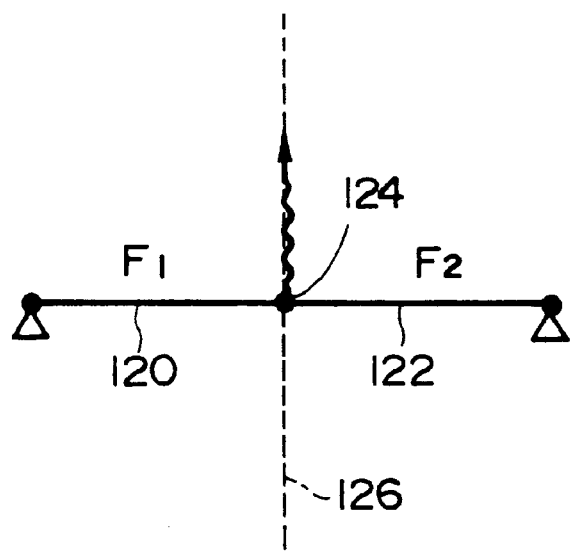
FIGS. 17B and 17C illustrate the generation of a singular state.
Figure 17C:
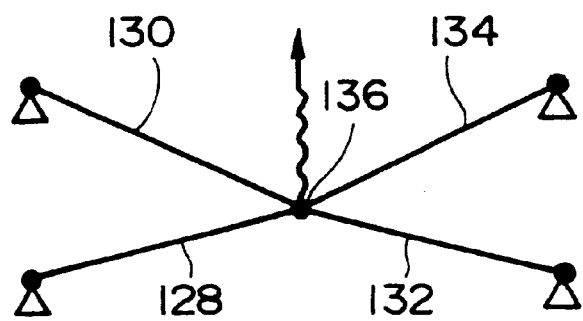

There is an infinite number of solutions for the rotational component of an arc, such as that shown in FIG. 17A. In such a case, a rotational resistance is applied to an arc $A_{ij}$ that has the fixed node $N_i$ as an end point. This resistance can be expressed by adding the term $U_3$, defined below, to the evaluation expression U. A weighting coefficient for swinging rotation is assumed to be $W_s$ and a weighting coefficient for twisting rotation is assumed to be $W_t$.

$$U_3 = \sum_{arc\ ij}^{A_{ij}|N_i f_{ix}} U_{3ij} \quad (31)$$

$$U_{3ij} = W_s[(y_{ij}\zeta_j - z_{ij}\eta_j)^2 + (z_{ij}\xi_j - x_{ij}\zeta_j)^2 + (x_{ij}\eta_j - y_{ij}\xi_j)^2]/l_{ij}^2 + W_t[(v_{ij}r_{ij} - w_{ij}q_{ij})^2 + (w_{ij}p_{ij} - u_{ij}r_{ij})^2 + (u_{ij}q_{ij} - v_{ij}p_{ij})^2] \quad (32)$$

The skeleton model can be transformed in such a way that the sum-of-squares of a variation in the direction of an arc having one end fixed is minimized, by adding $U_3$ to the evaluation expression.

The partial differentials of $U_{3ij}$ are as follows:

$$\frac{\partial U_{3ij}}{\partial \xi_j} = \frac{2W_s}{l_{ij}^2}[(1-x_{ij}^2)\xi_j - x_{ij}y_{ij}\eta_j - z_{ij}x_{ij}\zeta_j] \quad (33)$$

$$\frac{\partial U_{3ij}}{\partial \eta_j} = \frac{2W_s}{l_{ij}^2}[-x_{ij}y_{ij}\xi_j + (1-y_{ij}^2)\eta_j - y_{ij}z_{ij}\zeta_j]$$

$$\frac{\partial U_{3ij}}{\partial \zeta_j} = \frac{2W_s}{l_{ij}^2}[-z_{ij}x_{ij}\xi_j - y_{ij}z_{ij}\eta_j + (1-z_{ij}^2)\zeta_j]$$

$$\frac{\partial U_{3ij}}{\partial p_{ij}} = 2W_t[(1-u_{ij})^2 p_{ij} - u_{ij}v_{ij}q_{ij} - w_{ij}u_{ij}r_{ij}] \quad (34)$$

$$\frac{\partial U_{3ij}}{\partial q_{ij}} = 2W_t[-u_{ij}v_{ij}p_{ij} + (1-v_{ij})^2 q_{ij} - v_{ij}w_{ij}r_{ij}]$$

$$\frac{\partial U_{3ij}}{\partial r_{ij}} = 2W_t[-w_{ij}u_{ij}p_{ij} - v_{ij}w_{ij}q_{ij} + (1-w_{ij})^2 r_{ij}]$$

<3>-4 Setting of Node Inertia

The shape of the skeleton model can cause uncoordinated motion to occur. This uncoordinated motion can be reduced by affixing inertia and dampers (which will be described later) to the node. Node inertia can be expressed by adding the following term $U_4$ to the evaluation expression U:

$$U_4 = \sum_{node\ i} U_{4i} \quad (35)$$

$$U_{4i} = W_I[(\xi_i - \xi_i'')^2 + (\eta_i - \eta_i'')^2 + (\zeta_i - \zeta_i'')^2]/\lambda^2 \quad (36)$$

The term $U_{4i}$ corresponds to the inertia of node $N_i$. ($\xi''$, $\eta''$, $\zeta''$ is a movement vector for the node $N_i$, from the previous event cycle. $W_I$ is a weighting coefficient representing the strength of the inertia. The skeleton model can be transformed in such a way that the sum-of-squares of the variation in the velocity of the node coordinates is minimized, by adding $U_4$ to the evaluation expression.

The partial differentials of $U_{4i}$ are as follows:

$$\frac{\partial U_{4i}}{\partial \xi_i} = \frac{2W_I}{\lambda^2}(\xi_i - \xi_i'') \quad (37)$$

$$\frac{\partial U_{4i}}{\partial \eta_i} = \frac{2W_I}{\lambda^2}(\eta_i - \eta_i'')$$

$$\frac{\partial U_{4i}}{\partial \zeta_i} = \frac{2W_I}{\lambda^2}(\zeta_i - \zeta_i'')$$

<3>-5 Setting of Node Damper

A node damper can be expressed by adding the following term $U_5$ to the evaluation expression U:

$$U_5 = \sum_{node\ i} U_{5i} \quad (38)$$

$$U_{5i} = W_d(\xi_i^2 + \eta_i^2 + \zeta_i^2)/\lambda^2 \quad (39)$$

The term $U_{5i}$ corresponds to the damper of node $N_i$. $W_d$ is a weighting coefficient representing the strength of the damper. The skeleton model can be transformed in such a way that the sum-of-squares of the variation in the node coordinates is minimized, by adding $U_5$ to the evaluation expression.

The partial differentials of $U_{si}$ are as follows:

$$\frac{\partial U_{si}}{\partial \xi_i} = \frac{2W_d}{\lambda^2}\xi_i \qquad (40)$$

$$\frac{\partial U_{si}}{\partial \eta_i} = \frac{2W_d}{\lambda^2}\eta_i$$

$$\frac{\partial U_{si}}{\partial \zeta_i} = \frac{2W_d}{\lambda^2}\zeta_i$$

<4> Singular State and Countermeasure

<4>-1 Creation of Singular State

The shape of the skeleton model may be such that Equations (4) includes dependent equations. In the examples shown in FIGS. 17B and 17C, the equation $F_{ij}$ are dependent. The equations $G_{ij}$ and $H_{ij}$ are not dependent.

Taking FIG. 17B by way of example, the Equations (4) include the equation $F_{ij}$ for arcs 120 and 121 (hereinafter called equations $F_1$ and $F_2$, respectively). In this case, the equation $F_1$ defines that the length of the arc 120 is constant in the form of a first-degree approximation. In other words, a node 124 is regulated to lie within a surface 126 that is perpendicular to the arc. Similarly, the equation $F_2$ defines that the length of the arc 122 is constant in the form of a first-degree approximation. In other words, the node 124 is regulated to lie within the surface 126. That is to say, the equations $F_1$ and $F_2$ have the same meaning, and $F_1$ and $F_2$ are mutually dependent equations. If Equations (4) include dependent equations, it is not possible to determine a unique solution even if the Lagrangian multiplier method is used and the number of equations is the same as the number of variables. The example of FIG. 17C is similar in that the location of a node 136 is determined uniquely by the equation $F_{ij}$ relating to arcs 128, 130, or 132, which means that the equation $F_{ij}$ relating to an arc 134 is a dependent equation.

When Equations (4) include dependent equations in this manner, a unique solution cannot be determined if the Lagrangian multiplier method is used without modification. In such a case, the singular value decomposition method described below is used to reconfigure the set of simultaneous equations into an independent set of simultaneous equations.

<4>-2 Singular Value Decomposition

Singular value decomposition is a method which decomposes an m×n matrix A into the following equation:

$$A = UWV^t \qquad (41)$$

Note that U is an m×n matrix, V is an n×n matrix, W is a diagonal n×n matrix, and U and V satisfy the following equations:

$$U^tU=E, \; V^tV=VV^t=E \qquad (42)$$

Use of singular value decomposition makes it possible to reduce the number of equations of a dependent set of simultaneous equations and reconfigure the equations as an independent set of simultaneous equations, as described below. An example of the original equations are expressed as follows:

$$Ax=b \qquad (43)$$

If $m \geq n$, the following equation can be obtained by decomposing and transforming the matrix A into the form of Equation (41):

$$WV^tx=U^tb \qquad (44)$$

On the other hand, if m<n, the matrix $A^t$ can be subjected to singular value decomposition to obtain Equation (45) below. In this case, U is an n×m matrix, V is an m×m matrix, W is an m×m diagonal matrix, and U and V satisfy Equation (42).

$$A^t=UWV^t \qquad (45)$$

This causes Equation (43) to transform as follows:

$$WU^tx=V^tb \qquad (46)$$

An independent set of simultaneous equations can be obtained from the Equations (44) and (46) by setting the diagonal elements of W to zero and remove a row.

Note that whether or not the set of simultaneous equations includes dependent equations, in other words, whether or not the set of simultaneous equations has become degenerate or in a state approximating thereto, can be determined by whether or not the diagonal elements of the diagonal matrix W are zero or close to zero.

<5> Setting of Movability Range of Arc-to-Arc Angles

<5>-1 Addition of Basic Equation

Figure 8A:
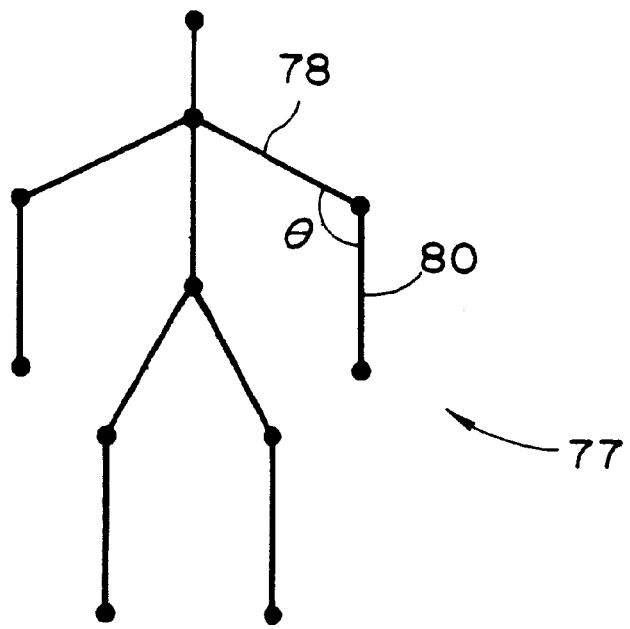
FIGS. 8A and 8B illustrate a description of the setting of a movability range for an arc-to-arc angle.
Figure 8B:
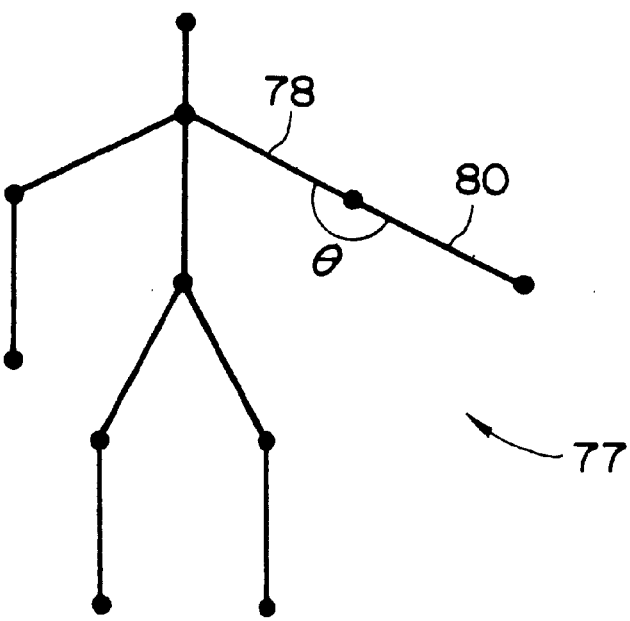

As described with reference to FIGS. 8A and 8B, limits to the movability ranges of arc-to-arc angle are provided. The upper and lower limits of the arc-to-arc angles $\theta_x$, $\theta_y$, and $\theta_z$ are set as follows:

$$\theta_{x0} \leq \theta_x \leq \theta_{x1} (0 \leq \theta_{x1}-\theta_{x0} \leq 2\pi)$$

$$\theta_{y0} \leq \theta_y \leq \theta_{y1} (0 \leq \theta_{y1}-\theta_{y0} \leq 2\pi) \qquad (47)$$

$$\theta_{z0} \leq \theta_z \leq \theta_{z1} (0 \leq \theta_{z1}-\theta_{z0} \leq 2\pi)$$

The movability ranges of $\theta_x$, $\theta_y$, and $\theta_z$ can be limited by introducing new variables $t_x$, $t_y$, and $t_z$ and adding the following equalities (equations) $e_x$, $e_y$, and $e_z$ to the basic Equations (1):

$$e_x \equiv k_{x1}\cos\theta_x + k_{x2}\sin\theta_x + k_{x3} - t_x^2 = 0 \qquad (48)$$

$$e_y \equiv k_{y1}\cos\theta_y + k_{y2}\sin\theta_y + k_{y3} - t_y^2 = 0$$

$$e_z \equiv k_{z1}\cos\theta_z + k_{z2}\sin\theta_z + k_{z3} - t_z^2 = 0$$

Note that the coefficients of Equalities (48) are defined as follows:

$$k_{x1} = \cos\left(\frac{\theta_{x0}+\theta_{x1}}{2}\right), k_{x2} = \sin\left(\frac{\theta_{x0}+\theta_{x1}}{2}\right), k_{x3} = -\cos\left(\frac{\theta_{x1}-\theta_{x0}}{2}\right) \qquad (49)$$

$$k_{y1} = \cos\left(\frac{\theta_{y0}+\theta_{y1}}{2}\right), k_{y2} = \sin\left(\frac{\theta_{y0}+\theta_{y1}}{2}\right), k_{y3} = -\cos\left(\frac{\theta_{y1}-\theta_{y0}}{2}\right)$$

$$k_{z1} = \cos\left(\frac{\theta_{z0}+\theta_{z1}}{2}\right), k_{z2} = \sin\left(\frac{\theta_{z0}+\theta_{z1}}{2}\right), k_{z3} = -\cos\left(\frac{\theta_{z1}-\theta_{z0}}{2}\right)$$

The meaning of Equalities (48) will now be discussed. Inequality (50) below limits the range within which $\cos\theta_x$ and $\sin\theta_x$ can exist to the shaded area shown in FIG. 18A. Thus, $\theta_x$ is limited to the range of: $\theta_{x0} \leq \theta_x \leq \theta_{x1}$.

$$k_{x1}\cos\theta_x + k_{x2}\sin\theta_x + k_{x3} \geq 0 \qquad (50)$$

Since $t_x^2 \geq 0$, the first equality of (48) has the same effect as Inequality (50). Similarly, the second and third equalities of (48) have the effect of limiting the ranges of $\theta_y$ and $\theta_z$.

The variations in variables $t_x$, $t_y$, and $t_z$ are defined as follows:

$$\tau_x \equiv \Delta t_x, \; \tau_y \equiv \Delta t_y, \; \tau_z \equiv \Delta t_z \qquad (51)$$

If the Newtonian method is used on the basic equations, the following equations are added to Equations (4):

$$E_x \equiv \sum_{node\ i}^{N_i \in ang} \left( \frac{\partial e_x}{\partial x_i} \xi_i + \frac{\partial e_x}{\partial y_i} \eta_i + \frac{\partial e_x}{\partial z_i} \zeta_i \right) + \qquad (52)$$

$$\sum_{arc\ ij}^{A_{ij} \in ang} \left( \frac{\partial e_x}{\partial u_{ij}} p_{ij} + \frac{\partial e_x}{\partial v_{ij}} q_{ij} + \frac{\partial e_x}{\partial w_{ij}} r_{ij} \right) +$$

$$\frac{\partial e_x}{\partial t_x} \tau_x + e_x = 0$$

$$E_y \equiv \sum_{node\ i}^{N_i \in ang} \left( \frac{\partial e_y}{\partial x_i} \xi_i + \frac{\partial e_y}{\partial y_i} \eta_i + \frac{\partial e_y}{\partial z_i} \zeta_i \right) +$$

$$\sum_{arc\ ij}^{A_{ij} \in ang} \left( \frac{\partial e_y}{\partial u_{ij}} p_{ij} + \frac{\partial e_y}{\partial v_{ij}} q_{ij} + \frac{\partial e_y}{\partial w_{ij}} r_{ij} \right) +$$

$$\frac{\partial e_y}{\partial t_y} \tau_y + e_y = 0$$

$$E_z \equiv \sum_{node\ i}^{N_i \in ang} \left( \frac{\partial e_z}{\partial x_i} \xi_i + \frac{\partial e_z}{\partial y_i} \eta_i + \frac{\partial e_z}{\partial z_i} \zeta_i \right) +$$

$$\sum_{arc\ ij}^{A_{ij} \in ang} \left( \frac{\partial e_z}{\partial u_{ij}} p_{ij} + \frac{\partial e_z}{\partial v_{ij}} q_{ij} + \frac{\partial e_z}{\partial w_{ij}} r_{ij} \right) +$$

$$\frac{\partial e_z}{\partial t_z} \tau_z + e_z = 0$$

The expression below is added to the portion in Evaluation expression (5) corresponding to the basic equations. The terms $\psi_x$, $\psi_y$, and $\psi_z$ are newly introduced indeterminate multipliers.

$$U_{AL} = \sum_{ang} (\psi_x E_x + \psi_y E_y + \psi_z E_z) \qquad (53)$$

The partial differentials of $U_{AL}$ are as shown below. Note that $\omega_i$ expresses the variables $\xi_i$, $\eta_i$, or $\zeta_i$, $\Omega_i$ expresses the variables $x_i$, $y_i$, or $z_i$, or $\omega_i \equiv \Delta\Omega_i$. In addition, $\omega_{ij}$ expresses the variables $p_{ij}$, $q_{ij}$, or $r_{ij}$, $\Omega_{ij}$ expresses the variables $u_{ij}$, $v_{ij}$, or $w_{ij}$, and $\omega_{ij} \equiv \Delta\Omega_{ij}$.

$$\frac{\partial U_{AL}}{\partial \omega_i} = \sum_{ang}^{N_i \in ang} \left( \psi_x \frac{\partial e_x}{\partial \Omega_i} + \psi_y \frac{\partial e_y}{\partial \Omega_i} + \psi_z \frac{\partial e_z}{\partial \Omega_i} \right) \qquad (54)$$

$$\frac{\partial U_{AL}}{\partial \omega_{ij}} = \sum_{ang}^{A_{ij} \in ang} \left( \psi_x \frac{\partial e_x}{\partial \Omega_{ij}} + \psi_y \frac{\partial e_y}{\partial \Omega_{ij}} + \psi_z \frac{\partial e_z}{\partial \Omega_{ij}} \right) \qquad (55)$$

$$\frac{\partial U_{AL}}{\partial \tau_x} = -2 t_x \psi_x \qquad (56)$$

$$\frac{\partial U_{AL}}{\partial \tau_y} = -2 t_y \psi_y$$

$$\frac{\partial U_{AL}}{\partial \tau_z} = -2 t_z \psi_z$$

The partial differentials of $e_x$, $e_y$, and $e_z$ are as shown below. Note that $\Omega$ expresses the variables x, y, z, u, v, w, $t_x$, $t_y$, or $t_z$.

$$\frac{\partial e_x}{\partial \Omega} = \left( k_{x1} \frac{\sin\theta_x}{\cos\theta_x} - k_{x2} \right) \frac{\partial a_{12}}{\partial \Omega} - 2 t_x \frac{\partial t_x}{\partial \Omega} \qquad (57)$$

-continued $$\frac{\partial e_y}{\partial \Omega} = \frac{1}{\cos\theta_x} \left[ k_{y1} \frac{\partial a_{22}}{\partial \Omega} + k_{y2} \frac{\partial a_{02}}{\partial \Omega} - \frac{\sin\theta_x}{\cos\theta_x} (k_{y1}\cos\theta_y + k_{y2}\sin\theta_y) \frac{\partial a_{12}}{\partial \Omega} \right] - 2 t_y \frac{\partial t_y}{\partial \Omega}$$

$$\frac{\partial e_z}{\partial \Omega} = \frac{1}{\cos\theta_x} \left[ k_{z1} \frac{\partial a_{11}}{\partial \Omega} + k_{z2} \frac{\partial a_{10}}{\partial \Omega} - \frac{\sin\theta_x}{\cos\theta_x} (k_{z1}\cos\theta_z + k_{z2}\sin\theta_z) \frac{\partial a_{12}}{\partial \Omega} \right] - 2 t_z \frac{\partial t_z}{\partial \Omega}$$

<5>-2 Divergence of Variables

The above settings alone do not function completely to limit the movability ranges of the arc-to-arc angles. This is because the values of the variables $t_x$, $t_y$, and $t_z$ could become so large that the calculations do not converge. In such a case, dampers are applied to variables $\tau_x$, $\tau_y$, and $\tau_z$, which are variations in $t_x$, $t_y$, and $t_z$, to make the calculations converge. In other words, the dampers can be activated by adding the following term $U_5$ to the evaluation expression U:

$$U_6 = W_\tau (\tau_x^2 + \tau_y^2 + \tau_z^2) \qquad (58)$$

The partial differentials of $U_6$ are as follows:

$$\frac{\partial U_6}{\partial \tau_x} = 2 W_\tau \tau_x \qquad (59)$$

$$\frac{\partial U_6}{\partial \tau_y} = 2 W_\tau \tau_y$$

$$\frac{\partial U_6}{\partial \tau_z} = 2 W_\tau \tau_z$$

<5>-3 Sticking at Upper Limit or Lower Limit

If limitations are imposed on the movability range of arc-to-arc angles by the above setting, a sticking phenomenon described below could occur. This sticking is behavior that occurs after a skeleton model has been transformed such that the arc-to-arc angle of a certain joint becomes large and the arc-to-arc angle is kept to be at the upper limit of the movability range, and that state has been held for a while. If an attempt is made to move the skeleton model in the direction in which the arc-to-arc angle becomes smaller, the arc-to-arc angle will not change immediately and will keep for a while at this upper limit angle. The time taken by this sticking is substantially proportional to the time during which the arc-to-arc angle is kept to be at the upper limit. The same thing can happen with the lower limit of the angle restriction. The reason therefor is discussed below. The variables $t_x$, $t_y$, and $t_z$ converge slower as the values thereof approach zero. Therefore, if they are made to once converge to zero, or a value sufficiently close to zero, many calculation loops will be necessary before $t_x$, $t_y$, and $t_z$ return to their original values.

To prevent this inconvenience in such a case, a very small compensation can be added to the values of $t_x$, $t_y$, and $t_z$ if the variables $t_x$, $t_y$, and $t_z$ have become too small, to ensure that they do not converge to zero. More specifically, random numbers are generated and added to $t_x$, $t_y$, and $t_z$.

<5>-4 Setting of Plurality of Conditions

If the movability range (between upper and lower limits) of an arc-to-arc angle becomes too small or too large, the calculations will not converge and uncoordinated motion will occur in the skeleton model. The stability range within which calculations converge is limited to a given range. In such a case, methods are used when the movability range is narrower or wider than the given range, as described below.

<5>-4-1 When the Movability Range is Narrow

Figure 18B:
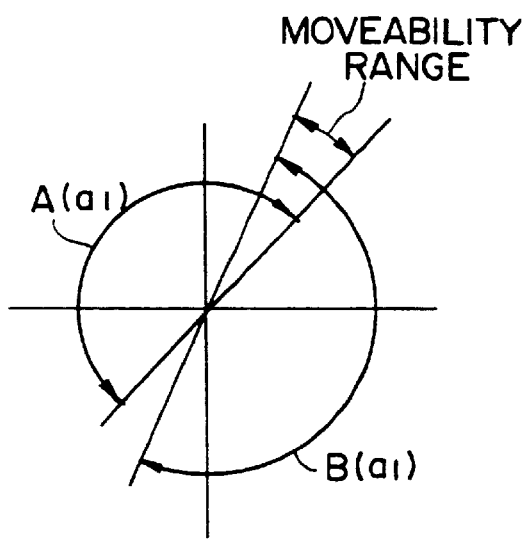

Two movability range limitations A and B can be used simultaneously, as shown in FIG. 18B. The movability range of each of regions A and B is $a_1$ degrees.

<5>-4-2 When the Movability Range is Wide

Figure 18C:
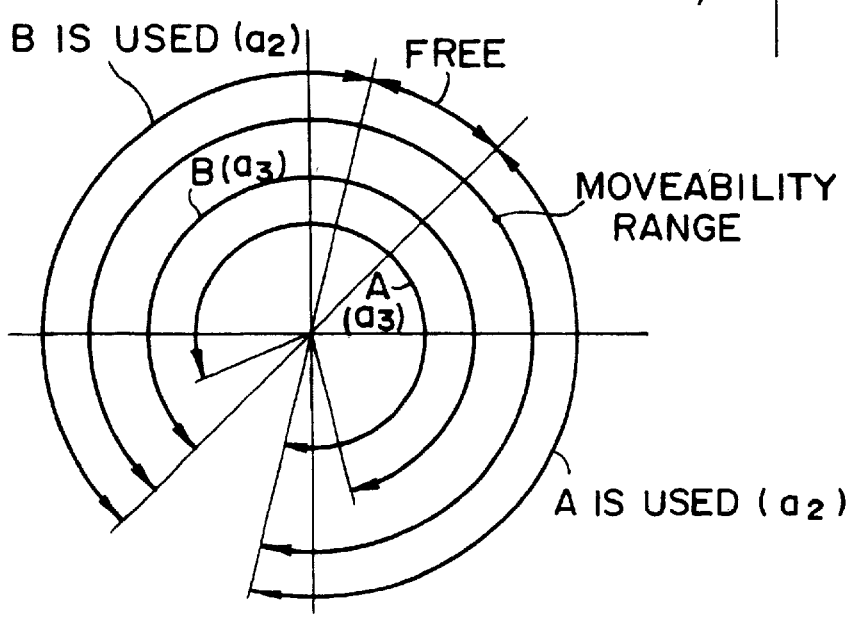

Two movability range limitations A and B could be prepared, and the state could be switched between A, B, and free (no angular restriction), as shown in FIG. 18C. Region A or B is used if movement is within a range of $a_2$ degrees beyond the upper and lower limits of the arc-to-arc angle, otherwise the free region is used, The movability range of each of regions A and B is $a_3$ degrees.

<6> Methods of Attaching a Node to a Polygon or Edge

As was shown in FIGS. 9A to 9D, 10, and 11, a specific node can be attached to a specified polygon or edge. A node $N_i$ can be attached to a surface ax+by+cz+d=0 by adding the following equation to the basic Equations (1):

$$ax_i + by_i + cz_i + d = 0 \tag{60}$$

Since a straight line can be expressed as an intersection between two surfaces, a node can be attached to a straight line by providing two surface (plane) equations and linking them.

With this method, a node can be attached to any desired limitless surface or limitless straight line, but the movement range of the node cannot be restricted to a polygon of a limited size or an edge of a limited length. In addition, an increase in the number of basic equations leads to an increase in the size of the set of simultaneous equations used when the Lagrangian multiplier method is applied, which is disadvantageous as far as calculation speed is concerned. In such a case, the drag-back method described below is used for implementing the attachment, instead of the previously described methods.

<7> Drag-Back Method

The drag-back method is used in the attachment of a node to a polygon or edge. With this method, calculations are done twice within each event cycle, once for the action of the original node movement (drag forward) and once for an action that retracts the attached node (drag back).

The calculations done when a node $N_i$ is attached to a polygon F will now be described. First of all, the characteristics of a node damper for the node $N_i$ are set in such a manner that resistance increases only for movement in the direction perpendicular to the polygon F. This damper is called a surface-perpendicular damper (face damper). The damper of this type acts because, if the node moves too far away from the polygon, the effects of the error will adversely affect subsequent behavior. This setting executes the normal node movement calculation, in other words, the calculation in which the restrictive condition is disabled, to obtain the distance $L_{dist}$ between the node $N_i$ and the polygon F. If $L_{dist}$ is less than or equal to a given value L*, the node coordinates and arc-normal vectors are changed as specified by the calculation results. If $L_{dist}$ is greater than L*, variations in all the node coordinates and arc-normal vectors multiplied by a scaling factor $L^*/L_{dist}$ are used.

The restrictive condition is then enabled to exert a force that pulls the node $N_i$ back towards the polygon F (drag-back). In this case, one of the three methods described below is used depending on the positional relationship between the node and the polygon F.

Assume that the closest point on the polygon F to the node $N_i$ is P. Depending on the positional relationship between the node $N_i$ and the polygon F, one of the following points becomes the point P:

(A) A foot of a perpendicular extending from the node $N_i$ to the polygon F (B) A foot of a perpendicular extending from the node $N_i$ to one edge of the polygon F (C) One vertex of the polygon F With (C), the node $N_i$ is pulled towards that vertex. This retractive force is called a point magnet.

With (B), the node $N_i$ is pulled in the direction towards that edge. This retractive force is called a line magnet.

With (A), node $N_i$ is pulled in the direction towards the polygon surface. This retractive force is called a face magnet.

For example, the state shown in FIG. 9A is the operation of a face magnet and that shown in FIG. 9B is the operation of a line magnet. If the point that is closest to the node 82 is a vertex, it operates as a point magnet. This arrangement makes it possible to limit the movement range of a node to within a polygon of a limited surface area, enabling an increase in usefulness to the user. Note that the attachment of a node to a limitless surface could be done easily by making the polygon sufficiently large.

When the node $N_i$ is attached to the edge of a polygon, as shown in FIG. 9B, a line-perpendicular damper (line damper) could be used instead of a surface-perpendicular damper. This damper acts only with respect to movement in the direction perpendicular to the edge. In addition, either a point magnet or a line magnet could be used during drag-back, depending on the positional relationship between the node and an edge. This makes it possible to restrict the movement range of the node to an edge of a limited length.

<7>-1 Surface-Perpendicular Damper (Face Damper)

Assume that a polygon surface is expressed as follows:

$$ax+by+cz+d=0 \, (a^2+b^2+c^2=1) \tag{61}$$

A surface-perpendicular damper for the node $N_i$ can be implemented by adding the term $U_{fd}$, defined below, to the evaluation expression U. This term $U_{fd}$ is proportional to the square of the amount of movement of the node $N_i$ in the direction perpendicular to the polygon surface. It is therefore possible to resist the movement of the node $N_i$ in the direction perpendicular to the polygon surface by adding $U_{fd}$ to the evaluation expression U. There is no resistance to movement of the node $N_i$ in directions parallel to the polygon surface. $W_{fd}$ is a weighting coefficient representing the strength of the damper.

$$U_{fd} = W_{fd}(a\xi_i + b\eta_i + c\zeta_i)^2/\lambda^2 \tag{62}$$

The partial differentials of Ufd are as follows:

$$\frac{\partial U_{fd}}{\partial \xi_i} = \frac{2W_{fd}a}{\lambda^2}(a\xi_i + b\eta_i + c\zeta_i) \tag{63}$$

$$\frac{\partial U_{fd}}{\partial \eta_i} = \frac{2W_{fd}b}{\lambda^2}(a\xi_i + b\eta_i + c\zeta_i)$$

$$\frac{\partial U_{fd}}{\partial \zeta_i} = \frac{2W_{fd}c}{\lambda^2}(a\xi_i + b\eta_i + c\zeta_i)$$

<7>-2 Line-Perpendicular Damper (Line Damper)

Assume that a straight-line edge is expressed by a line passing through a point $(x_p, y_p, z_p)$ in a direction having a vector (a, b, c). Note, however, that the following also applies:

$$a^2+b^2+c^2=1 \tag{64}$$

A line-perpendicular damper for the node $N_i$ can be implemented by adding the term $U_{ld}$, defined below, to the evaluation expression U. $W_{ld}$ is a weighting coefficient representing the strength of the damper.

$$U_{ld} = W_{ld}(d_{i1}^2 - d_{i0}^2)/\lambda^2 \quad (65)$$

$$d_{i1}^2 = (x_i - x_p + \xi_i)^2 + (y_i - y_p + \eta_i)^2 + (z_i - z_p + \zeta_i)^2 -$$
$$[a(x_i - x_p + \xi_i) + b(y_i - y_p + \eta_i) + c(z_i - z_p + \zeta_i)]^2$$

$$d_{i0}^2 = (x_i - x_p)^2 + (y_i - y_p)^2 + (z_i - z_p)^2 - [a(x_i - x_p) +$$
$$b(y_i - y_p) + c(z_i - z_p)]^2$$

The terms $d_{io}$ and $d_{i1}$ in the above expressions mean the distances between the node $N_i$ and the straight-line edge, before the movement and after the movement. It is therefore possible to resist the movement of the node $N_i$ in the direction perpendicular to the straight-line edge by adding $U_{ld}$ to the evaluation expression U. There is no resistance to movement of the node $N_i$ in directions parallel to the straight-line edge. The partial differentials of $U_{ld}$ are as follows:

$$\frac{\partial U_{ld}}{\partial \xi_i} = \frac{2W_{ld}}{\lambda^2}[(1 - a^2)\xi_i - ab\eta_i - ca\zeta_i + (1 - a^2)(x_i - x_p) - \quad (66)$$
$$ab(y_i - y_p) - ca(z_i - z_p)]$$

$$\frac{\partial U_{ld}}{\partial \eta_i} = \frac{2W_{ld}}{\lambda^2}[-ab\xi_i + (1 - b^2)\eta_i - bc\zeta_i - ab(x_i - x_p) +$$
$$(1 - b^2)(y_i - y_p) - bc(z_i - z_p)]$$

$$\frac{\partial U_{ld}}{\partial \zeta_i} = \frac{2W_{ld}}{\lambda^2}[-ca\xi_i - bc\eta_i + (1 - c^2)\zeta_i - ca(x_i - x_p) -$$
$$bc(y_i - y_p) + (1 - c^2)(z_i - z_p)]$$

<7>-3 Face Magnet

Assume that the polygon surface is expressed as follows:

$$ax + by + cz + d = 0 (a^2 + b^2 + c^2 = 1) \quad (67)$$

A face magnet for the node $N_i$ can be implemented by adding the term $U_{fm}$, defined below, to the evaluation expression U. $W_{fm}$ is a weighting coefficient representing the strength of the magnet.

$$U_{fm} = W_{fm} d_i^2/\lambda^2$$

$$d_i = a(x_i + \xi_i) + b(y_i + \eta_i) + c(z_i + \zeta_i) + d \quad (68)$$

The term $d_i$ in the above expressions means the distance between the node $N_i$ and the polygon surface after the movement. It is therefore possible to minimize the square of the distance between the node $N_i$ and the polygon surface after a movement, and hence attract the node $N_i$ to the polygon surface after the movement, by adding $U_{fm}$ to the evaluation expression U. The partial differentials of $U_{fm}$ are as follows:

$$\frac{\partial U_{fm}}{\partial \xi_i} = \frac{2W_{fm}a}{\lambda^2}(a\xi_i + b\eta_i + c\zeta_i + ax_i + by_i + cz_i + d) \quad (69)$$

$$\frac{\partial U_{fm}}{\partial \eta_i} = \frac{2W_{fm}b}{\lambda^2}(a\xi_i + b\eta_i + c\zeta_i + ax_i + by_i + cz_i + d)$$

$$\frac{\partial U_{fm}}{\partial \zeta_i} = \frac{2W_{fm}c}{\lambda^2}(a\xi_i + b\eta_i + c\zeta_i + ax_i + by_i + cz_i + d)$$

<7>-4 Line Magnet

Assume that a straight-line edge is defined by a line passing through a point $(x_p, y_p, z_p)$ in a direction having a vector $(a, b, c)$. Note, however, that the following also applies:

$$a^2 + b^2 + c^2 = 1 \quad (70)$$

A line magnet can be implemented by adding the term $U_{lm}$, shown below, to the evaluation expression U. $W_{lm}$ is a weighting coefficient representing the strength of the magnet.

$$U_{lm} = W_{lm} d_i^2/\lambda^2 \quad (71)$$

$$d_i^2 = (x_i - x_p + \xi_i)^2 + (y_i - y_p + \eta_i)^2 + (z_i - z_p + \zeta_i)^2 -$$
$$[a(x_i - x_p + \xi_i) + b(y_i - y_p + \eta_i) + c(z_i - z_p + \zeta_i)]^2$$

The term $d_i$ in the above expressions means the distance between the node $N_i$ and the straight-line edge after the movement. It is therefore possible to minimize the square of the distance between the node $N_i$ and the straight-line edge after a movement, and hence attract the node $N_i$ to the straight-line edge after the movement, by adding $U_{lm}$ to the evaluation expression U. The partial differentials of $U_{lm}$ are as follows:

$$\frac{\partial U_{lm}}{\partial \xi_i} = \frac{2W_{lm}}{\lambda^2}[(1 - a^2)\xi_i - ab\eta_i - ca\zeta_i + (1 - a^2)(x_i - x_p) - \quad (72)$$
$$ab(y_i - y_p) - ca(z_i - z_p)]$$

$$\frac{\partial U_{lm}}{\partial \eta_i} = \frac{2W_{lm}}{\lambda^2}[-ab\xi_i + (1 - b^2)\eta_i - bc\zeta_i - ab(x_i - x_p) +$$
$$(1 - b^2)(y_i - y_p) - bc(z_i - z_p)]$$

$$\frac{\partial U_{lm}}{\partial \zeta_i} = \frac{2W_{lm}}{\lambda^2}[-ca\xi_i - bc\eta_i + (1 - c^2)\zeta_i - ca(x_i - x_p) -$$
$$bc(y_i - y_p) + (1 - c^2)(z_i - z_p)]$$

<7>-5 Point Magnet

A point magnet can be used to attract the node $N_i$ towards a point $(x_p, y_p, z_p)$. A point magnet is similar to a rubber-band, except that there is no limit placed thereon because a point magnet does not extend like a rubber-band.

A point magnet can be implemented by adding the term $U_{pm}$, defined below, to the evaluation expression U. $W_{pm}$ is a weighting coefficient representing the strength of the magnet.

$$U_{pm} = W_{pm}[(x_i - x_p + \xi_i)^2 + (y_i - y_p + \eta_i)^2 + (z_i - z_p + \zeta_i)^2]/\lambda^2 \quad (73)$$

The partial differentials of $U_{pm}$ are as follows:

$$\frac{\partial U_{pm}}{\partial \xi_i} = \frac{2W_{pm}}{\lambda^2}(\xi_i + x_i - x_p) \quad (74)$$

$$\frac{\partial U_{pm}}{\partial \eta_i} = \frac{2W_{pm}}{\lambda^2}(\eta_i + y_i - y_p)$$

$$\frac{\partial U_{pm}}{\partial \zeta_i} = \frac{2W_{pm}}{\lambda^2}(\zeta_i + z_i - z_p)$$

3 Algorithm 2

Algorithm 2 differs from the above described Algorithm 1 in that variations in the variables u, v, w shown in FIG. 2A are approximated by linear expression involving a single variable ρ. Discontinuous restrictive conditions are handled by the method described with reference to FIG. 13B.

<1> Basic Equations

The basic equations are similar to those of Algorithm 1 and are as follows:

$$f_{ij} \equiv [(x_j - x_i)^2 + (y_j - y_i)^2 + (z_j - z_i)^2 - L_{ij}^2]/\lambda^2 = 0 \quad (75)$$

$$g_{ij} \equiv u_{ij}^2 + v_{ij}^2 + w_{ij}^2 - 1 = 0 \quad (76)$$

$$h_{ij} \equiv [(x_j - x_i)u_{ij} + (y_j - y_i)v_{ij} + (z_j - z_i)w_{ij}]/\lambda = 0 \quad (77)$$

<2> Method of Solving Basic Equations

<2>-1 Application of Newtonian Method

If the basic Newtonian method is applied to Equation (75), the following equation is obtained:

$$\sum_{node\ k} \left( \frac{\partial f_{ij}}{\partial x_k} \xi_k + \frac{\partial f_{ij}}{\partial y_k} \eta_k + \frac{\partial f_{ij}}{\partial z_k} \zeta_k \right) = -f_{ij} \quad (78)$$

Rearrangement of this equation leads to the following:

$$F_{ij} \equiv [(x_j - x_i)\xi_i - (x_j - x_i)\xi_j + (y_j - y_i)\eta_i - (y_j - y_i)\eta_j + (z_j - z_i)\zeta_i - (z_j - z_i)\zeta_j]/\lambda^2 - f_{ij}/2 = 0 \quad (79)$$

To reduce the number of unknowns in Equations (76) and (77), linear expression involving the single variable $\rho$ are used, not the Newtonian method.

<2>-2 First-Degree Approximations of Arc-Normal Vector Variations

Since the arc-normal vector $n_{ij}$ is perpendicular to the arc $A_{ij}$ and has a magnitude of 1, the components $u_{ij}$, $v_{ij}$, $w_{ij}$ are three variables, but there is only one degree of freedom in the variations shown in FIG. 2A. In such a case, first-degree approximations involving a single variable are used to reduce the number of unknowns in the equations.

If the unit vector in the axial direction of the arc $A_{ij}$ is $a_{ij}$, as shown in FIG. 14, a vector is created such that $s_{ij} \equiv n_{ij} \times a_{ij}$.

$$a_{ij} \equiv (x_{ij}, y_{ij}, z_{ij}) \quad (80)$$

$$x_{ij} \equiv (x_j - x_i)/l_{ij},\ y_{ij} \equiv (y_j - y_i)/l_{ij},\ z_{ij} \equiv (z_j - z_i)/l_{ij}$$

$$l_{ij} \equiv \sqrt{(x_j - x_i)^2 + (y_j - y_i)^2 + (z_j - z_i)^2}$$

$$s_{ij} \equiv n_{ij} \times a_{ij} \equiv (s_{xij}, s_{yij}, s_{zij}) \quad (81)$$

$$s_{xij} \equiv v_{ij}z_{ij} - w_{ij}y_{ij},\ s_{yij} \equiv w_{ij}x_{ij} - u_{ij}z_{ij},\ s_{zij} \equiv u_{ij}y_{ij} - v_{ij}x_{ij}$$

Differentiation of Equations (76) and (77) obtains the following:

$$u_{ij}\Delta u_{ij} + v_{ij}\Delta v_{ij} + w_{ij}\Delta w_{ij} = 0 \quad (82)$$

$$(x_j-x_i)\Delta u_{ij}+(y_j-y_i)\Delta v_{ij}+(z_j-z_i)\Delta w_{ij}+u_{ij}(\xi_j-\xi_i)+v_{ij}(\eta_j-\eta_i)+w_{ij}(\zeta_j-\zeta_i)=0 \quad (83)$$

$\Delta u_{ij}$, $\Delta v_{ij}$, and $\Delta w_{ij}$ are subjected to the restrictions of Equations (82) and (83). Assuming a three-dimensional space whose orthogonal axis are $\Delta u_{ij}$, $\Delta v_{ij}$, and $\Delta w_{ij}$, $\Delta u_{ij}$, $\Delta v_{ij}$, and $\Delta w_{ij}$ can only take values on an intersection line L between a surface expressed by Equation (82) and a surface expressed by Equation (83). Therefore, $\Delta u_{ij}$, $\Delta v_{ij}$, and $\Delta w_{ij}$ can be expressed as follows:

$$\Delta u_{ij} = k_1 \rho + l_1 \quad (84)$$

$$\Delta v_{ij} = k_2 \rho + l_2$$

$$\Delta w_{ij} = k_3 \rho + l_3$$

A vector ($k_1$, $k_2$, $k_3$) expresses the direction of the intersection line L. It is perpendicular to the normal vector ($u_{ij}$, $v_{ij}$, $w_{ij}$) of the surface expressed by Equation (82) and to the normal vector ($x_j-x_i$, $y_j-y_i$, $z_j-z_i$) of the surface expressed by Equation (83). In other words, the direction of the vector ($k_1$, $k_2$, $k_3$) matches that of the vector $s_{ij}$ of Equations (81). The variables $k_1$, $k_2$, $k_3$, $l_1$, $l_2$, and $l_3$ of Equations (84) are derived geometrically to obtain the Equations (85) below. In other words, the variations $\Delta n_{ij}$ ($\Delta u_{ij}$, $\Delta v_{ij}$, $\Delta w_{ij}$) of $n_{ij}(u_{ij}, v_{ij}, w_{ij})$ can be approximated by linear expression involving a newly introduced unknown variable $\rho_{ij}$.

$$\Delta u_{ij} = \rho_{ij}s_{xij} - x_{ij}[u_{ij}(\xi_j - \xi_i) + v_{ij}(\eta_j - \eta_i) + w_{ij}(\zeta_j - \zeta_i)]/l_{ij} \quad (85)$$

$$\Delta v_{ij} = \rho_{ij}s_{yij} - y_{ij}[u_{ij}(\xi_j - \xi_i) + v_{ij}(\eta_j - \eta_i) + w_{ij}(\zeta_j - \zeta_i)]/l_{ij}$$

$$\Delta w_{ij} = \rho_{ij}s_{zij} - z_{ij}[u_{ij}(\xi_j - \xi_i) + v_{ij}(\eta_j - \eta_i) + w_{ij}(\zeta_j - \zeta_i)]/l_{ij}$$

The value of $n_{ij}$ becomes $n'_{ij}$ in the next event cycle. As far as possible, $n'_{ij}$ is perpendicular to the arc $A_{ij}$ and has a magnitude of 1, but errors can occur in the order of the magnitude of the squares of the variations. In such a case, the direction thereof is first amended by the first expression of (86) below, then the magnitude thereof is amended by the second expression to 1 to create $n'_{ij}$. Note that $a'_{ij}$ is the value of $a_{ij}$ that is taken by the next event cycle.

$$\tilde{n}_{ij} = a_{ij}' \times [(n_{ij} + \Delta n_{ij}) \times a_{ij}']$$

$$n_{ij}' = \tilde{n}_{ij}/|\tilde{n}_{ij}| \quad (86)$$

<2>-3 Application of Lagrangian Multiplier Method

The number of equations in (79) is less than the number of variables thereof and the variable $\rho$ is not included therein, so it is not possible to determine a unique solution from this equation alone. In this case, a solution is obtained by adding a condition that minimizes an evaluation expression that includes $\rho$ and applying the Lagrangian multiplier method. An evaluation expression involving $U_1$, $U_2$, $U_3$, . . . is prepared and minimization is performed on these sum totals. An indeterminate multiplier $\alpha_{ij}$ is introduced to define U as follows:

$$U \equiv \sum_{arc\ ij} \alpha_{ij} F_{ij} + \sum U_k \quad (87)$$

Equation (79) and Equations (88) below are linked to obtain solutions for $\xi$, $\eta$, $\zeta$, and $\rho$.

$$\frac{\partial U}{\partial \xi_i} = 0,\ \frac{\partial U}{\partial \eta_i} = 0,\ \frac{\partial U}{\partial \zeta_i} = 0,\ \frac{\partial U}{\partial \rho_{ij}} = 0 \quad (88)$$

New values x', y', and z' of x, y, and z are derived from Expression (89) below, based on the thus obtained solution, and the calculations of one event cycle end with the deriving of new values n'(u', v', w') of n(u, v, w) from Expressions (86).

$$x'=x+\xi, \ y'=y+\eta, \ z'=z+\zeta \tag{89}$$

<2>-4 Setting of Limits for Arc Swinging Angles

If the user moves the mouse too fast, so that the transformation of the shape of the skeleton model within one event cycle is too large, the concomitant calculation errors will also be large. This is because this embodiment uses a method that updates the basic equations and the evaluation expression in each iterative loop, as shown in FIG. 3B. If a transformation makes an arc do a parallel movement, errors due to lengthening of the arc do not occur. One error that does occur is when the direction of an arc changes. In other words, the magnitude of this error depends on the swinging angle of the arc and it appears in the form of an error in the arc length. In such a case, this embodiment sets permissible limits on the arc swinging angles, and scales the calculation results.

The swinging angles $\phi_{ij}$ of the arc $A_{ij}$ are expressed as follows:

$$\Phi_{ij} = \sqrt{|b_{ij}|^2 - (b_{ij} \cdot a_{ij})^2} \tag{90}$$

$$b_{ij} \equiv \left(\frac{\xi_j - \xi_i}{l_{ij}}, \frac{\eta_j - \eta_i}{l_{ij}}, \frac{\zeta_j - \zeta_i}{l_{ij}}\right) \tag{91}$$

If the maximum value $\max(\Phi_{ij})$ of $\Phi_{ij}$ has exceeded the permissible limit $\Phi^*$, the following scaling factor $\mu_1$ is obtained and all of the values of $\xi$, $\eta$, $\zeta$, and $\rho$ are multiplied by $\mu_1$:

$$\mu_1 = \Phi^*/\max(\Phi_{ij}) \tag{92}$$

This makes it possible to restrain the maximum swinging angle of each arc to no more than $\Phi^*$. Note that Expression (90) could be replaced by Expression (93) below in practice. Note also that these limits can be set for arc swinging angle when Algorithm 1 is used.

$$\Phi_{ij} = |b_{ij}| \tag{93}$$

<3> Creation of Evaluation Expression
<3>-1 Sum-of-Squares of Arc-to-Arc Angle Variations In a similar manner to that for Algorithm 1, the joints can be made to curve in a well-balanced manner by assuming that the sum-of-squares of variations in the arc-to-arc angles thereof is $U_1$ and minimizing $U_1$.

<3>-1-1 Arc-to-arc Angle and Rotational Matrix

The following Expressions (94) are derived from Expressions (8) to (14) of Algorithm 1:

$$a_{00} = n_{ij} \cdot n_{jk} = u_{ij}u_{jk} + v_{ij}v_{jk} + w_{ij}w_{jk} \tag{94}$$

$$a_{01} = n_{ij} \cdot a_{jk} = u_{ij}x_{jk} + v_{ij}y_{jk} + w_{ij}z_{jk}$$

$$a_{02} = n_{ij} \cdot s_{jk} = u_{ij}s_{xjk} + v_{ij}s_{yjk} + w_{ij}s_{zjk} = \cos\theta_x \sin\theta_y$$

$$a_{10} = a_{ij} \cdot n_{jk} = x_{ij}u_{jk} + y_{ij}v_{jk} + z_{ij}w_{jk} = \cos\theta_x \sin\theta_z$$

$$a_{11} = a_{ij} \cdot a_{jk} = x_{ij}x_{jk} + y_{ij}y_{jk} + z_{ij}z_{jk} = \cos\theta_x \cos\theta_z$$

$$a_{12} = a_{ij} \cdot s_{jk} = x_{ij}s_{xjk} + y_{ij}s_{yjk} + z_{ij}s_{zjk} = -\sin\theta_x$$

$$a_{20} = s_{ij} \cdot n_{jk} = s_{xij}u_{jk} + s_{yij}v_{jk} + s_{zij}w_{jk}$$

$$a_{21} = s_{ij} \cdot a_{jk} = s_{xij}x_{jk} + s_{yij}y_{jk} + s_{zij}z_{jk}$$

$$a_{22} = s_{ij} \cdot s_{jk} = s_{xij}s_{xjk} + s_{yij}s_{yjk} + s_{zij}s_{zjk} = \cos\theta_x \cos\theta_y$$

<3>-1-2 Linear Expressions Relating to Angle Variations

The relationships of the angle variations $\phi_x$, $\phi_y$, and $\phi_z$ are defined by Expressions (18), (19), and (20), in the same way as with Algorithm 1. The following Expressions (95) to (99) are derived from differentiation of Expressions (94):

$$b_{02} = -a_{12}u_{ij}(\xi_j - \xi_i)/l_{ij} - a_{01}s_{xjk}(\xi_k - \xi_j)/l_{jk} - \tag{95}$$
$$a_{12}v_{ij}(\eta_j - \eta_i)/l_{ij} - a_{01}s_{yjk}(\eta_k - \eta_j)/l_{jk} -$$
$$a_{12}w_{ij}(\zeta_j - \zeta_i)/l_{ij} - a_{01}s_{zjk}(\zeta_k - \zeta_j)/l_{jk} + a_{22}\rho_{ij} - a_{00}\rho_{jk}$$

$$b_{10} = (u_{jk} - a_{10}x_{ij})(\xi_j - \xi_i)/l_{ij} - a_{11}u_{jk}(\xi_k - \xi_j)/l_{jk} + \tag{96}$$
$$(v_{jk} - a_{10}y_{ij})(\eta_j - \eta_i)/l_{ij} - a_{11}v_{jk}(\eta_k - \eta_j)/l_{jk} +$$
$$(w_{jk} - a_{10}z_{ij})(\zeta_j - \zeta_i)/l_{ij} - a_{11}w_{jk}(\zeta_k - \zeta_j)/l_{jk} + a_{12}\rho_{jk}$$

$$b_{11} = (x_{jk} - a_{11}x_{ij})(\xi_j - \xi_i)/l_{ij} + (x_{ij} - a_{11}x_{jk})(\xi_k - \xi_j)/l_{jk} + \tag{97}$$
$$(y_{jk} - a_{11}y_{ij})(\eta_j - \eta_i)/l_{ij} + (y_{ij} - a_{11}y_{jk})(\eta_k - \eta_j)/l_{jk} +$$
$$(z_{jk} - a_{11}z_{ij})(\zeta_j - \zeta_i)/l_{ij} + (z_{ij} - a_{11}z_{jk})(\zeta_k - \zeta_j)/l_{jk}$$

$$b_{12} = (s_{xjk} - a_{12}x_{ij})(\xi_j - \xi_i)/l_{ij} - a_{11}s_{xjk}(\xi_k - \xi_j)/l_{jk} + \tag{98}$$
$$(s_{yjk} - a_{12}y_{ij})(\eta_j - \eta_i)/l_{ij} - a_{11}s_{yjk}(\eta_k - \eta_j)/l_{jk} +$$
$$(s_{zjk} - a_{12}z_{ij})(\zeta_j - \zeta_i)/l_{ij} - a_{11}s_{zjk}(\zeta_k - \zeta_j)/l_{jk} - a_{10}\rho_{jk}$$

$$b_{22} = -a_{12}s_{xij}(\xi_j - \xi_i)/l_{ij} - a_{21}s_{xjk}(\xi_k - \xi_j)/l_{jk} - \tag{99}$$
$$a_{12}s_{yij}(\eta_j - \eta_i)/l_{ij} - a_{21}s_{yjk}(\eta_k - \eta_j)/l_{jk} -$$
$$a_{12}s_{zij}(\zeta_j - \zeta_i)/l_{ij} - a_{21}s_{zjk}(\zeta_k - \zeta_j)/l_{jk} - a_{02}\rho_{ij} - a_{20}\rho_{jk}$$

As is clear from the above, the angle variations $\phi_x$, $\phi_y$, and $\phi_z$ can be expressed by linear combination between eleven variables $\xi_i$, $\xi_j$, $\xi_k$, $\eta_i$, $\eta_j$, $\eta_k$, $\zeta_i$, $\zeta_j$, $\zeta_k$, $\rho_{ij}$, and $\rho_{jk}$.

<3>-1-3 Partial Differentials of Sum-of-Squares of Angle Variations

The $U_1$, that is the sum-of-squares of angle variations and the partial differentials of $\phi_x^2$, $\phi_y^2$, and $\phi_z^2$ are obtained in the same way as that of Expressions (26) and (27) of Algorithm 1. Note that, in this case, the term $\omega$ of (27) expresses $\rho$, in addition to $\xi$, $\eta$, and $\zeta$.

<3>-2 Setting of Rubber-Banding

The setting of rubber-banding is similar to that described with reference to Algorithm 1, so further description thereof is omitted.

<3>-3 Rotation of Arc About Fixed Node

In order to apply resistance to the rotation of each arc about a fixed node, the following term $U_3$ is added to the evaluation expression:

$$U_3 = \sum_{\text{arc } ij}^{A_{ij}|N_i \text{fix}} U_{3ij} \tag{100}$$

$$U_{3ij} = W_s[(\xi_j - \xi_i)^2 + (\eta_j - \eta_i)^2 + (\zeta_j - \zeta_i)^2]/l_{ij}^2 + W_t\rho_{ij}^2 \tag{101}$$

Expression (101) differs from Expression (32) of Algorithm 1 in that the twisting rotational component is expressed in terms of the variables $\rho_{ij}$. In addition, the swinging rotational component is replaced by approximate expression in the same way in which Expression (90) is replaced by Expression (93). The partial differentials of $U_{3ij}$ are as follows:

$$\frac{\partial U_{3ij}}{\partial \xi_i} = \frac{2W_s}{l_{ij}^2}(\xi_i - \xi_j) \qquad (102)$$

$$\frac{\partial U_{3ij}}{\partial \eta_i} = \frac{2W_s}{l_{ij}^2}(\eta_i - \eta_j)$$

$$\frac{\partial U_{3ij}}{\partial \zeta_i} = \frac{2W_s}{l_{ij}^2}(\zeta_i - \zeta_j)$$

$$\frac{\partial U_{3ij}}{\partial \rho_{ij}} = 2W_t \rho_{ij} \qquad (103)$$

<3>-4 Setting of Node Inertia and Node Dampers

The setting of node inertia and node dampers is similar to that described with reference to Algorithm 1, so further description thereof is omitted.

<4> Singular State and Countermeasure

The singular state and the countermeasure therefor are also similar to those described with reference to Algorithm 1, so further description thereof is omitted.

<5> Setting of Movability Range of Arc-to-Arc Angles

<5>-1 Limitation of Movability Range by Angle Springs

A movability range can be set for each arc-to-arc angle so that it moves only within that range. Repeated calculations are generally necessary for determining a restrictive condition when solving the problems involved with transformations under such a restrictive condition, as shown in FIG. 13A. In order to actively reduce the volume of calculations, the method described below is used. Note that the following description relates to the upper limit of the movability range, but the method of setting the lower limit thereof is similar.

If the value $\theta$ of an arc-to-arc angle has exceeded an upper limit $\theta^*$ of the movability range, a strong spring acts to approximate $\theta$ to $\theta^*$. Since this is not a complete restriction but a spring restriction, $\theta$ is not forced to be exactly $\theta^*$, but an effect similar to that obtained by fixing $\theta$ to $\theta^*$ can be obtained in practice by setting the strength of the spring to a sufficiently large value.

Depending on the value of $\theta$, the condition is set for the calculations in such a manner that the spring is enabled when $\theta \geq \theta^*$ and disabled when $\theta < \theta^*$. There are four combinations of spring state and calculation results, and the processing performed for each combination is similar to that of FIG. 13B, as follows:

(A) When the spring is disabled and the calculation result is within the movability range: the result is used unchanged (B) When the spring is disabled and the calculation result is outside the movability range: the result is scaled before use (C) When the spring is enabled and the calculation result is within the movability range: recalculation with the spring disabled (D) When the spring is enabled and the calculation result is outside the movability range: the result is used unchanged The method used for scaling the result when (B) occurs will now be described. The amount of overshoot $\psi$, as shown in FIG. 19, is defined as follows with respect to the variation $\phi$ of $\theta$, obtained by the calculation:

$$\psi = \theta + \phi - \theta^* \qquad (104)$$

Figure 19:
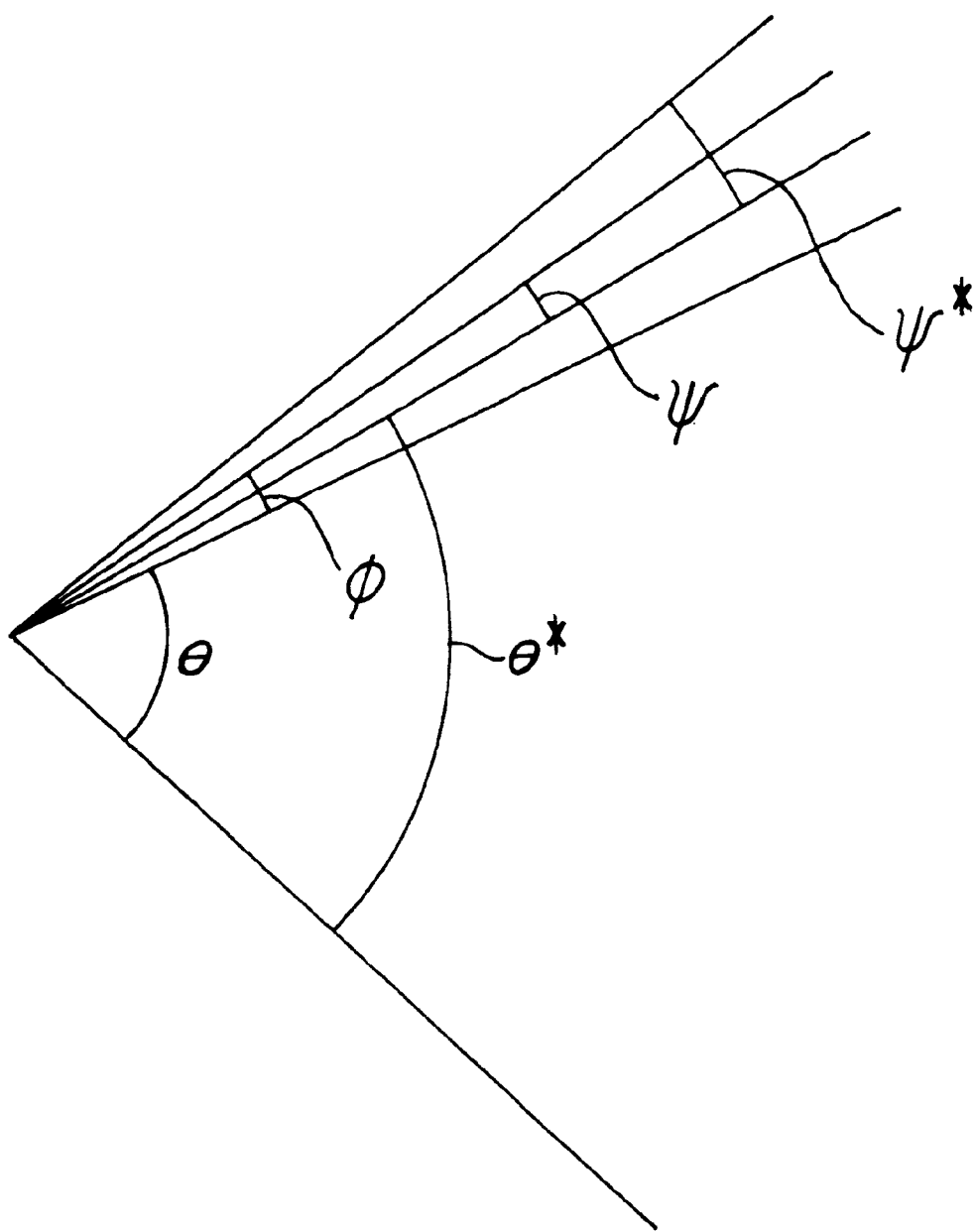
FIG. 19 illustrate a description of overshooting of an arc-to-arc angle, and the setting of a permissible limit therefor.

The permissible limit $\psi^*$ of overshooting is previously set as shown in FIG. 19, and a scaling factor $\mu_2$ is obtained from the expression below. It is possible to prevent any deterioration in the speed of transformation of the skeleton model caused by excessing scaling, by permitting a certain amount of overshooting.

$$\mu_2 = (\theta^* - \theta + \psi^*)/\phi \qquad (105)$$

All of the values of $\xi$, $\eta$, $\zeta$, and $\rho$ are multiplied by this $\mu_2$ for use. This makes it possible to restrain the amount of overshoot to no more than $\psi^*$. If overshooting occurs at a plurality of locations on the skeleton model, the smallest value of $\mu_2$ from these locations can be used for $\mu_2$. An effective method of restraining uncoordinated motion of the skeleton model after overshooting has occurred is to use angle dampers.

The above method makes recalculation unnecessary, except when the above combination (C) occurs. Even if this combination (C) does occur, acceptable motion of the skeleton model may be obtained by using the result unchanged, without recalculation.

<5>-2 Evaluation Expression for Angle Restriction

Angle restriction is enabled by adding the term $U_6$, defined below, to the evaluation expression U. Note that $\theta^*_x$, $\theta^*_y$, and $\theta^*_z$ express the upper or lower limits of $\theta_x$, $\theta_y$, and $\theta_z$.

$$U_6 = \sum_{ang}(U_{ax} + U_{ay} + U_{az}) \qquad (106)$$

$$U_{ax} = W_{as}(\theta_x - \theta^*_x + \phi_x)^2 + W_{ad}\phi_x^2 \qquad (107)$$

$$U_{ay} = W_{as}(\theta_y - \theta^*_y + \phi_y)^2 + W_{ad}\phi_y^2$$

$$U_{az} = W_{as}(\theta_z - \theta^*_z + \phi_z)^2 + W_{ad}\phi_z^2$$

$W_{as}$ and $W_{ad}$ are weighting coefficients representing the strengths of the spring and damper. The partial differentials of $U_{ax}$, $U_{ay}$, and $U_{az}$ are shown below. Note that $\omega$ is expressed by the variables $\xi$, $\eta$, $\zeta$, and $\rho$.

$$\frac{\partial U_{ax}}{\partial \omega} = \frac{2(W_{as} + W_{ad})}{1 - a_{12}^2}\frac{\partial b_{12}}{\partial \omega}b_{12} - \frac{2W_{as}}{\cos\theta_x}(\theta_x - \theta^*_x)\frac{\partial b_{12}}{\partial \omega} \qquad (108)$$

$$\frac{\partial U_{ay}}{\partial \omega} = \frac{2(W_{as} + W_{ad})}{(1 - a_{12}^2)^2}\left(a_{22}\frac{\partial b_{02}}{\partial \omega} - a_{02}\frac{\partial b_{22}}{\partial \omega}\right)(a_{22}b_{02} - a_{02}b_{22}) + \qquad (109)$$
$$\frac{2W_{as}}{1 - a_{12}^2}(\theta_y - \theta^*_y)\left(a_{22}\frac{\partial b_{02}}{\partial \omega} - a_{02}\frac{\partial b_{22}}{\partial \omega}\right)$$

$$\frac{\partial U_{az}}{\partial \omega} = \frac{2(W_{as} + W_{ad})}{(1 - a_{12}^2)^2}\left(a_{11}\frac{\partial b_{10}}{\partial \omega} - a_{10}\frac{\partial b_{11}}{\partial \omega}\right)(a_{11}b_{10} - a_{10}b_{11}) + \qquad (110)$$
$$\frac{2W_{as}}{1 - a_{12}^2}(\theta_z - \theta^*_z)\left(a_{11}\frac{\partial b_{10}}{\partial \omega} - a_{10}\frac{\partial b_{11}}{\partial \omega}\right)$$

<6> Attachment of Node to Polygon or Edge

As shown with reference to FIGS. 9A and 9B to FIG. 11, when a node is attached to a polygon or edge, an evaluation expression for the attraction of that node to the attractive object is prepared and this is added to U. The node is not attached firmly to the attractive object, but a sufficiently large attachment effect can be obtained in practice by setting the strength of the attachment to a sufficiently large value.

When a node is attached to a polygon, three methods can be used depending on the positional relationship of the two objects, as described below. In other words, a point magnet, line magnet, or face magnet could be used, as described previously with reference to Algorithm 1.

When the attraction condition is changed in accordance with the movement of the node, overshooting could occur similar to the case when limiting the movability range of arc-to-arc angles. In such a case, the calculation results are scaled in such a manner that the node $N_i$ does not move too far from the polygon.

Note that the concepts of point magnet, line magnet, and face magnet have already been discussed in the section on Algorithm 1, so further description thereof is omitted.

<7> Polygon Object Interaction Function

<7>-1 Interaction Function

If a skeleton model has collided with a polygon object, as was discussed with reference to FIG. 12, a function is added to ensure that the resultant behavior is natural, without the skeleton model penetrating or passing through the polygon object. This function is called an interaction function.

The following three types of interaction function can be considered:

(a) Interaction between node and polygon object
(b) Interaction between are and polygon object
(c) Interaction between a polygon object, which moves together with the skeleton model, and another polygon object The interaction function of (a), between a node and a polygon object, will now be described.

<7>-2 Collision Detection

To implement this interaction function, it is first of all necessary to detect whether a skeleton model and a polygon object have collided. The two methods described below could be considered for collision detection.

(a-1) Detection by Node Position: A collision is identified if a node is within a polygon object.
(a-2) Detection by Node path: A collision is identified if the path of a node intersects a polygon object.

Figure 20A:
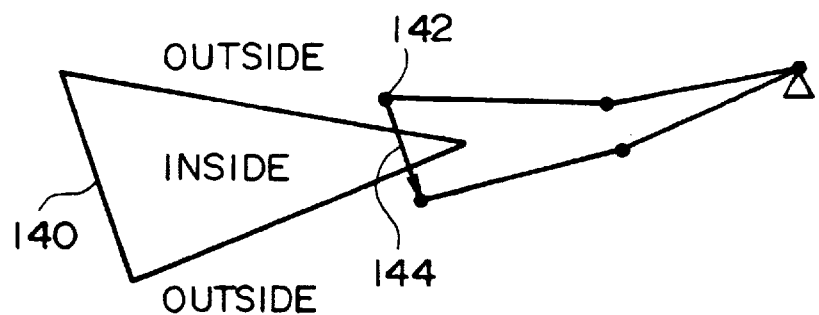
FIG. 20A, FIG. 20B, FIG. 20C illustrate a description of a function that enables interaction between a skeleton model and an object.

When a node 142 moves with respect to a polygon object 140, as shown in FIG. 20A, collision cannot be detected by method (a-1). In such a case, method (a-2) is used instead and collision is detected by identifying intersections between a path 144 of the node 142 and the polygon object 140. Not only can this method handle objects that are not closed; it can also be used for detecting collision without consideration of whether it is the surface or rear of the polygon.

<7>-3 Setting of Restrictive Condition

When a node is pushed towards a polygon, the interaction function operates to restrict the node to the polygon surface. Conversely, when it moves away from the polygon, it is necessary to remove that restriction. A face magnet is used for this restriction to the polygon surface, as previously described with reference to Algorithm 1. The method used for switching the restrictive condition is the same as that for limiting the movability range of arc-to-arc angle, as described with reference to FIG. 13B. In other words, a face magnet can be switched on and off as follows:

(A) When the face magnet is off and the calculation result is no collision: the result is used unchanged
(B) When the face magnet is off and the calculation result leads to a collision: the result is scaled before use
(C) When the face magnet is on and the calculation result shows that a collision state has not occurred: recalculation with the face magnet off
(D) When the face magnet is on and the calculation result shows that the collision state has occurred: the result is used unchanged Of the two surfaces of the polygon, the collision surface is on the side where the node was located immediately before a collision occurs, and a collision state is a state in which the node is located on the opposite side of the polygon from the collision surface.

<7>-4 Handling of Multiple Collisions

Figure 20B:
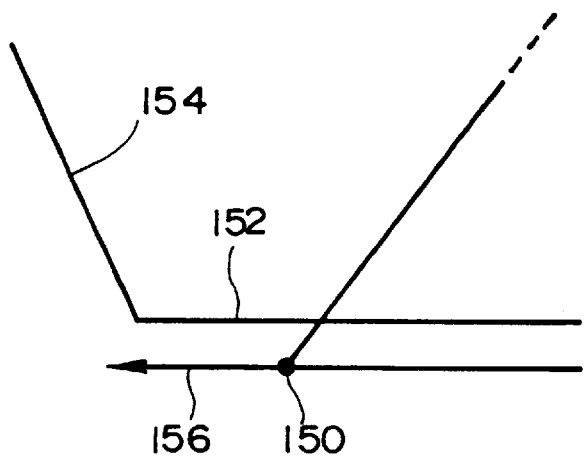

As described previously, since face magnets are used as restrictive conditions, a node could penetrate a polygon, if only by a very small amount. The face magnets are switched on and off from viewing this penetration. However, if a node 150 remains penetrating into a polygon 152, as shown in FIG. 20B, an error will occur when the node 150 moves in the direction of an arrow 156. In other words, although the node 150 should be colliding with the two polygons 152 and 154, it is not possible to detect the collision with the polygon 154.

Figure 20C:
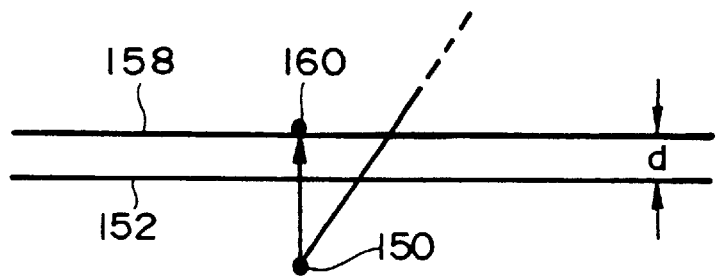

In such a case, the polygon (boundary) 152 forms a virtual surface (virtual boundary) 158 that is offset by a tiny amount d from the collision surface side, as shown in FIG. 20C. When the node 150 is in the collision state, the node 150 is projected perpendicular to the virtual surface 158 to the location of a new node 160. The calculations for both the face magnet and the collision detection use this virtual surface 158 instead of the surface of the polygon 152. This method makes it possible to handle multiple collisions of the node.

4 Image Synthesizing Apparatus and Information Storage Medium

Figure 21A:
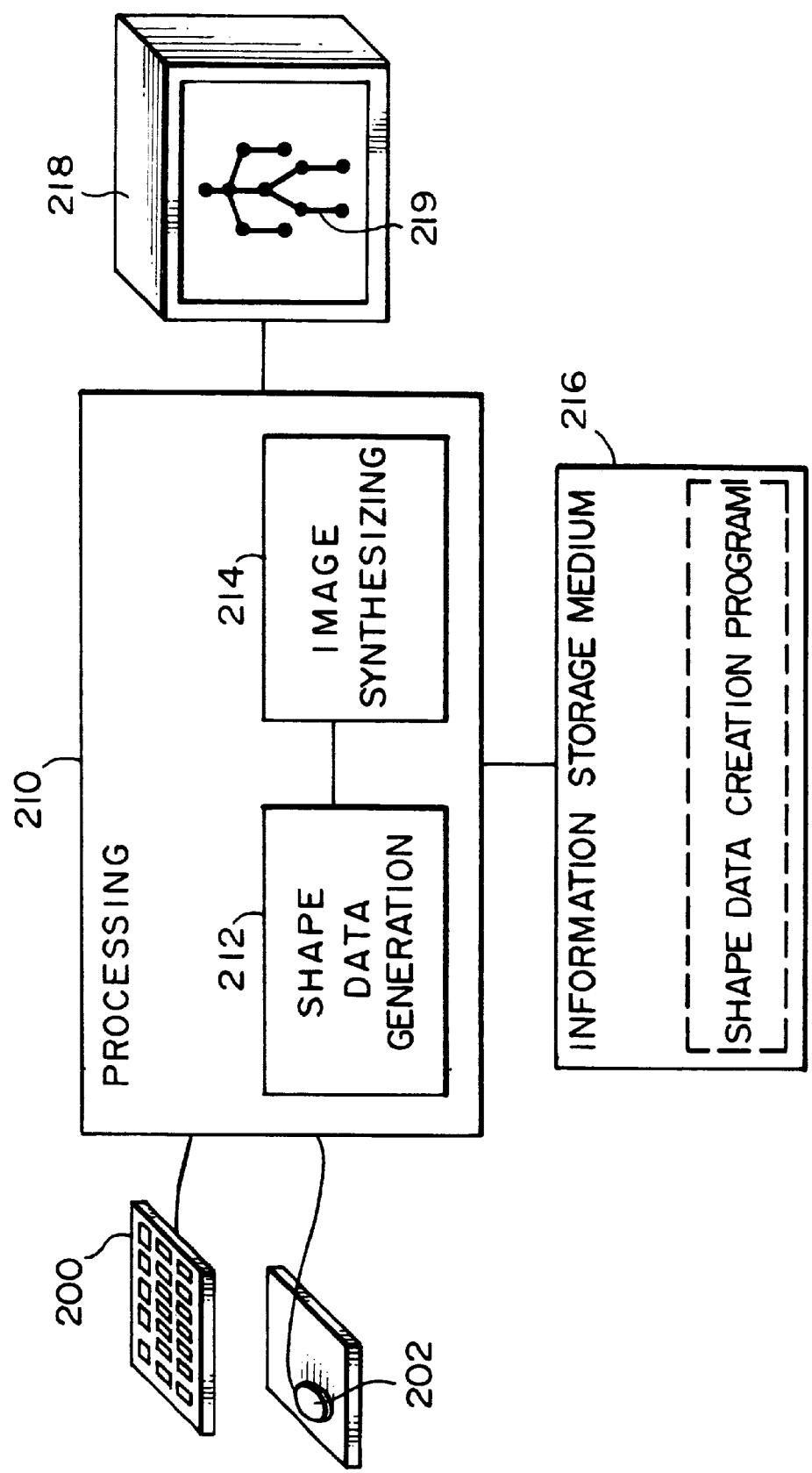
FIGS. 21A, 21B, and 21C show various different embodiments of an image synthesizing apparatus and an information storage medium.
Figure 21B:
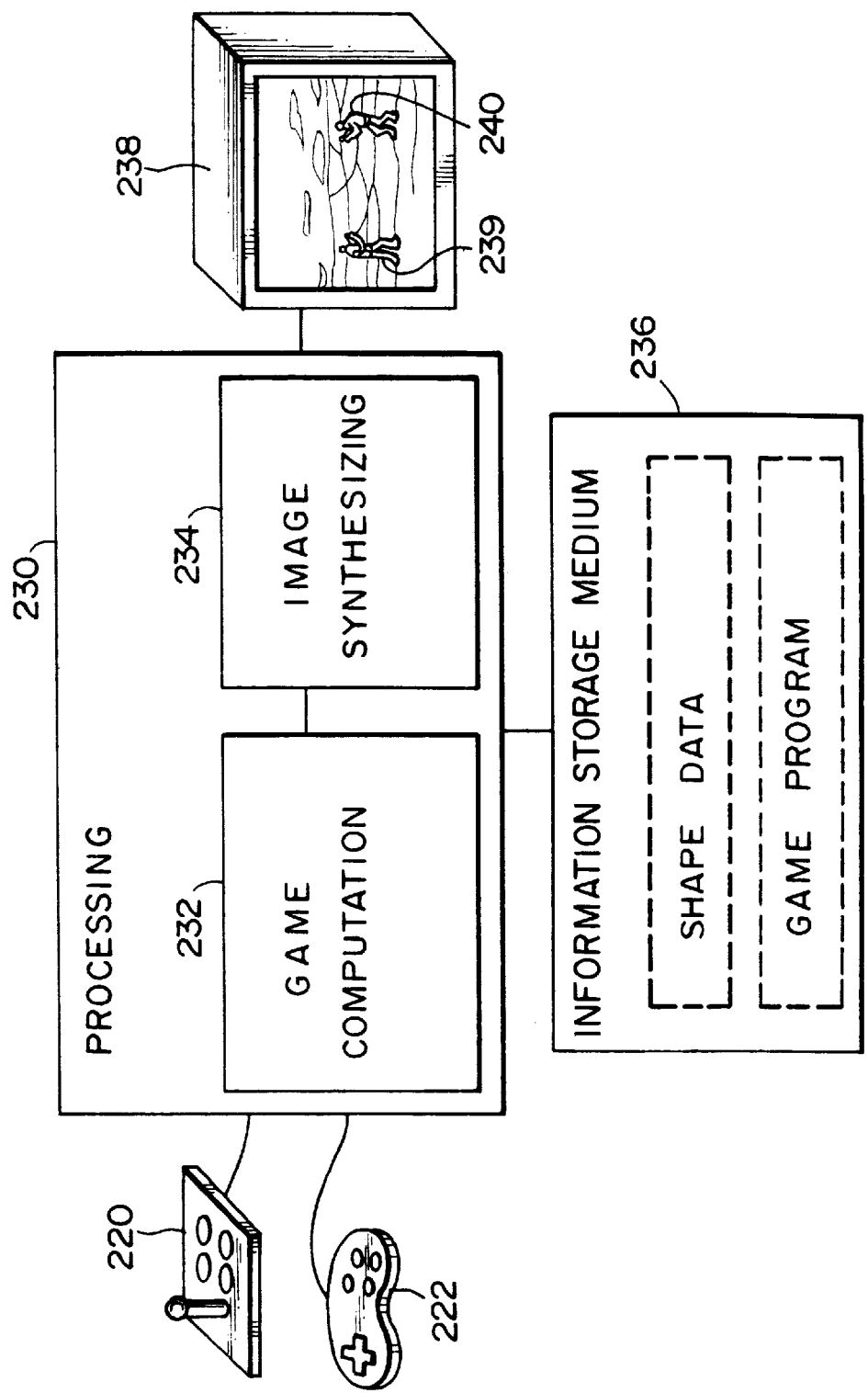
Figure 21C:
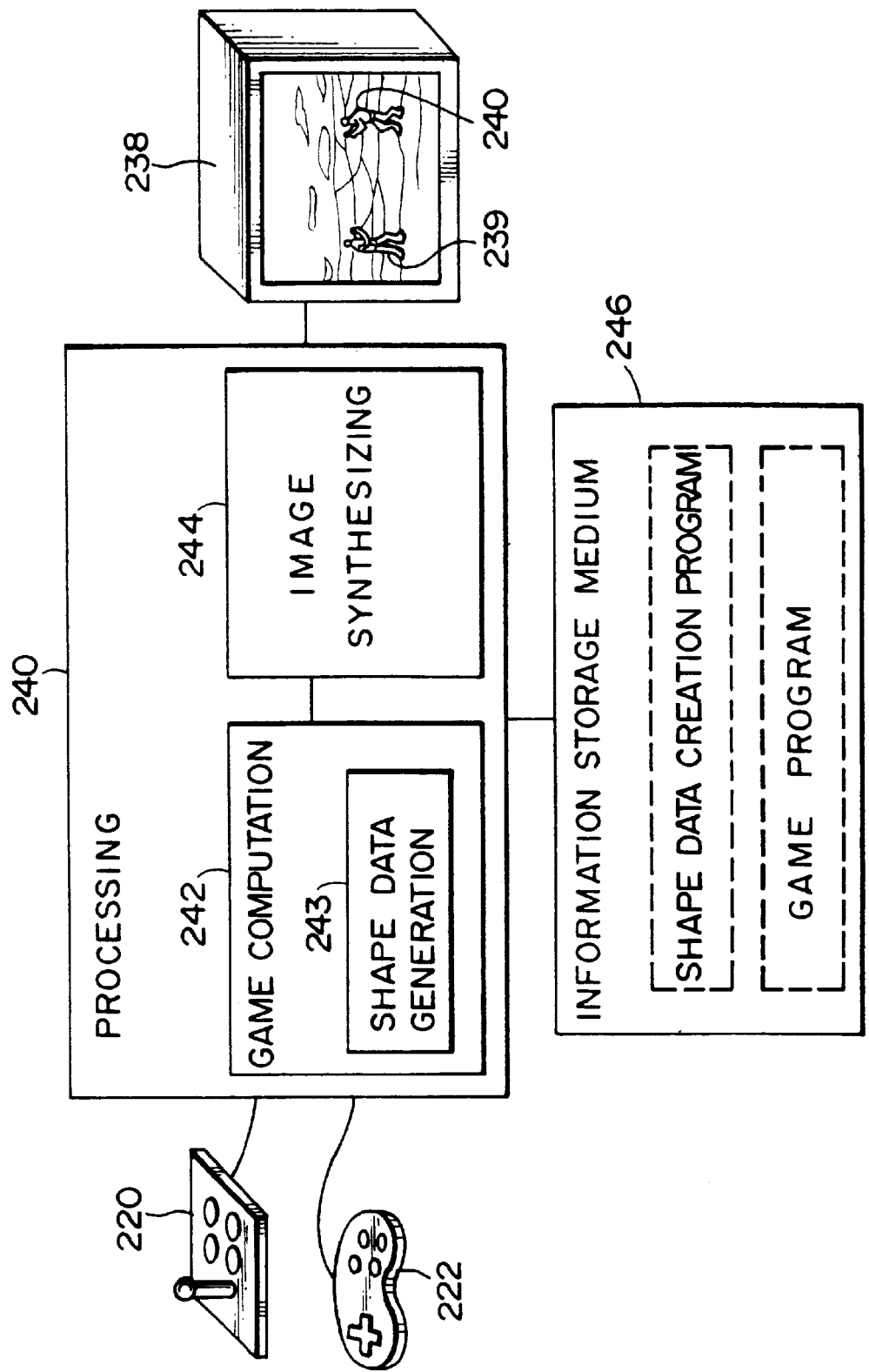
Figure 23A:
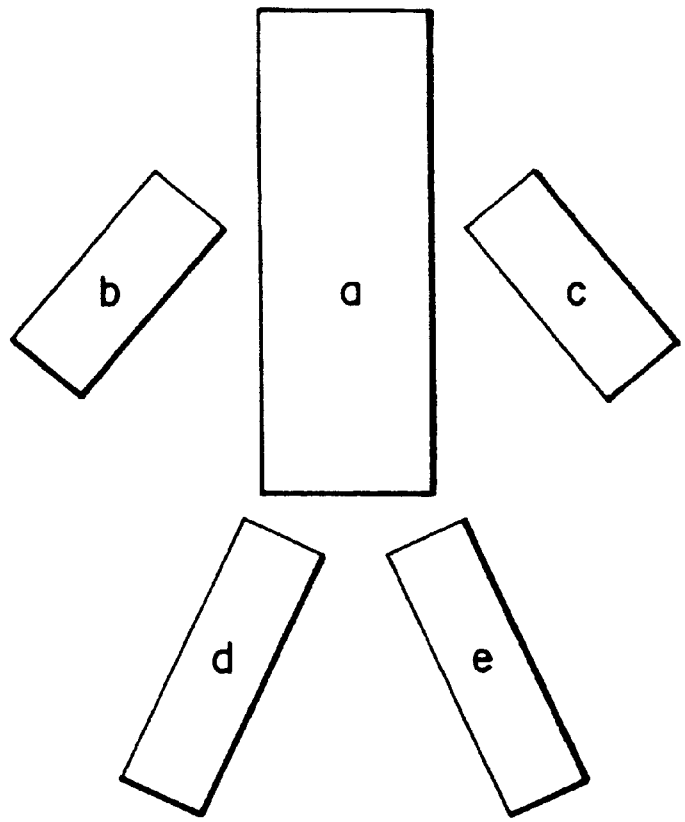
FIGS. 23A and 23B illustrate the setting of parent-child relationships.
Figure 23B:
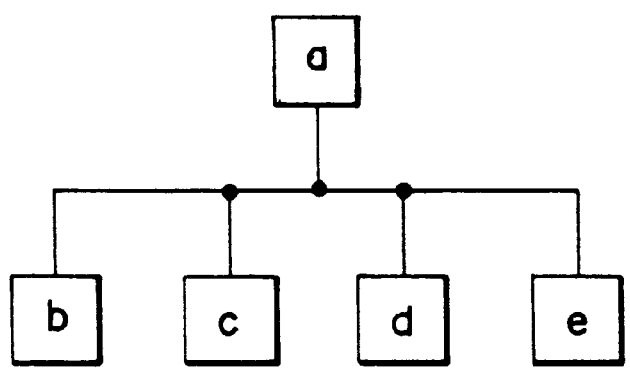

Practical examples of an image synthesizing apparatus and an information storage medium that use the skeleton model shape transformation method of this embodiment are shown in FIGS. 21A, 21B, and 21C.

FIG. 21A shows an example of this embodiment applied to a shape data creation tool that is one type of image synthesizing apparatus. Hardware such as a keyboard 200 and a mouse 202, which is a pointing device, is used for data input such as the input of initial shape data of the skeleton model, the setting of fixed nodes or arcs, the setting of movability ranges for arc-to-arc angles, the setting of attachments of nodes to polygons or edges, and the specifications of node picking and movement. A processing section 210 comprises a shape data creation section 212, which executes transformations of the shape of the skeleton model in accordance with the shape transformation method of this embodiment to create shape data, and an image synthesizing section 214, which synthesizes an image of the skeleton model from the shape data created by the processing section 210. From the hardware point of view, the processing section 210 includes a CPU, DSP, and memory, and, if necessary, a dedicated image synthesizing IC. A shape data creation program that implements the shape transformation method of this embodiment is stored in an information storage medium 216 such as a floppy disc, CD-ROM, DVD, IC card, or memory together with various items of information such as data necessary for executing this program. The processing section 210 operates according to input information from the keyboard 200 and the mouse 202 and information that is stored in the information storage medium 216, resulting in the display of a skeleton model image 219 on a display section 218. This shape data creation tool makes it possible to create shape data while verifying the form of the displayed skeleton model image 219, making the design task more efficient.

FIG. 21B shows an example of this embodiment applied to an game machine that is another type of image synthesizing apparatus. Controllers 220 and 222 are designed to enable the player to input manipulation information. A processing section 230 comprises a game computation section 232, which executes computations such as those for synthesizing a game image according to manipulation information from the player, and an image synthesizing section 234, which synthesizes an image from the results of these computations. From the hardware point of view, the processing section 230 includes a CPU, DSP, and memory, and, if necessary, a dedicated image synthesizing IC. Data such as a game program, shape data created by the shape transformation method of this embodiment, and various items of information created from this shape data, is stored in an information storage medium 236. Images such as images 239 and 240 of game characters that operate according to data such as the above shape data are displayed on a display section 238. If the game machine is an arcade machine, the shape data and game program is stored in an information storage medium formed of a ROM or the like. If the game machine is a domestic appliance, the shape data and game program is stored in an information storage medium such as a CD-ROM or games cassette. In a type of game machine wherein a plurality of terminals are connected by cables through a host computer, the shape data and game program is stored in an information storage medium, such as a magnetic disk device or memory, on the host computer.

Finally, FIG. 21C shows an example of a game machine, in which a game computation section 242 comprises a shape data creation section 243. In this case, a shape data creation program that implements the shape transformation method of this embodiment is stored in an information storage medium 246, instead of shape data. The creation of shape data is done in real-time by the shape data generation section 243 incorporated within the game machine. A player can make a skeleton model perform any desired action, by means of controllers 220 and 222 or the like. This displays the images of objects 239 and 240 that move together with the skeleton model on the display section 238.

It should be noted that this invention is not limited to the embodiments described above, and it can be applied to various different transformations.

For example, expressing of a skeleton model by basic variables comprising node coordinates and the components of arc-normal vectors, and minimizing of an expression comprising a factor such as a variation in an angle between two arcs can be implemented by various different mathematical methods other than the Newtonian method or Lagrangian multiplier method, such as a method that improves on the Newtonian method or Lagrangian multiplier method, making it possible to create various different transformations. Especially in the case when the equations to be solved are expressed as linear expressions involving variables which are unknowns, as in the present embodiment, the solution can be obtained by a method from the linear algebra.

Similarly, obtaining the solution of an equation comprising basic variables such as node coordinates by iterative calculations, and varying that equation successively in synchronization with the start or end of the iterative loop, based on given information, can be implemented by various different mathematical methods other than a combination of the Newtonian method and Lagrangian multiplier method, making it possible to create various different transformations. Furthermore, such other methods could be used to set a spring restriction towards a boundary for a skeleton model, and determine whether the restrictive condition is to be enabled or disabled in the second iterative loop, based on whether or not that restrictive condition is enabled or disabled in the first iterative loop and whether or not the skeleton model has passed beyond that boundary.

What is claimed is:

1. A method of transforming the shape of a skeleton model, comprising the steps of:
    expressing said skeleton model by basic variables that comprise coordinates of at least one node of said skeleton model;
    causing a change in at least one of a set of basic equations and an evaluation expression based on given information, said set of basic equations taking said basic variables as unknowns and comprising an equation that defines the length of a plurality of arcs of said skeleton model as given values, and said evaluation expression uniquely determining a solution for said basic variables of said set of basic equations;
    obtaining said solution that substantially satisfies said set of basic equations and makes the value of said evaluation expression one of substantially a minimum, substantially a maximum, or substantially stationary; and
    transforming the shape of said skeleton model, based on the thus obtained solution.

2. The method as defined in claim 1, wherein:
    said basic variables comprise components of arc-normal vectors that are perpendicular to said arcs; and
    said set of basic equations comprises an equation defining the length of said arc-normal vectors as given values and an equation specifying that said arc-normal vectors are perpendicular to said arcs.

3. The method as defined in claim 1, wherein:
    said basic variables comprise components of an arc-normal vectors that are perpendicular to said arcs; and
    a variation in said components of said arc-normal vectors is expressed as a single given variable to obtain said solution for said basic variables.

4. The method as defined in claim 1, wherein:
    said basic variables comprise components of arc-normal vectors that are perpendicular to said arcs; and
    said solution for said basic variables is obtained such that the value of said evaluation expression is one of substantially a minimum, substantially a maximum, or substantially stationary, when said evaluation expression comprises at least one of a variation in an angle between two of said arcs, a distance between said node and a given point, a variation in the direction of one of said arcs which has a fixed node at one end, a variation in the coordinates of said node, and a variation in the velocity of the coordinates of said node.

5. The method as defined in claim 1, wherein:
    said solution for said basic variables is obtained by iterative calculations; and
    at least one of said set of basic equations and said evaluation expression is successively modified based on given information in synchronization with the start or end of an iterative loop.

6. The method as defined in claim 1, wherein:
    coordinates of a fixed node or components of fixed arc-normal vectors are used as known values.

7. The method as defined in claim 1, wherein:
    said evaluation expression comprises at least one of an expression that restricts an angle between two of said arcs to within a given range, an expression that restricts said node to within a given surface or a given line, and an expression that restricts said skeleton model or a first object that moves together with said skeleton model to a second object, when an interaction occurs between said skeleton model or said first object and said second object.

8. An image synthesizing apparatus comprising:

means for outputting the shape of a skeleton model that has been transformed by the shape transformation method of claim 1; and manipulation means for enabling an operator to specify a transformation of said skeleton model.

9. An image synthesizing apparatus comprising means for outputting an image of an object that moves together with a skeleton model that has been transformed by the shape transformation method of claim 1.

10. An information storage medium for storing shape data relating to a skeleton model that has been transformed by the shape transformation method of claim 1.

11. A method of transforming the shape of a skeleton model, comprising the steps of:

expressing said skeleton model by basic variables that comprise coordinates of at least one node of said skeleton model and components of arc-normal vectors that are perpendicular to a plurality of arcs of said skeleton model; and transforming the shape of said skeleton model in such a manner that the value of an expression is one of substantially a minimum, substantially a maximum, or substantially stationary, when said expression comprises at least one of a variation in an angle between two of said arcs, a distance between said node and a given point, a variation in the direction of one of said arcs which has a fixed node at one end, a variation in the coordinates of said node, and a variation in the velocity of the coordinates of said node.

12. An image synthesizing apparatus comprising:

means for outputting the shape of a skeleton model that has been transformed by the shape transformation method of claim 11; and manipulation means for enabling an operator to specify a transformation of said skeleton model.

13. An image synthesizing apparatus comprising means for outputting an image of an object that moves together with a skeleton model that has been transformed by the shape transformation method of claim 11.

14. An information storage medium for storing shape data relating to a skeleton model that has been transformed by the shape transformation method of claim 11.

15. A method of transforming the shape of a skeleton model, comprising the steps of:

expressing said skeleton model by basic variables that comprise coordinates of at least one node of said skeleton model; and transforming the shape of said skeleton model in such a manner that, when the coordinates of at least one given point that controls a transformation in the shape of said skeleton model have changed, the distance between said node and said given point is minimized through a rubber band process.

16. The method as defined in claim 15, wherein:

the shape of said skeleton model is transformed in such a manner that distances between two or more of said nodes and two or more of said given points linked thereto are minimized.

17. An image synthesizing apparatus comprising:

means for outputting the shape of a skeleton model that has been transformed by the shape transformation method of claim 15; and manipulation means for enabling an operator to specify a transformation of said skeleton model.

18. An image synthesizing apparatus comprising means for outputting an image of an object that moves together with a skeleton model that has been transformed by the shape transformation method of claim 15.

19. An information storage medium for storing shape data relating to a skeleton model that has been transformed by the shape transformation method of claim 15.

20. A method of transforming the shape of a skeleton model, comprising the steps of:

expressing said skeleton model by basic variables that comprise coordinates of at least one node of said skeleton model;

obtaining a solution for an equation including said basic variables by iterative calculations; and successively modifying said equation based on given information in synchronization with the start or end of an iterative loop.

21. An image synthesizing apparatus comprising:

means for outputting the shape of a skeleton model that has been transformed by the shape transformation method of claim 20; and manipulation means for enabling an operator to specify a transformation of said skeleton model.

22. An image synthesizing apparatus comprising means for outputting an image of an object that moves together with a skeleton model that has been transformed by the shape transformation method of claim 20.

23. An information storage medium for storing shape data relating to a skeleton model that has been transformed by the shape transformation method of claim 20.

24. A method of transforming the shape of a skeleton model, comprising the steps of:

transforming the shape of said skeleton model under a restrictive condition such that, when said skeleton model or an object that moves together with said skeleton model has passed beyond a given boundary, said skeleton model or object is returned to said boundary;

executing calculations in such a manner that, when one iterative loop of iterative calculations for obtaining the shape of said skeleton model is executed in a state in which said restrictive condition is disabled and said skeleton model or object does not pass beyond said boundary, said restrictive condition remains disabled in the next iterative loop;

executing calculations in such a manner that, when said one iterative loop is executed in a state in which said restrictive condition is disabled and said skeleton model or object passes beyond said boundary, said restrictive condition is enabled in the next iterative loop;

executing calculations in such a manner that, when said one iterative loop is executed in a state in which said restrictive condition is enabled and said skeleton model or object passes beyond said boundary, said restrictive condition remains enabled in the next iterative loop; and executing calculations in such a manner that, when said one iterative loop is executed in a state in which said restrictive condition is enabled and said skeleton model or object does not pass beyond said boundary, said restrictive condition is disabled in the next iterative loop.

25. The method as defined in claim 24, wherein:

the shape of said skeleton model is transformed under a restrictive condition that ensures that the value of an expression comprising the distance between said skeleton model or object and said boundary is one of substantially a minimum, substantially a maximum, or substantially stationary.

26. The method as defined in claim 24, wherein:

a virtual boundary is provided at a location separated from said boundary by a given spacing; and when said skeleton model or object passes beyond said boundary, said skeleton model or object is returned to said virtual boundary and also a decision is made as to whether to enable or disable a restrictive condition by using said virtual boundary instead of said boundary.

27. An image synthesizing apparatus comprising:

means for outputting the shape of a skeleton model that has been transformed by the shape transformation method of claim 24; and manipulation means for enabling an operator to specify a transformation of said skeleton model.

28. An image synthesizing apparatus comprising means for outputting an image of an object that moves together with a skeleton model that has been transformed by the shape transformation method of claim 24.

29. An information storage medium for storing shape data relating to a skeleton model that has been transformed by the shape transformation method of claim 24.

30. A method of transforming the shape of a skeleton model, wherein:

when a domain of at least one first variable for expressing the shape of said skeleton model is defined by an inequality comprising said first variable, the shape of said skeleton model is transformed under a discontinuous restrictive condition by substituting an equality for said inequality and defining said domain of said first variable by said equality, said equality being made by moving all terms of said inequality to either the left of right side of said inequality and inserting a function of a second variable into the other side of said inequality, the value of said function being constantly positive or constantly negative or constantly non-negative or constantly non-positive.

31. The method as defined in claim 30, wherein:

the shape of said skeleton model is transformed in such a manner that the value of an expression comprising a variation in said second variable is one of substantially a minimum, substantially a maximum, or substantially stationary.

32. The method as defined in claim 30, wherein:

when said second variable has achieved a value close to a given convergent value, another given value is added to said second variable.

33. An image synthesizing apparatus comprising:

means for outputting the shape of a skeleton model that has been transformed by the shape transformation method of claim 30; and manipulation means for enabling an operator to specify a transformation of said skeleton model.

34. An image synthesizing apparatus comprising means for outputting an image of an object that moves together with a skeleton model that has been transformed by the shape transformation method of claim 30.

35. An information storage medium for storing shape data relating to a skeleton model that has been transformed by the shape transformation method of claim 30.

36. A method of transforming the shape of a skeleton model, wherein:

in one iterative loop of iterative calculations for obtaining the shape of said skeleton model, a first calculation step is executed in a state in which a restrictive condition that restricts said skeleton model or an object that moves together with said skeleton model to a given boundary is disabled; and when said skeleton model or object is in a given positional relationship with respect to said boundary after said first calculation step in said one iterative loop, a second calculation step is executed to attract said skeleton model or object towards said boundary.

37. The method as defined in claim 36, wherein:

calculations are executed in said first calculation step in such a manner that the value of an expression comprising an amount of movement of said skeleton model or object in the direction of said boundary is one of substantially a minimum, substantially a maximum, or substantially stationary; and calculations are executed in said second calculation step in such a manner that the value of an expression comprising the distance between said skeleton model or object and said boundary is one of substantially a minimum, substantially a maximum, or substantially stationary.

38. The method as defined in claim 36, wherein:

said boundary is a limited surface or limited line.

39. An image synthesizing apparatus comprising:

means for outputting the shape of a skeleton model that has been transformed by the shape transformation method of claim 36; and manipulation means for enabling an operator to specify a transformation of said skeleton model.

40. An image synthesizing apparatus comprising means for outputting an image of an object that moves together with a skeleton model that has been transformed by the shape transformation method of claim 36.

41. An information storage medium for storing shape data relating to a skeleton model that has been transformed by the shape transformation method of claim 36.

42. A method of transforming the shape of a skeleton model, comprising the steps of:

expressing said skeleton model by basic variables that comprise coordinates of at least one node of said skeleton model;

determining whether or not a first set of simultaneous equations that takes a variation of said basic variables as an unknown is degenerate or in a state approximating thereto; and transforming the shape of said skeleton model by reducing the number of equations of said first set of simultaneous equations to reconfigure said first set of simultaneous equations as an independent second set of simultaneous equations, and obtaining a solution to the thus reconfigured second set of simultaneous equations, when it is determined that said first set of simultaneous equations is degenerate or in a state approximating thereto.

43. The method as defined in claim 42, wherein:

said first set of simultaneous equations comprises an equation that defines the length of arcs of said skeleton model as given values.

44. An image synthesizing apparatus comprising:

means for outputting the shape of a skeleton model that has been transformed by the shape transformation method of claim 42; and manipulation means for enabling an operator to specify a transformation of said skeleton model.

45. An image synthesizing apparatus comprising means for outputting an image of an object that moves together with a skeleton model that has been transformed by the shape transformation method of claim 42.

46. An information storage medium for storing shape data relating to a skeleton model that has been transformed by the shape transformation method of claim 42.

47. An information storage medium used for the transformation of the shape of a skeleton model, comprising:

information for expressing said skeleton model by basic variables that comprise coordinates of at least one node of said skeleton model;

information for causing a change in at least one of a set of basic equations and an evaluation expression based on given information, said set of basic equations taking said basic variables as unknowns and comprising an equation that defines the length of a plurality of arcs of said skeleton model as given values, and said evaluation expression uniquely determining a solution for said basic variables of said set of basic equations;

information for obtaining said solution that substantially satisfies said set of basic equations and makes the value of said evaluation expression one of substantially a minimum, substantially a maximum, or substantially stationary; and information for transforming the shape of said skeleton model, based on the thus obtained solution.

48. An information storage medium used for the transformation of the shape of a skeleton model, comprising:

information for expressing said skeleton model by basic variables that comprise coordinates of at least one node of said skeleton model and components of arc-normal vectors that are perpendicular to a plurality of arcs of said skeleton model; and information for transforming the shape of said skeleton model in such a manner that the value of an expression is one of substantially a minimum, substantially a maximum, or substantially stationary, when said expression comprises at least one of a variation in an angle between two of said arcs, a distance between said node and a given point, a variation in the direction of one of said arcs which has a fixed node at one end, a variation in the coordinates of said node, and a variation in the velocity of the coordinates of said node.

49. An information storage medium used for the transformation of the shape of a skeleton mode, comprising:

information for expressing said skeleton model by basic variables that comprise coordinates of at least one node of said skeleton model; and information for transforming the shape of said skeleton model in such a manner that, when the coordinates of at least one given point that controls a transformation in the shape of said skeleton model have changed, the distance between said node and said given point is minimized through a rubber band process.

50. An information storage medium used for the transformation of the shape of a skeleton model, comprising:

information for expressing said skeleton model by basic variables that comprise coordinates of at least one node of said skeleton model;

information for obtaining a solution for an equation including said basic variables by iterative calculations; and information for successively modifying said equation based on given information in synchronization with the start or end of an iterative loop.

51. An information storage medium used for the transformation of the shape of a skeleton model, comprising:

information for transforming the shape of said skeleton model under a restrictive condition such that, when said skeleton model or an object that moves together with said skeleton model has passed beyond a given boundary, said skeleton model or object is returned to said boundary;

information for executing calculations in such a manner that, when one iterative loop of iterative calculations for obtaining the shape of said skeleton model is executed in a state in which said restrictive condition is disabled and said skeleton model or object does not pass beyond said boundary, said restrictive condition remains disabled in the next iterative loop;

information for executing calculations in such a manner that, when said one iterative loop is executed in a state in which said restrictive condition is disabled and said skeleton model or object passes beyond said boundary, said restrictive condition is enabled in the next iterative loop;

information for executing calculations in such a manner that, when said one iterative loop is executed in a state in which said restrictive condition is enabled and said skeleton model or object passes beyond said boundary, said restrictive condition remains enabled in the next iterative loop; and information for executing calculations in such a manner that, when said one iterative loop is executed in a state in which said restrictive condition is enabled and said skeleton model or object does not pass beyond said boundary, said restrictive condition is disabled in the next iterative loop.

52. An information storage medium used for the transformation of the shape of a skeleton model, wherein:

when a domain of at least one first variable for expressing the shape of said skeleton model is defined by an inequality comprising said first variable, the shape of said skeleton model is transformed under a discontinuous restrictive condition by substituting an equality for said inequality and defining said domain of said first variable by said equality, said equality being made by moving all terms of said inequality to either the left of right side of said inequality and inserting a function of a second variable into the other side of said inequality, the value of said function being constantly positive or constantly negative or constantly non-negative or constantly non-positive.

53. An information storage medium used for the transformation of the shape of a skeleton model, comprising:

information for executing a first calculation step within one iterative loop of iterative calculations for obtaining the shape of said skeleton model, said first calculation step being executed in a state in which a restrictive condition that restricts said skeleton model or an object that moves together with said skeleton model to a given boundary is disabled; and information for executing a second calculation step when said skeleton model or object is in a given positional relationship with respect to said boundary after said first calculation step in said one iterative loop, said second calculation step being executed to attract said skeleton model or object towards said boundary.

54. An information storage medium used for the transformation of the shape of a skeleton model, comprising:

information for expressing said skeleton model by basic variables that comprise coordinates of at least one node of said skeleton model;

information for determining whether or not a first set of simultaneous equations that takes a variation of said basic variables as an unknown is degenerate or in a state approximating thereto; and information for transforming the shape of said skeleton model by reducing the number of equations of said first set of simultaneous equations to reconfigure said first set of simultaneous equations as an independent second set of simultaneous equations, and obtaining a solution to the thus reconfigured second set of simultaneous equations, when it is determined that said first set of simultaneous equations is degenerate or in a state approximating thereto.

* * * * *